L. M. POTTS.
MACHINE TELEGRAPH.
APPLICATION FILED DEC. 14, 1915. RENEWED JUNE 2, 1920.
1,370,669.
Patented Mar. 8, 1921.
23 SHEETS—SHEET 1.
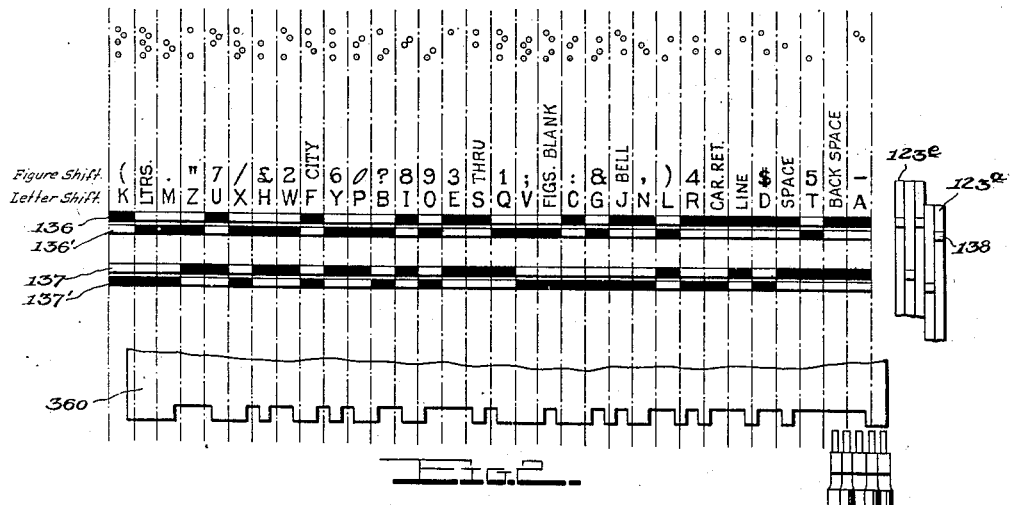

L. M. POTTS.
MACHINE TELEGRAPH.
APPLICATION FILED DEC. 14, 1915. RENEWED JUNE 2, 1920.
1,370,669.
Patented Mar. 8, 1921.
23 SHEETS—SHEET 2.
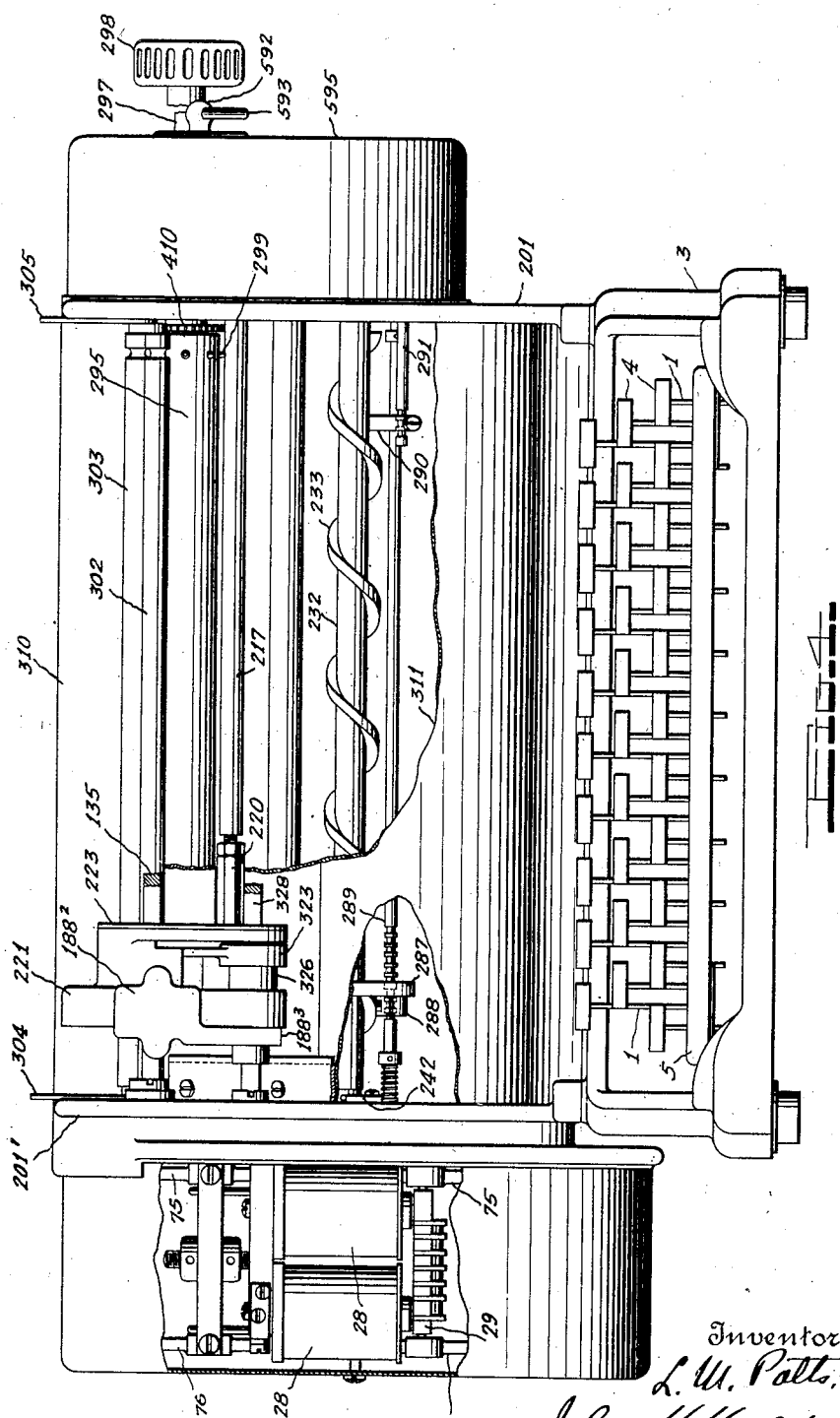

L. M. POTTS.
MACHINE TELEGRAPH.
APPLICATION FILED DEC. 14, 1915. RENEWED JUNE 2, 1920.
1,370,669.
Patented Mar. 8, 1921.
23 SHEETS—SHEET 3.
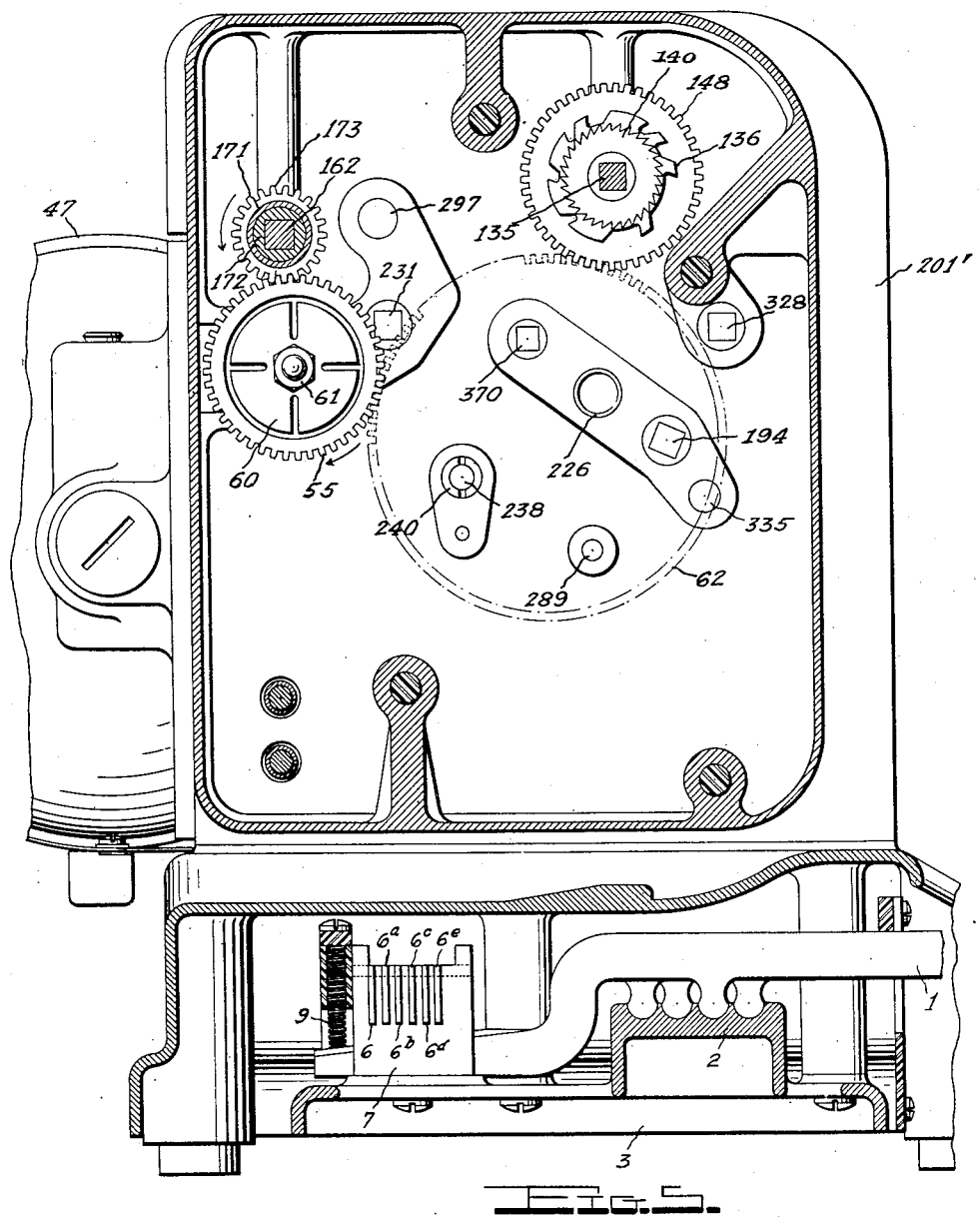
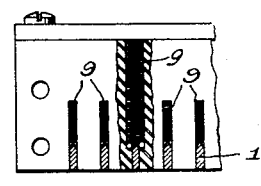

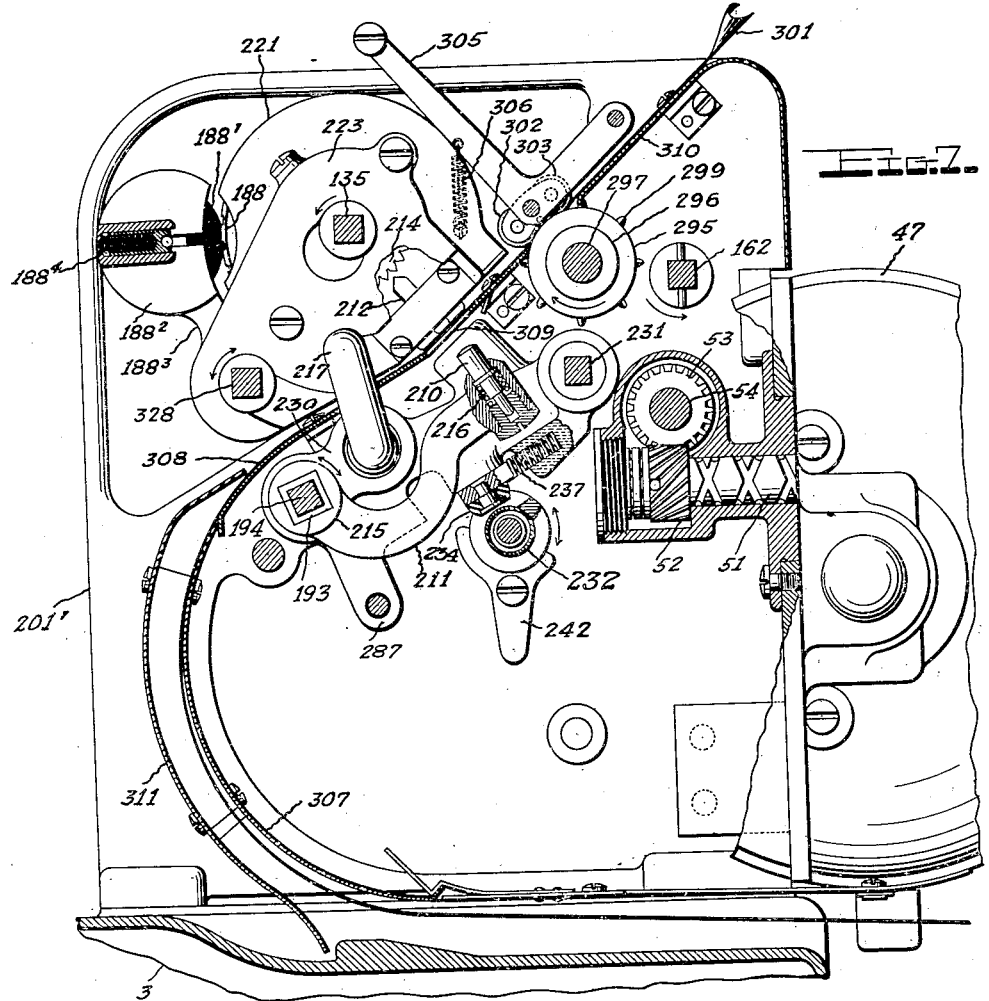
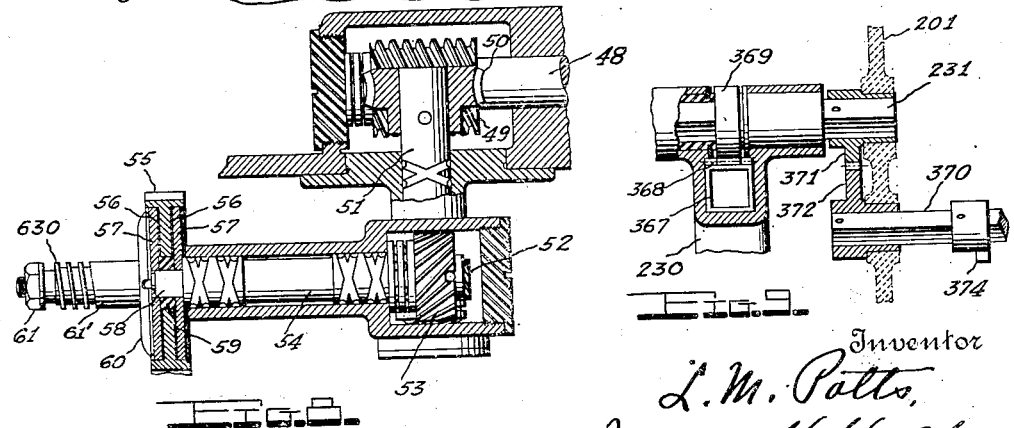

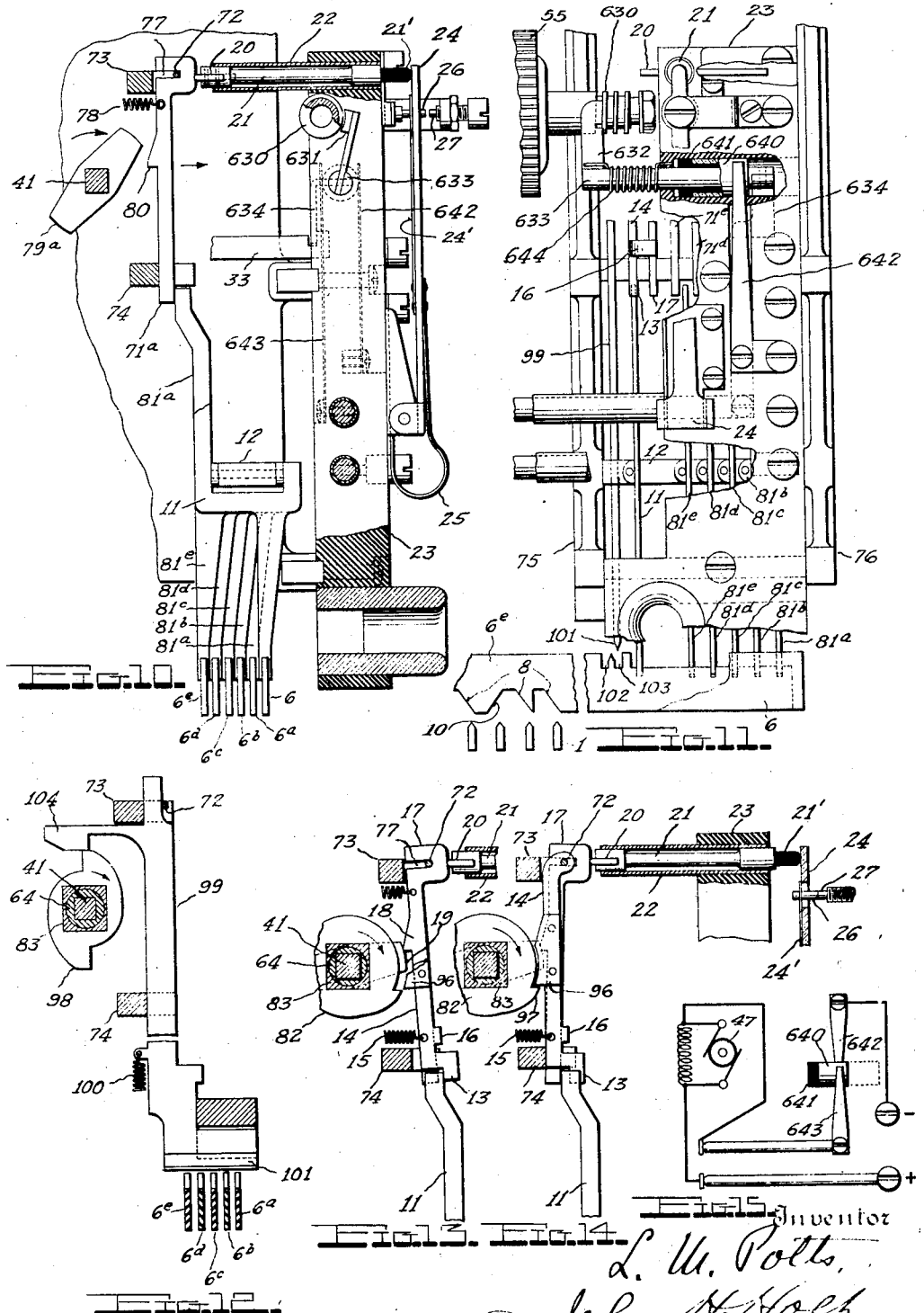

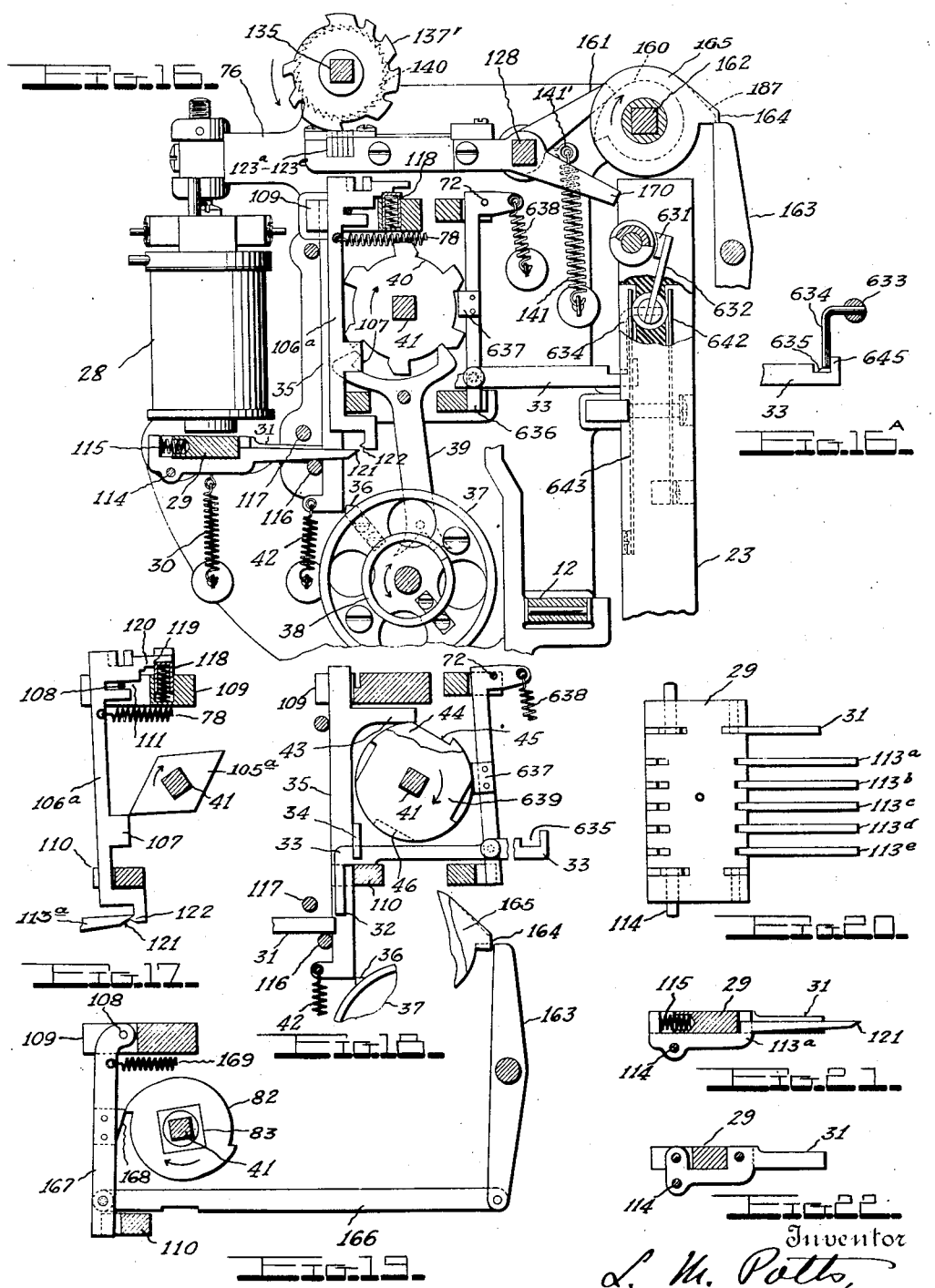

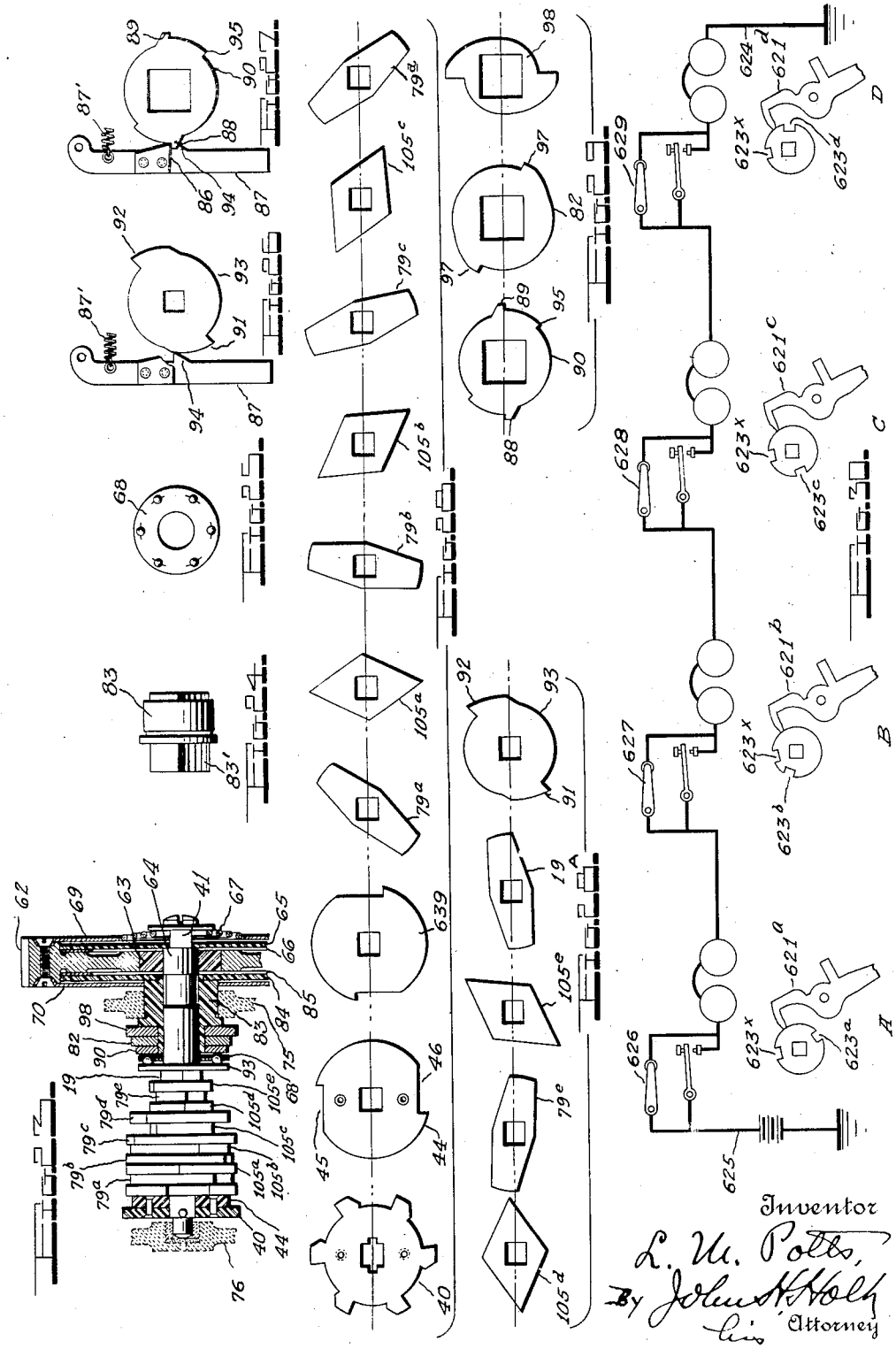

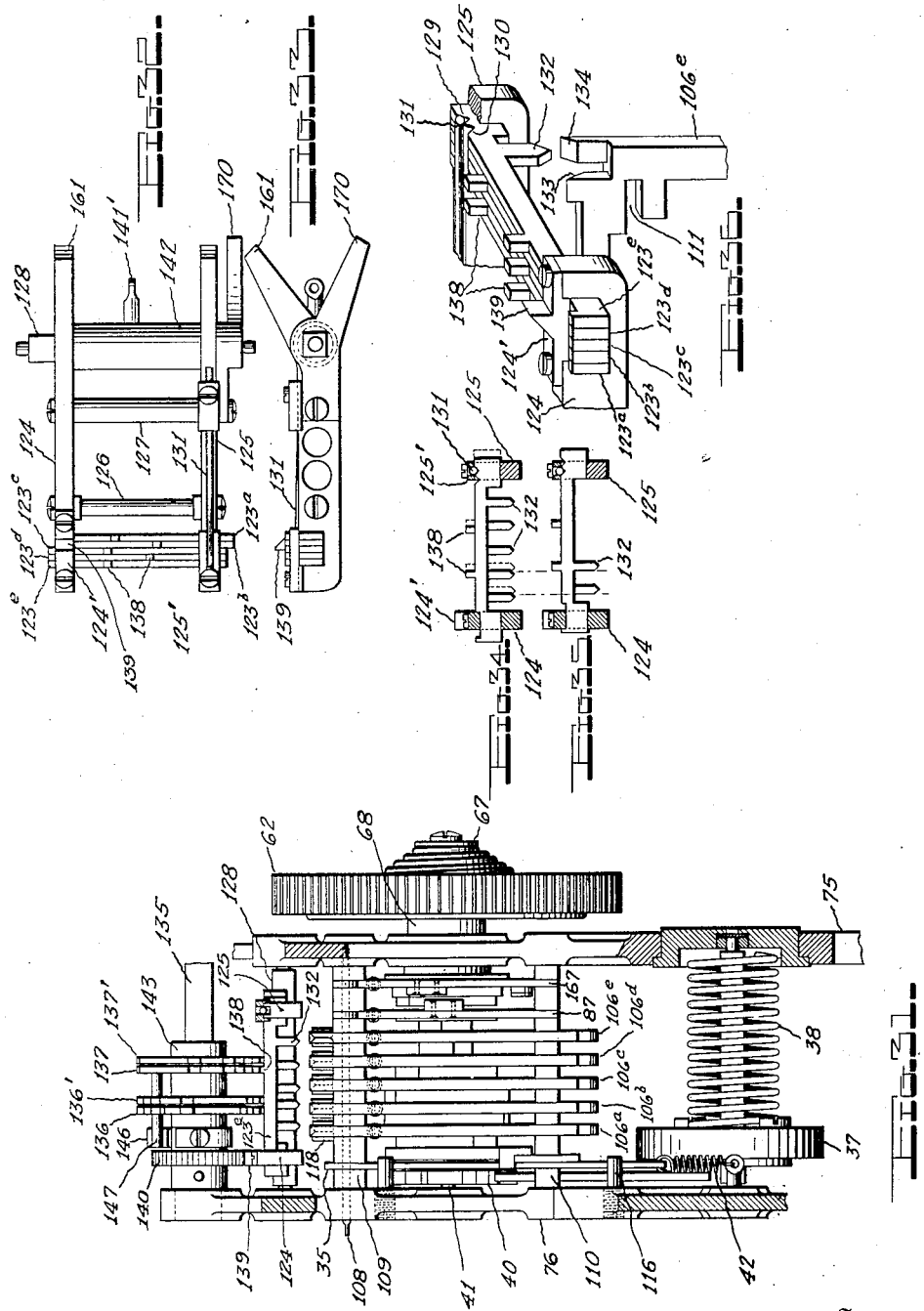

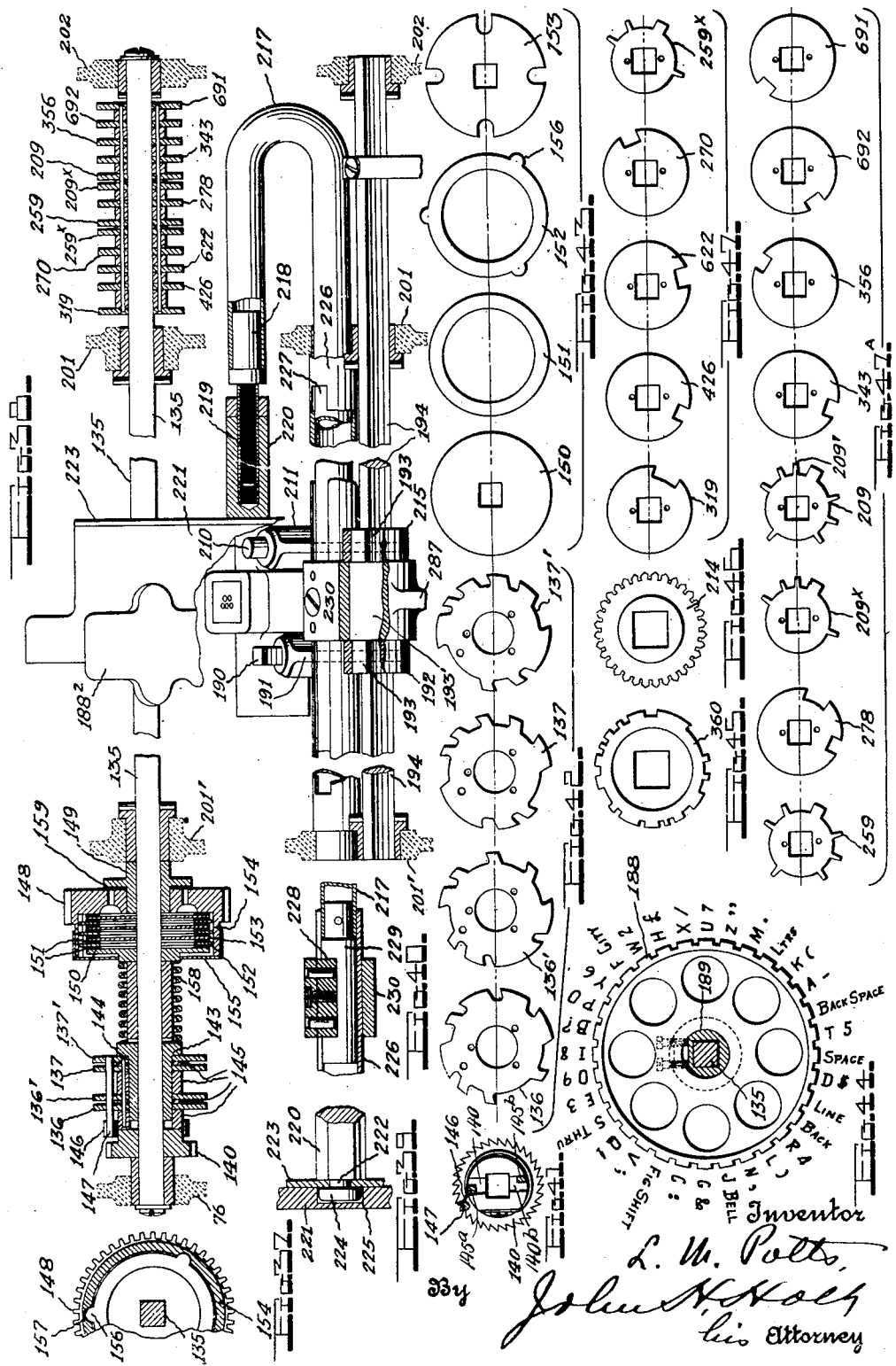

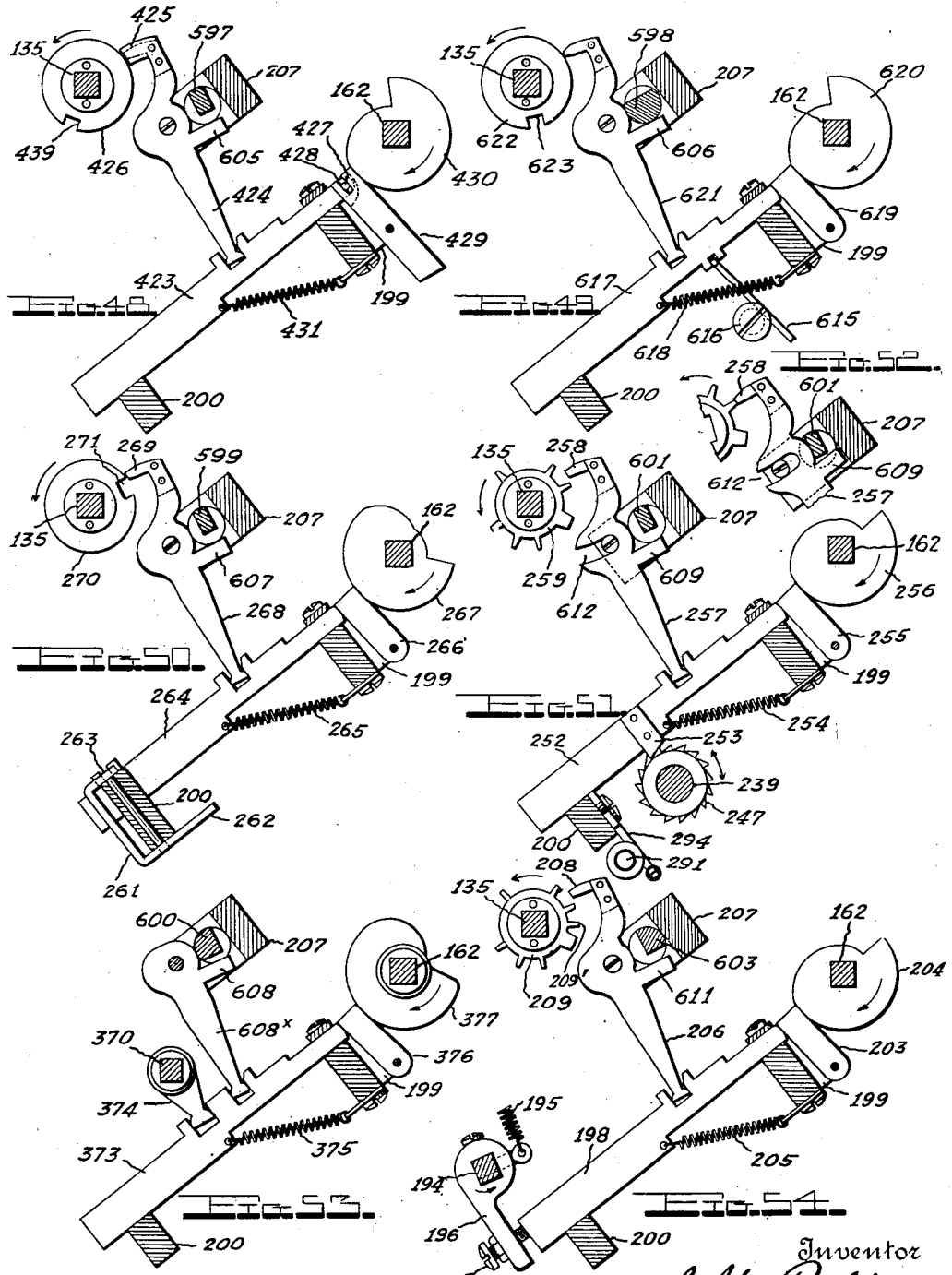

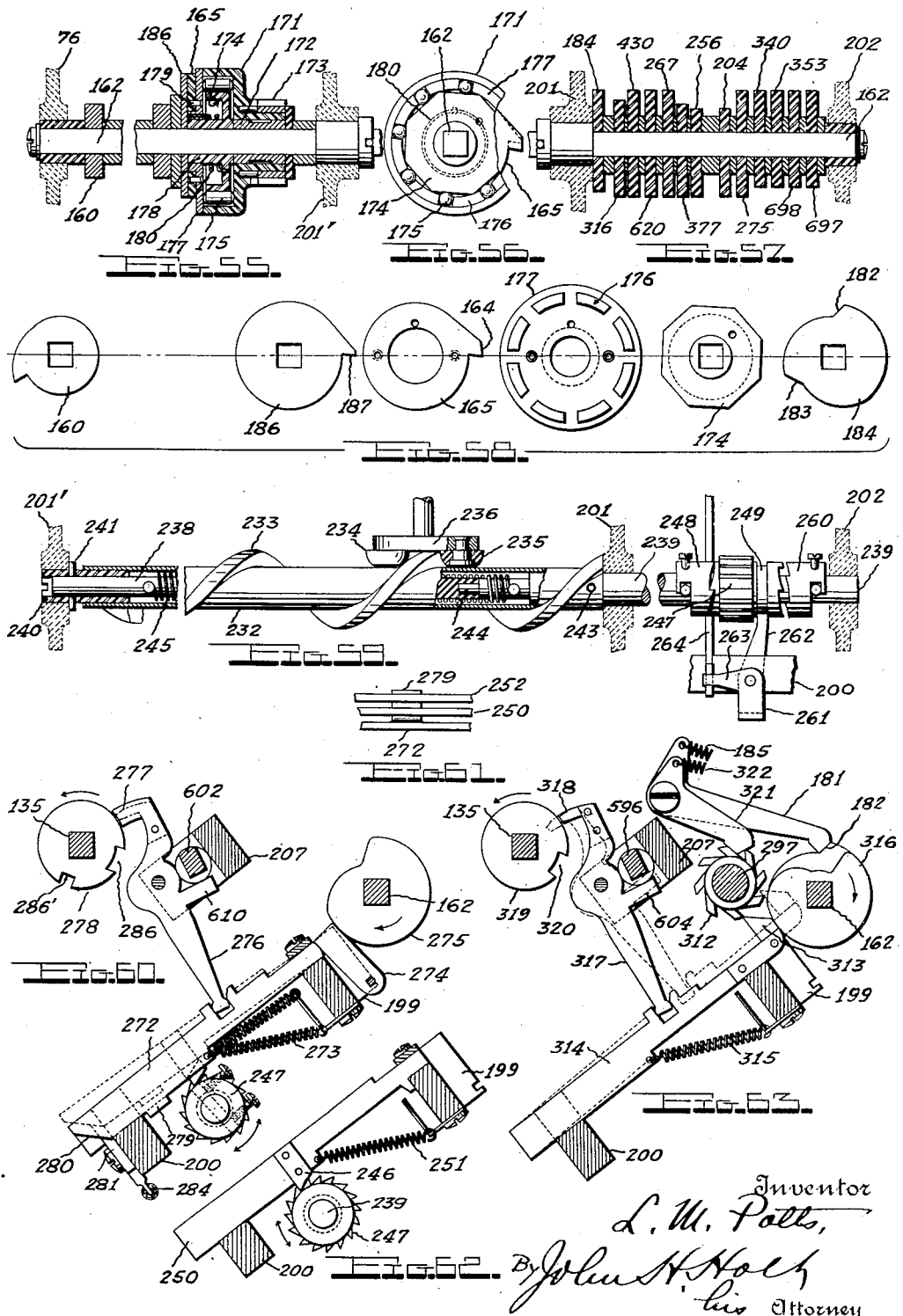

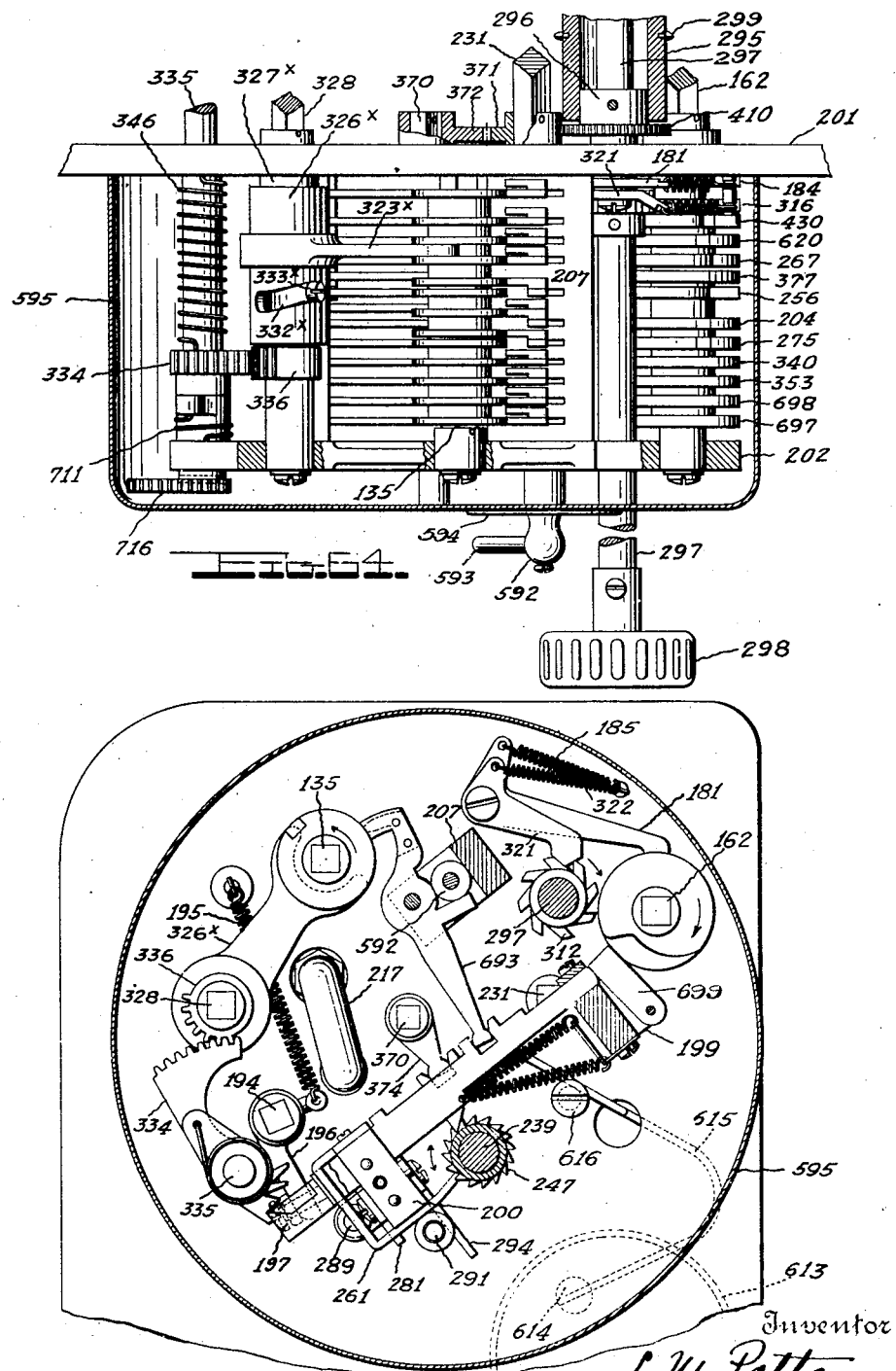

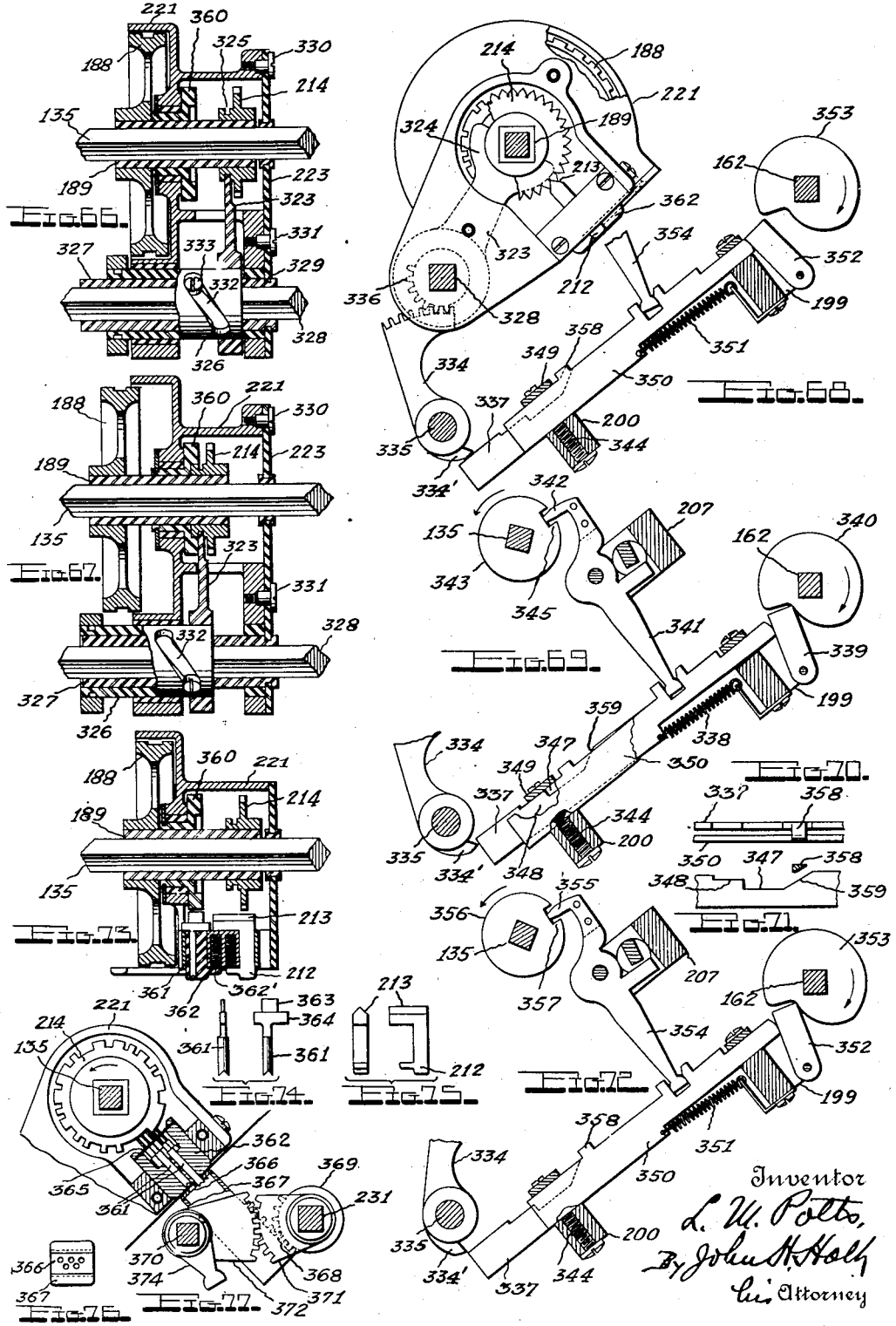
L. M. POTTS.
MACHINE TELEGRAPH.
APPLICATION FILED DEC. 14, 1915. RENEWED JUNE 2, 1920.
1,370,669.
Patented Mar. 8, 1921.
23 SHEETS—SHEET 13.

L. M. POTTS.
MACHINE TELEGRAPH.
APPLICATION FILED DEC. 14, 1915. RENEWED JUNE 2, 1920.
1,370,669.
Patented Mar. 8, 1921.
23 SHEETS—SHEET 14.
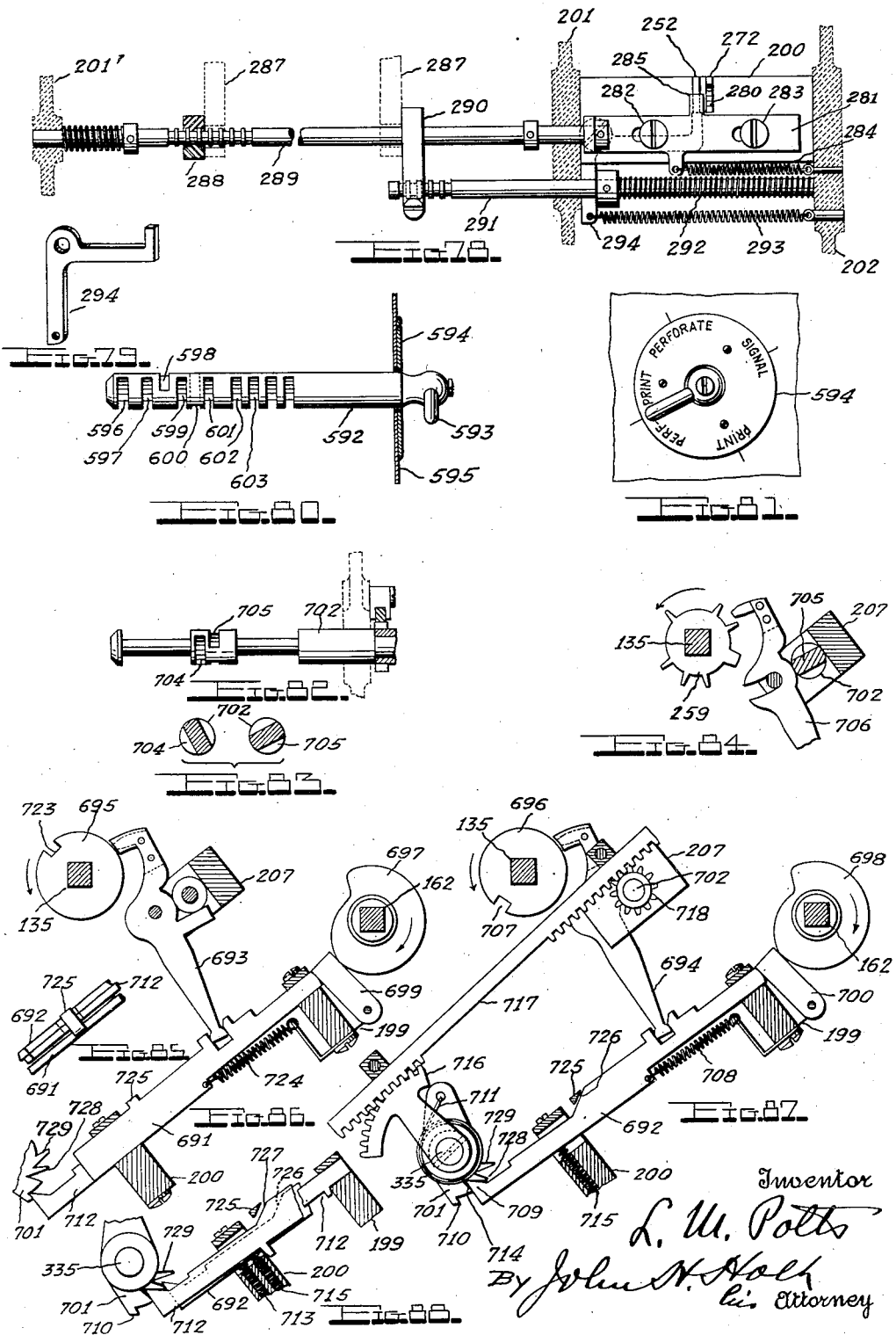

L. M. POTTS.
MACHINE TELEGRAPH.
APPLICATION FILED DEC. 14, 1915. RENEWED JUNE 2, 1920.
1,370,669.
Patented Mar. 8, 1921.
23 SHEETS—SHEET 15.
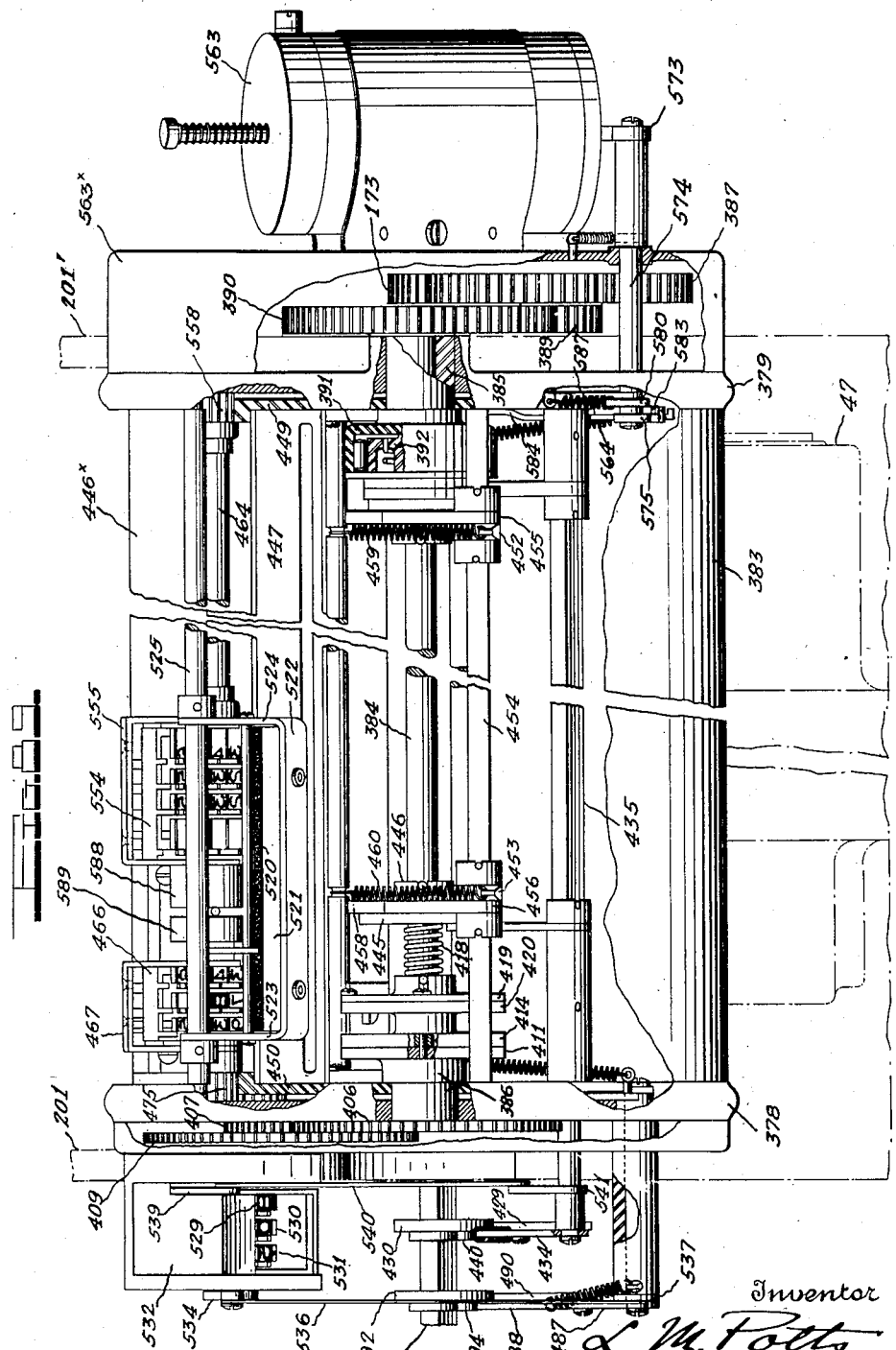
Inventor
L. M. Potts
By John H. Hall
his Attorney

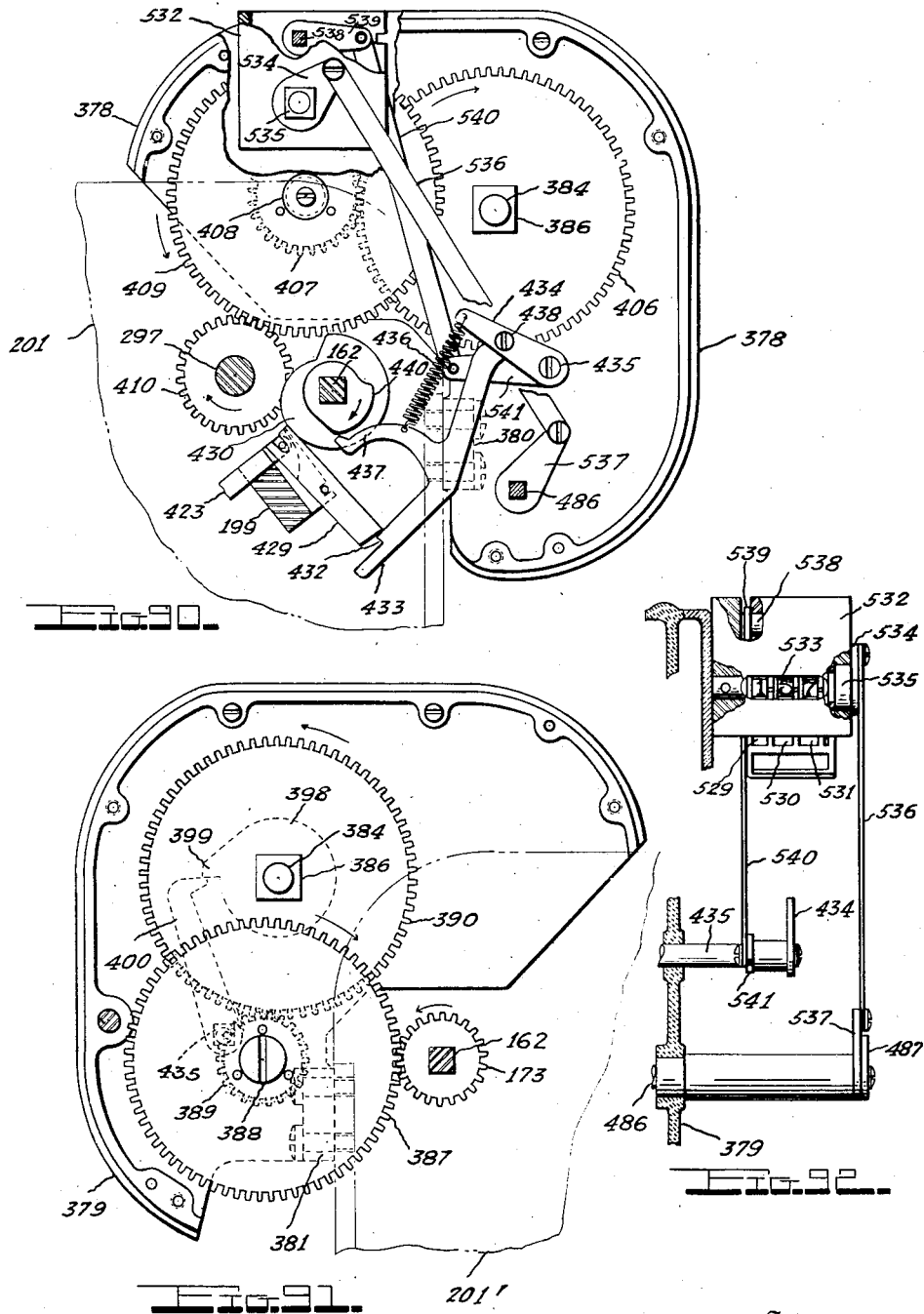

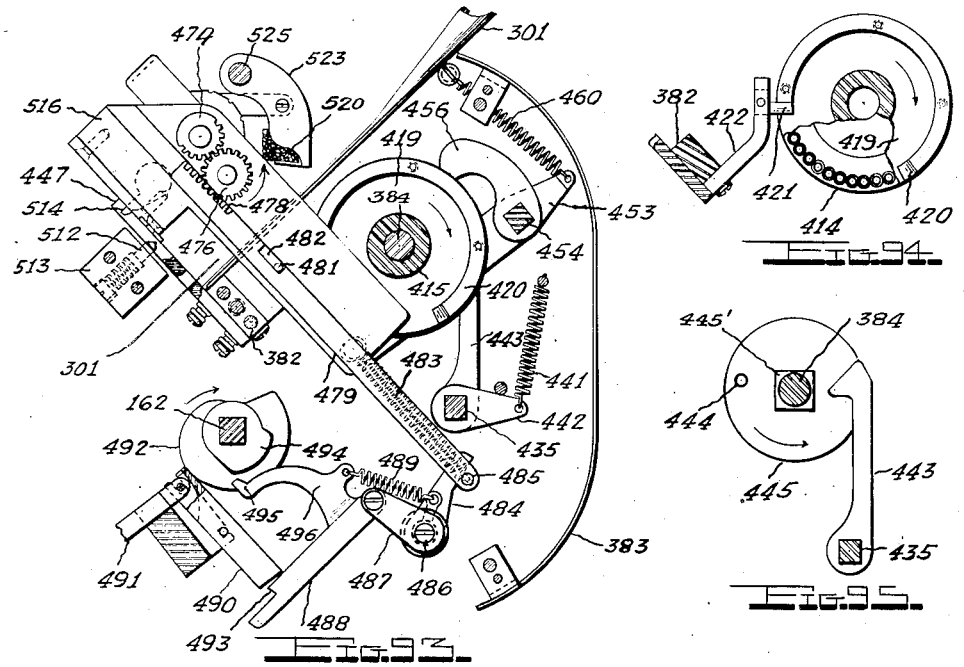

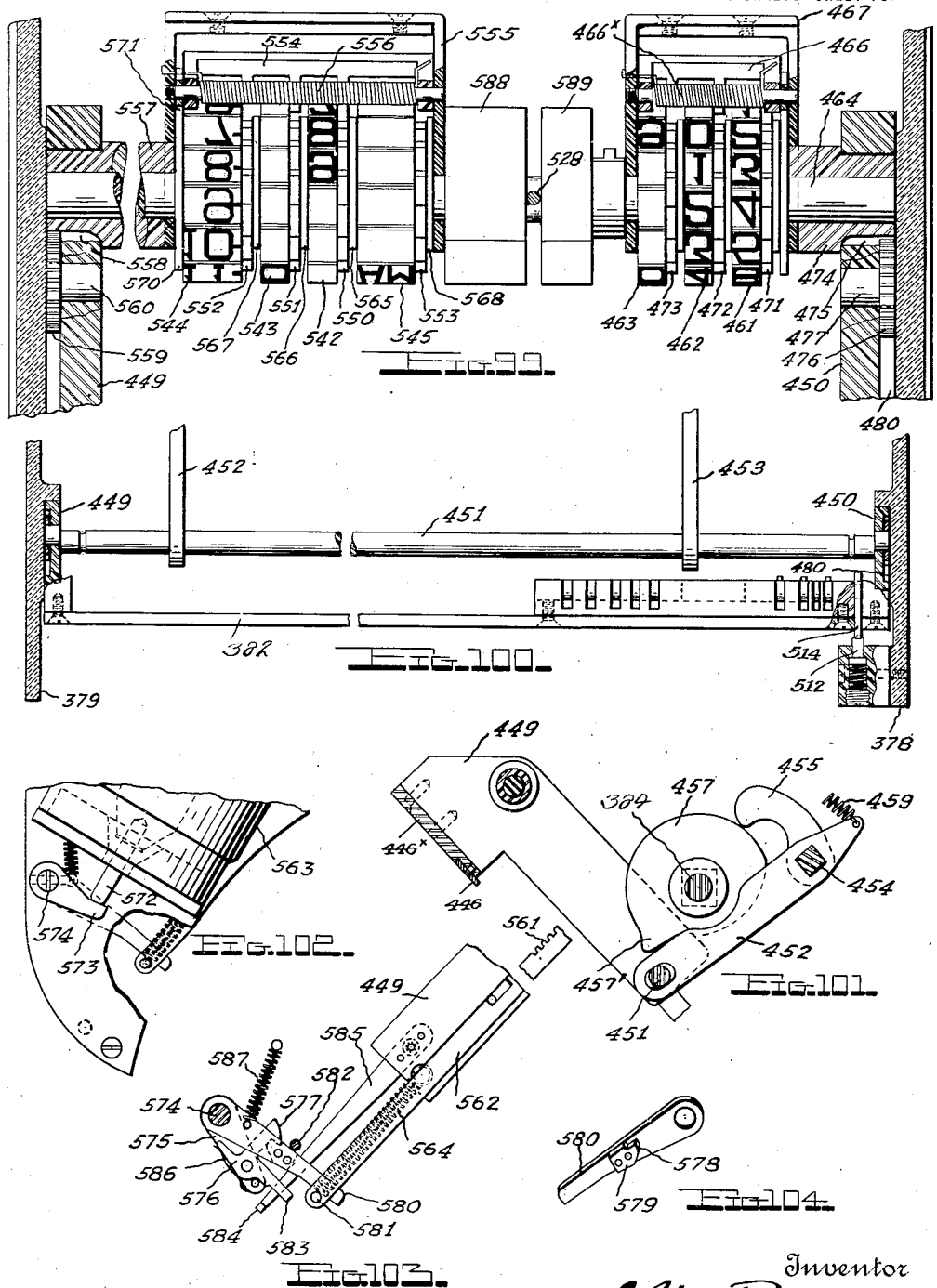

L. M. POTTS.
MACHINE TELEGRAPH.
APPLICATION FILED DEC. 14, 1915. RENEWED JUNE 2, 1920.
1,370,669. Patented Mar. 8, 1921.
23 SHEETS—SHEET 19.
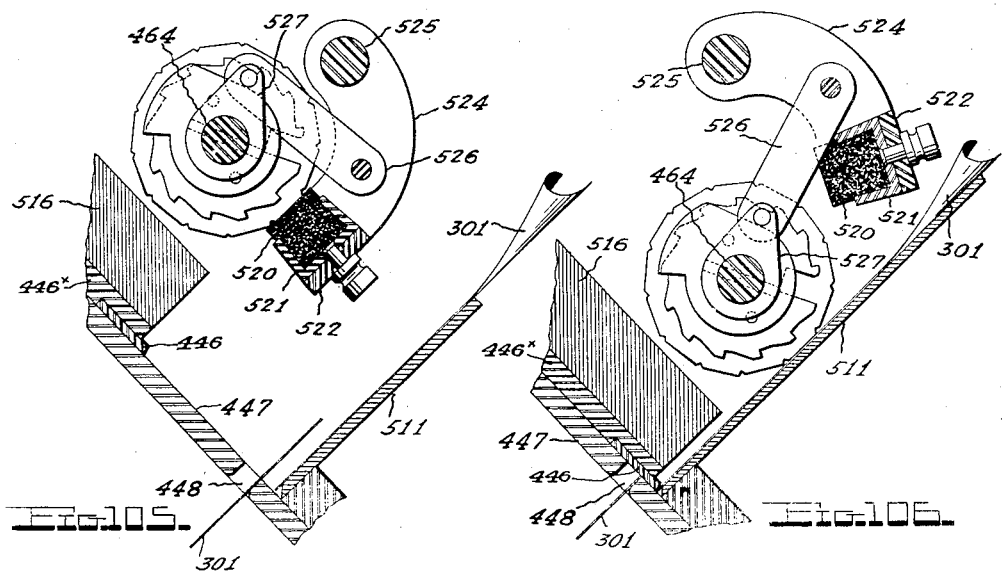
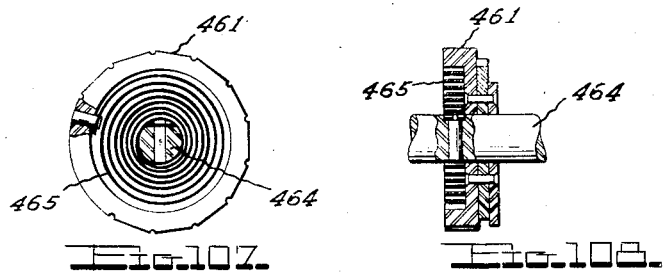
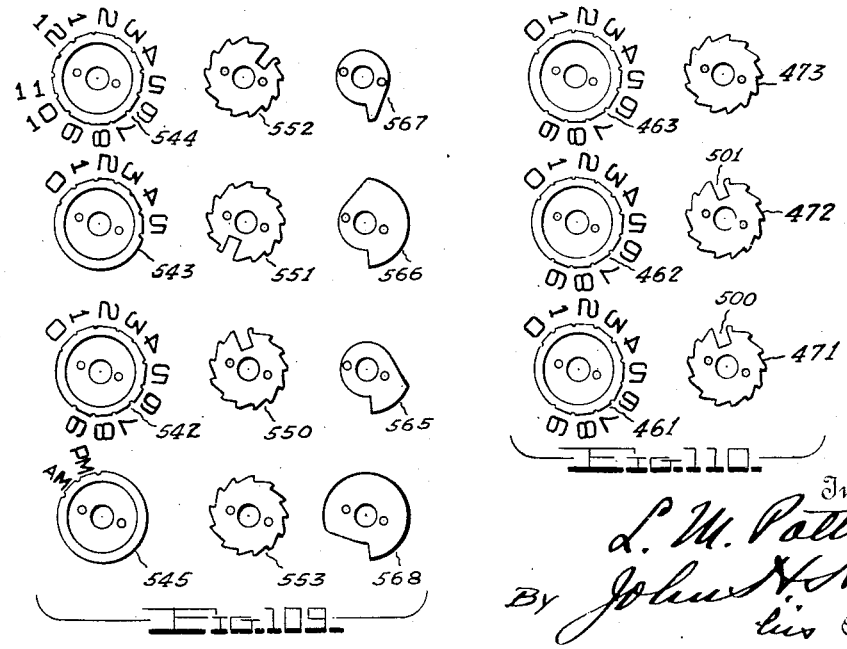

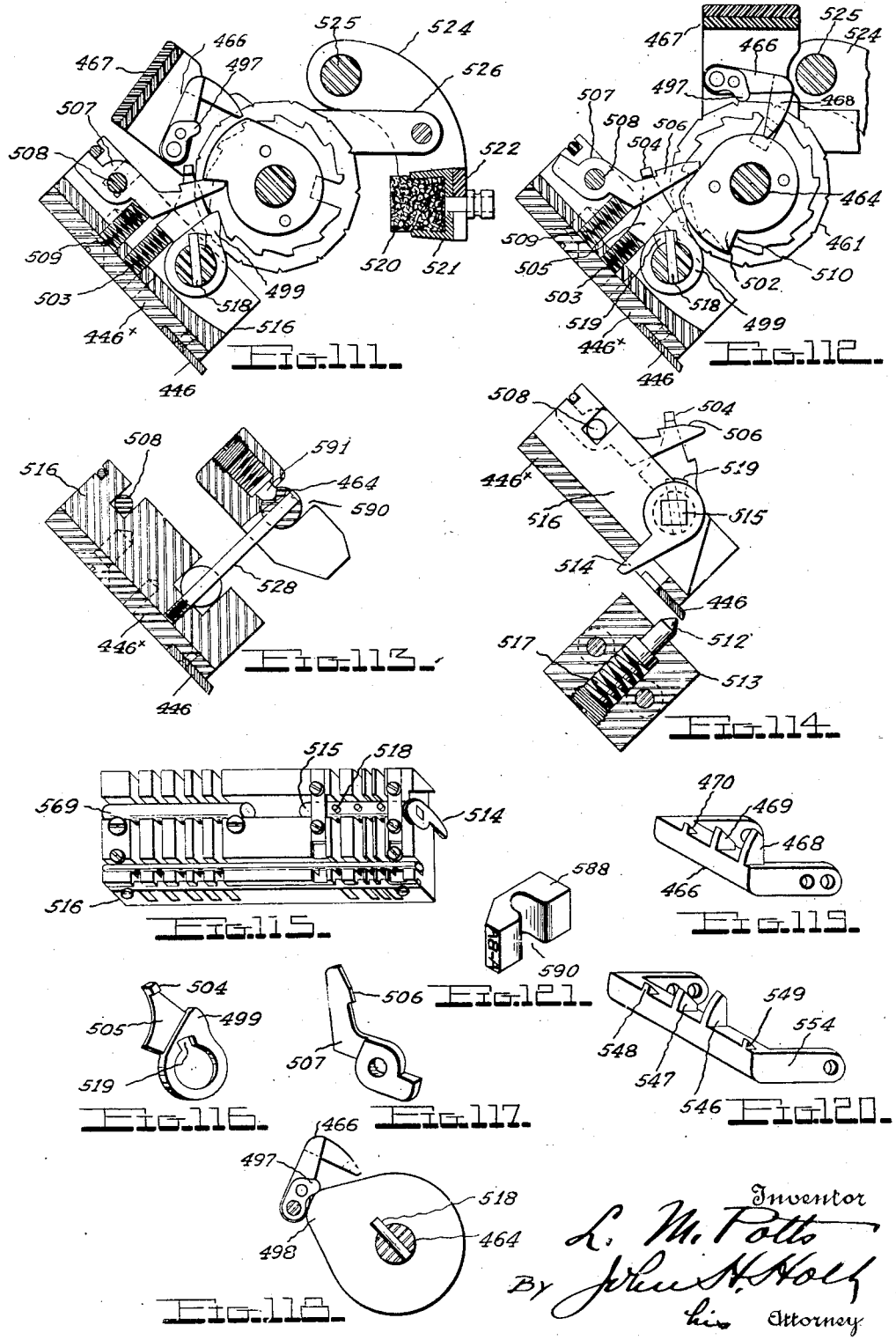

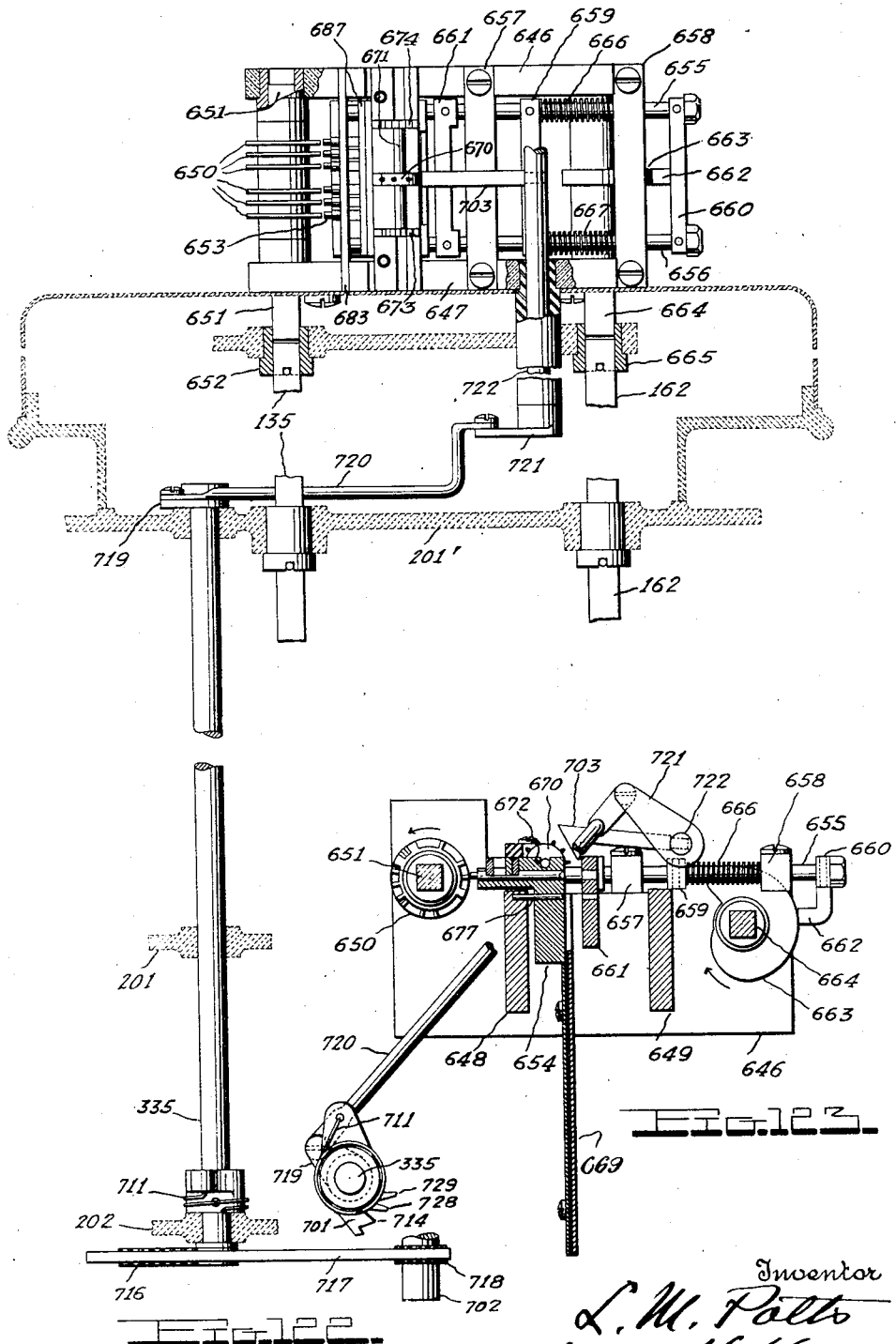

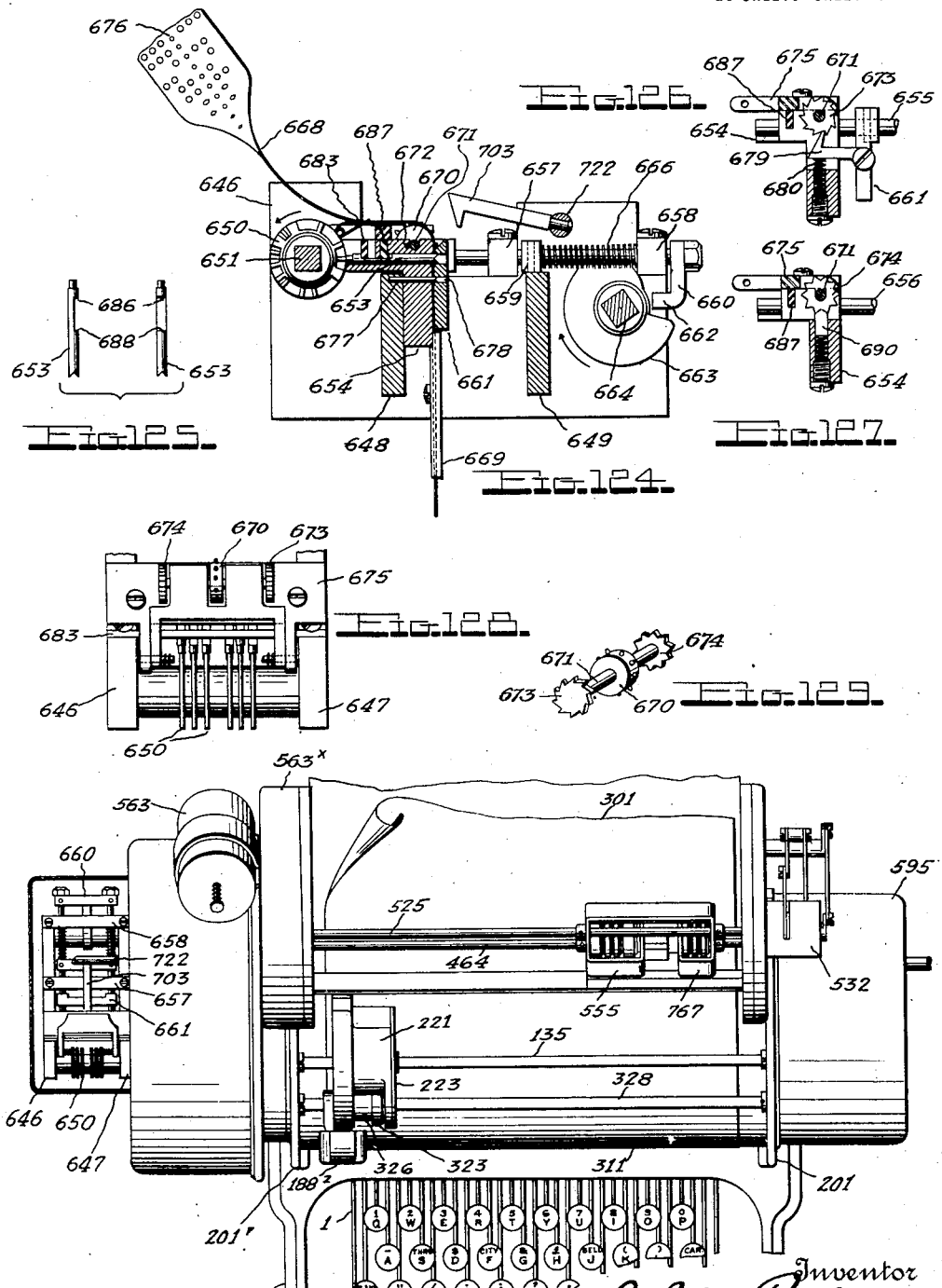

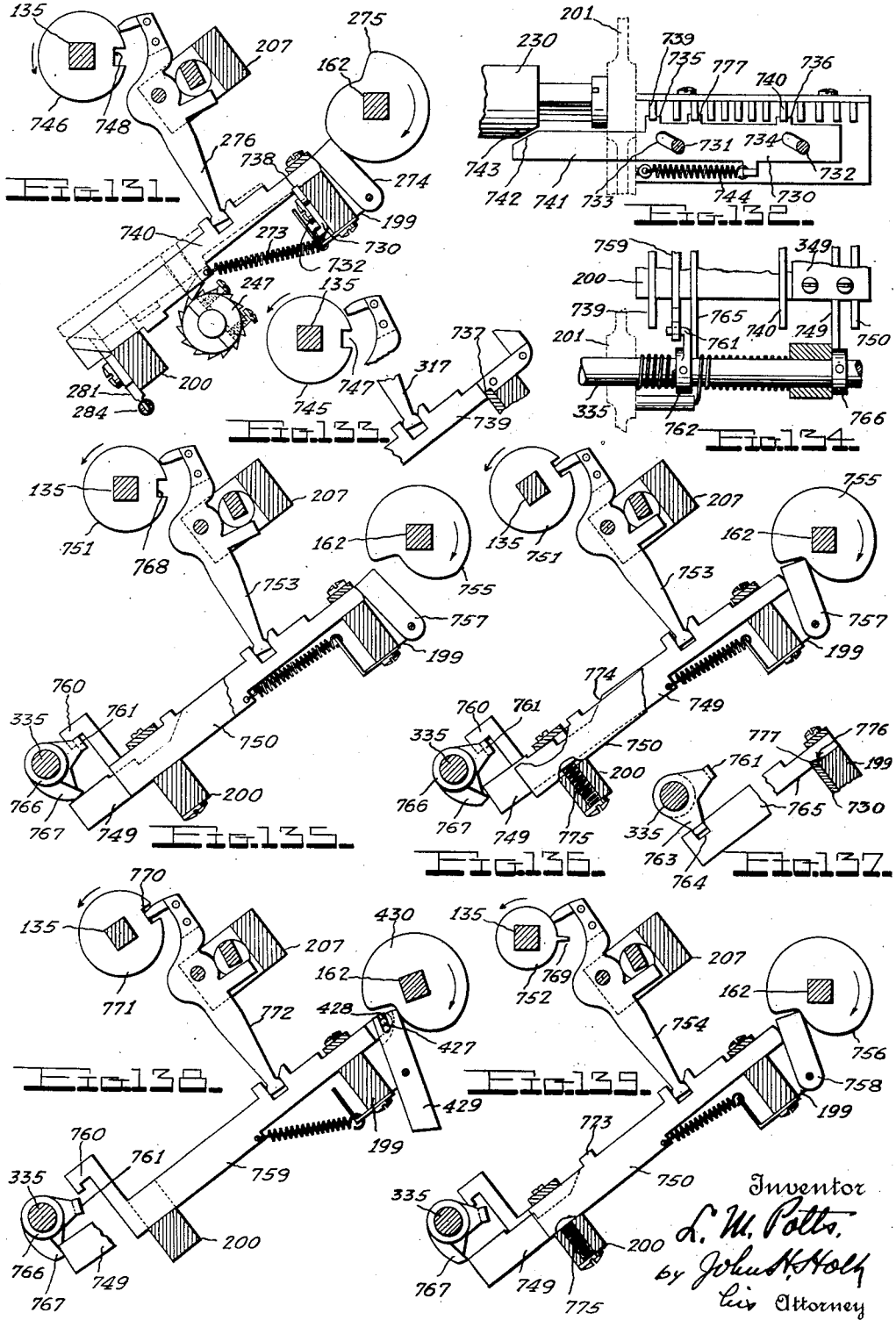

UNITED STATES PATENT OFFICE.

LOUIS M. POTTS, OF BALTIMORE, MARYLAND, ASSIGNOR, BY MESNE ASSIGNMENTS, TO AMERICAN TELEPHONE AND TELEGRAPH COMPANY, OF NEW YORK, N. Y., A CORPORATION OF NEW YORK.

MACHINE-TELEGRAPH.

1,370,669.  Specification of Letters Patent.  Patented Mar. 8, 1921.

Application filed December 14, 1915, Serial No. 66,830. Renewed June 2, 1920. Serial No. 386,142.

*To all whom it may concern:*

Be it known that I, LOUIS M. POTTS, a citizen of the United States, residing at Baltimore city and State of Maryland, have invented certain new and useful Improvements in Machine-Telegraphs, of which the following is a specification.

The primary object of this invention is to provide a machine telegraph wherein telegraphic traffic on present day circuits may be better and more expeditiously handled, and which adapts itself, as far as possible, to present methods of operation.

Commercial telegraph systems employ two general classes of circuits; trunk circuits, and collection and distribution circuits, the latter circuits often including several stations, in which event, they are known as way wires. Trunk circuits always connect what are known as main offices, and in some instances comprise submarine cables. Collection and distribution circuits usually extend from small stations to a main office, but sometimes, in the case of way wires, connect main offices.

Messages telegraphically transmitted to a main office are of two kinds: those intended for local delivery and known as "city" messages, and those intended for retransmission, and known as "through" messages.

According to the present practice, if the message arriving at a main office is a "city" message, it is received either upon a Morse sounder and transcribed manually by an operator, for outside delivery, or it is received directly upon a page printing receiver, according to the line equipment at the main office.

If the message is a "through" message to be retransmitted over a line equipped with an automatic transmitter in the main office, the message received in either of the forms above mentioned is turned over to another operator who manually operates a machine which records the message in perforations on a tape. This perforated tape then passes through an automatic transmitter which it controls, and whereby the message is retransmitted to another office.

Machines have been provided in some cases whereby, if this message is transmitted over a trunk circuit to another main office at which it is to be retransmitted over another trunk circuit, the transmitting operator at the first main office can send a signal which will set a machine at a second main office to perforate the message on a tape ready for retransmission over the second trunk circuit.

According to the general practice, transmission from small stations to main offices, or between such stations on way wires, is by Morse keys, and in practically all such cases, except on stock quotation circuits and at main offices, the reception is by Morse sounders.

In cable operation, the messages are always received upon a tape, generally in code form, but in some cases in printed form.

There are many inherent disadvantages in employing tapes either perforated for controlling automatic transmitters, or for receiving a printed record. The tape printing recorder, except in the reception of cable messages and on stock quotation circuits, is not used in this country. Wherever the messages are received in printed form in this country the page printer is employed.

It has been proposed by me to substitute page control for tape control in automatic transmission, and in U. S. Patents Nos. 942,844 and 1,105,920, I have disclosed means for accomplishing this, and in the latter patent I have disclosed a machine which will record the messages in page form in either printed characters alone, or in both printed characters and code perforations, and controllable to do either of these at the will of an operator. A machine of this type is therefore admirably adapted to main office work, for it may be used for the reception of either "city" or "through" messages, and in the latter case, produces a controlling form which may be most readily and expeditiously handled and rerouted. The mechanism disclosed in this patent, however, for determining which form of record the machine shall make, is locally controlled.

The system disclosed in the last of the above mentioned patents also provides for keyboard transmission. The method of line operation disclosed in said patent, however, is indirect; that is to say, it contemplates the use between the transmitter and its line, or between the receiver and its line, of certain distributing and selecting mechanism, specifically sunflowers and selecting relays. This method of line transmission is well adapted to trunk line operation, but as a general proposition for small circuits and way wires, the preferred method is direct line transmission without mechanism which is dependent upon continuous synchronism.

In an application for Letters Patent of the United States, Ser. No. 794,633, issued as Patent No. 1,229,201, I have shown and described a tape printing telegraph, having certain characteristics which make it specially adaptable for service on small circuits and way wires, in that it provides for direct keyboard transmission and is not dependent upon continuous synchronism; that is, it employs a start impulse which sets the timing mechanism into operation for each signal. This machine embodies other characteristics such, for example, as a single transmitting contact and a single receiving magnet, and capability to operate with a short signal which make it admirably adapted for use on present Morse circuits without any change in the line equipment other than the substitution of said machine for the Morse keys and sounders.

In another application for Letters Patent of the United States, Ser. No. 811,035, issued as Patent No. 1,229,202, I show and describe a machine embodying in a page printing telegraph receiver of the rotating type wheel class, the characteristics mentioned in the next preceding paragraph.

The present invention goes further and provides a machine telegraph which, aside from certain novel features of a more or less detail character, provides for taking care of certain operating conditions, both in main offices and smaller offices and on way wires which have not hitherto been met in a machine telegraph. Take the case, for example, of "city" and "through" messages arriving at a main office. The present invention provides in one machine mechanism which may record messages in printed page form alone for immediate delivery, thus adapting it for use in the reception of "city" messages; which may record the massages both in printed characters and code perforations in page form, thus adapting it for the reception of "through" messages which are to be retransmitted over lines having page controlled automatic transmitters; or, which may record the messages in perforations upon a tape alone, or both upon a tape and upon a page, and in which the code perforations on the tape may be the same or different from the code in which the message is transmitted to the machine, thus adapting it for use also in the reception of "through" messages in offices where some of the transmitters are page controlled, and others tape controlled, and the provision of means whereby such a machine may be selectively controlled by signals to operate in any one of the above mentioned ways.

The present invention also provides for the operation of perforating receivers by direct keyboard transmission employing a start impulse and independent of continuous synchronism, thereby providing means whereby the Morse keys now employed at small offices may be replaced by keyboards employed to transmit "through" messages to be prepared in perforated form directly at the main or receiving office.

The invention also provides certain improvements particularly adaptable for use on circuits upon which there are several stations, as upon a way wire. According to present methods of way wire operation, all of the receiving instruments on the line are subject to call from any of the stations, and if an operator desires to transmit a message to a given station, he sends to that station, before transmitting the message proper, a call signal. The present invention provides a machine telegraph wherein there may be located at each of these stations a recording machine equipped with a call signal and apparatus for transmitting th same from a keyboard, and whereby any station can be picked out and the message recorded at that station only, and yet any other station on the line can be called at any time, or whereby the operator at any such machine may call the operators at two or more stations on the line simultaneously, thus providing a selective calling system for calling any station desired.

The invention further provides in such machines a lockout mechanism whereby the operator may lockout the recording mechanism and set his machine for a call signal only, and whereby when any operator receives a call signal, he may set his machine to either print the message alone, or record it in printed and perforated form, or in perforated form alone. At a way station, it would generally be sufficient for the machine to print alone, but in the case of a machine located at the end of a way wire terminating in a main office, it is important to have it perforate as well as print.

The present invention provides also an arrangement particularly useful on circuits including a number of stations, and worked according to the closed circuit method, whereby whenever the line is permanently closed, that is not in use, the machines are automatically stopped or prevented from operation, and whenever the operator at any station opens the line to transmit, all of the machines on the line are rendered operative, and remain so as long as signals are being sent, but become inoperative when the line is permanently closed, a condition analogous to the present Morse practice whenever an operator at a way station closes or opens his line switch.

It is the present custom, when page printing receivers are employed in connection with perforated tape transmission, to separate consecutive messages by ten or twelve blank spaces on the tape to allow time for the receiving operator to locally feed out the completed message to remove it from the machine and place a new blank in position for the next message. These blank spaces on the tape represent waste of line time, and therefore reduce the efficiency of operation. According to my invention, a special signal starts into operation mechanism which automatically feeds out the completed message, cuts it off, and places a new blank in position for the next message, and occupies the time of only one or two line signals.

It is the usual practice to give consecutive numbers to messages transmitted on a given circuit. These numbers are used for two purposes, but primarily to prevent the loss of messages. Number sheets which contain consecutive numbers are provided for both the sending and receiving operators, and after a message is transmitted, it is checked off by the transmitting operator on his sheet, and after the message is received, it is checked off by the receiving operator on his sheet. Thus duplication of numbers, or omission of numbers, on the receiver's sheet will indicate the repetition or loss of a message. Another use of these numbers is to identify messages in case of inquiries regarding errors, etc. Such a system is admirable as a safeguard when messages are manually transmitted, since it is comparatively easy to give messages consecutive numbers. However, when automatic transmission is used, and particularly when a message is to be retransmitted, and is received in perforated form for automatic retransmission, it is impossible to give consecutive numbers to messages at the receiving station without either great delay or complication of mechanism. The messages to be retransmitted in a large office are passed in all sorts of combinations from one circuit to another, so that if this numbering system were followed, it would be necessary to either perforate numbers in the messages after they are received, or to have some other means for transmitting numbers between messages.

It is also customary to indicate on the blank of a received message, usually in handwriting, but sometimes by the use of a manually operated time stamp, the time of its reception, and also for each message to be accompanied by what is known as a check, usually in the preamble of a message. This check indicates the number of words in the body of a message. Each receiving operator is expected to count the number of words in the message received and see that it corresponds exactly with the check number. There is frequently a question whether a given word is a single word, or two words, and this in itself is a source of much trouble. Even in the case of printing telegraph receivers, as at present employed, much time is consumed by attendants in counting the words in received messages.

It is also customary to have appear on the blank of a received message an indication of the circuit over which the message was transmitted, and also of the office from which it was sent, and also a sign identifying the operator or attendant who received the message. These are generally in the form of single letters or combinations of letters of the alphabet.

According to my invention, it is proposed to provide each transmitting and receiving machine with a time stamp which automatically stamps upon both the home copy, and the received copy, a time when the message is completed. This designation serves two purposes; it times the message, which also provides a means of identifying messages, and performs the function now performed by the consecutive numbers on telegrams. Each message by this means will have stamped upon it a different time, thus identifying the message, and at intervals service messages may be transmitted giving the number of messages transmitted between certain times, thus guarding against lost or repeated messages.

My invention also contemplates providing each keyboard at each receiving machine with a counting device which counts the number of signals transmitted or received. Each such counting device is provided with a means for visually noting the number registered, and also with printing wheels which automatically record on the message blank the number registered when the message is completed. In this case, the keyboard operator at the originating station notes the number registered by the visual counting mechanism when she has completed the signature to the message. She then transmits this number so that it will appear on the received message just after the signature. The receiving machine will also print on the same blank the number of characters actually received, and a comparison of the two numbers will indicate whether any signals have been lost or added in transmission.

In the specific mechanism above referred to, I have assumed that the mechanism employed for counting may be employed for words or other signals. By such a method, the receiving operator is relieved of a large part of her work, and it will be possible to either operate the receiving machine at a higher rate of speed, or to assign more than one receiving machine to a single operator, thus increasing her efficiency. The accuracy of the checking will also be increased, since it is largely automatic.

As to the circuit and operator identifying marks, it is the usual custom to have the operator write these in the message, and sometimes they are impressed thereon by means of a hand stamp. According to my invention, they are printed on the message automatically.

My invention also provides means for operating a page printing telegraph receiver by signals which are not essentially paging signals. While not necessarily confined to such use, this phase of the invention is particularly useful in cable operation. Cable messages as a rule are received on a siphon recorder, which records them in code form on a tape, and these messages are transcribed manually by operators skilled in reading these tapes. It is the practice in some cases, however, to record such messages directly in printed tape form, but owing to the extra signals required, it has not been regarded as practical to record such messages directly in printed page form. The present invention provides a machine, as stated above, whereby these paging operations may be performed by signals which are not necessarily paging signals; that is, by utilizing signals which are ordinarily used for printing in a single line, such, for example, as the spacing signal.

In addition to the foregoing, my said invention comprises various other features, many of which relate more or less to details, and all of which will be herein described and then particularly pointed out in the claims.

The automatic switch mentioned herein forms the subject of a divisional application, Serial No. 288,841, and the friction clutch forms the subject of a pending application, Serial No. 288,844.

In order to more particularly describe my invention, reference will be had to the accompanying drawings wherein:

Figure 1 is a face view of a telegraphic blank containing a message and other data printed and perforated thereon by the machine herein described;

Fig. 2, a diagram of the combinations employed in this machine for the various signals;

Fig. 3, a current diagram indicating two of the signals on the line;

Fig. 4, a front elevation, with parts broken away, of one form of the machine, with the blanking keyboard counting and tape perforating mechanisms omitted;

Fig. 5, a fragmentary vertical section of the machine shown in Fig. 4, taken near the left-hand end of the machine;

Fig. 6, a fragmentary detail view showing the springs for returning the key levers to normal;

Fig. 7, a fragmentary vertical sectional elevation of the machine shown in Fig. 4, taken near the right-hand end of the machine;

Fig. 8, a detail horizontal section of the motor drive or transmission;

Fig. 9, a fragmentary section of details relating to the perforating mechanism;

Figs. 10 and 11 are detail elevations partly in section, viewed in planes at right angles to each other, and showing particularly the transmitting mechanism of the selector;

Fig. 12, a detail view of the key locking mechanism;

Figs. 13 and 14, details of the slow start mechanism;

Fig. 15, a diagram of the motor cut off;

Fig. 16, a fragmentary side elevation partly in section showing particularly the receiving selector mechanism;

Fig. 16a, a detail of the motor cut off mechanism;

Fig. 17, a detail illustrating one of the operating positions of one of the receiving selector levers, and coöperating parts;

Fig. 18, details of the mechanism for starting the timing device into operation, and showing portions of the motor cut off mechanism;

Fig. 19, details of the mechanism for starting the main cam shaft;

Figs. 20, 21 and 22, details of the selector magnet armature and parts carried thereby;

Fig. 23, a detail view partly in section and elevation of the clutch for driving the escapement shaft, and showing various parts mounted on said shaft;

Fig. 24, a detail of the slow start sleeve carried on the escapement shaft;

Fig. 25, a detail of the thrust bearing associated with the escapement clutch;

Figs. 26 and 27, details of the slow start mechanism;

Fig. 28, a view showing in side elevation the escapement wheel and various cams mounted on the escapement shaft to show the relative setting of these parts on said shaft;

Fig. 28a, a continuation of Fig. 28;

Fig. 29, a view showing inside elevation the relative angular positions of cams mounted on the slow start sleeve of the escapement shaft;

Fig. 30, a diagram to illustrate way wire operation and the use of the call signal hereinafter described;

Fig. 31, a fragmentary side elevation partly in section of the receiving selector mechanism;

Figs. 32 to 36, inclusive, details of the interlocking combination device of the receiving selector;

Fig. 37, a fragmentary detail section of the friction clutch for driving the type wheel shaft;

Fig. 38, a fragmentary horizontal section partly in top plan, showing, among other parts, the type wheel shaft drive, the mounting of the control disks on the type wheel shaft and the connection between the print hammer and type wheel carriages;

Figs. 39 and 40, details of the connection between the print hammer and type wheel carriages;

Fig. 41, a side elevation of the stop ratchet for the type wheel shaft;

Fig. 42, a view showing in side elevation the four combination disks of the interlocking combination device, and showing the relative angular setting of these disks on their support;

Fig. 43, a view showing in side elevation various members of the type wheel clutch;

Fig. 44, a side elevation of the type wheel;

Fig. 45, a side elevation of the punch selector disk;

Fig. 46, a side elevation of the type wheel correcting disk;

Figs. 47 and 47ª, side elevations of the various slide control disks of the type wheel shaft to show the relative setting of these disks on their support;

Fig. 48, details of the blanking slide and control mechanism;

Fig. 49, details of the signal bell slide and control mechanism;

Fig. 50, details of the back spacing slide and control mechanism;

Figs. 51 and 52, details of the space slide and control mechanism;

Fig. 53, details of the perforating slide and control mechanism;

Fig. 54, details of the print slide and control mechanism;

Fig. 55, a detail section of the main cam shaft clutch and associated parts;

Fig. 56, a fragmentary detail view in end elevation with parts removed, of the clutch shown in Fig. 55;

Fig. 57, a fragmentary detail section of the various cams on the main cam shaft for operating the control slides;

Fig. 58, a view showing in side elevation various cams associated with the clutch shown in Fig. 55, and also parts of said clutch;

Fig. 59, details of the mechanism for imparting travel to the type wheel and print hammer carriages;

Figs. 60 and 61, details of the carriage return slide and control mechanism;

Fig. 62, details of the spacing stop ratchet;

Fig. 63, details of the lining slide and control mechanism;

Fig. 64, a detail fragmentary horizontal section taken through the casing which incloses the various control slides, and showing these slides in top plan, together with their more immediately associated parts;

Fig. 65, a vertical section taken through the casing shown in Fig. 64, and through a portion of the parts inclosed therein;

Figs. 66 and 67, details of the type wheel carriage and shift mechanism;

Figs. 68 to 72, inclusive, details of the type wheel shift control mechanism;

Figs. 73 to 77, inclusive, details of the page punching mechanism;

Fig. 78, details of the carriage return release mechanism, and the safety mechanism for spacing;

Fig. 79, a detail perspective view of the safety lever shown in Fig. 78;

Figs. 80 and 81, details of the local control lockout mechanism;

Figs. 82 to 88, inclusive, details of the distant control lockout mechanism;

Fig. 89, a top plan view partly in section of the blanking, counting and time recording mechanism;

Fig. 90, details of the blanking and counting mechanism;

Fig. 91, details of the blanking mechanism;

Fig. 92, details of the visual counting mechanism;

Figs. 93 to 98, inclusive, details of the blanking mechanism;

Fig. 99, an enlarged detail fragmentary view partly in section of the counting and stamping mechanism;

Figs. 100 and 101, details of the blanking and stamping mechanisms;

Figs. 102 to 104, inclusive, details of the operating mechanism of the time stamp;

Figs. 105 and 106, enlarged details of the blank cutting and stamping mechanism;

Figs. 107 and 108, enlarged details of the number wheels of the counting stamp mechanism;

Fig. 109, details of the number wheels and associated parts of the time stamp mechanism;

Fig. 110, details of the number wheels and associated parts of the counting stamp mechanism;

Figs. 111 and 112, enlarged details of the counting stamp mechanism;

Fig. 113, enlarged details of the identifying stamp mechanism;

Fig. 114, enlarged details of the counting stamp returning to zero mechanism;

Fig. 115, details of the counting and time stamp mechanism;

Figs. 116 to 119, inclusive, details of the counting stamp mechanism;

Fig. 120, an enlarged perspective view of a detail of the time stamp mechanism;

Fig. 121, an enlarged perspective view of a circuit identifying plug;

Fig. 122, a top plan view of the tape perforating mechanism in connection with parts of the distant control lockout mechanism;

Fig. 123, a vertical section of said mechanisms;

Fig. 124, another vertical section of said tape perforating mechanism, showing the parts in a different operating position;

Figs. 125 to 129, inclusive, details of the tape perforating mechanism;

Fig. 130, a fragmentary top plan view of the machine, partly in section, with the tape perforating, blanking, time and counting stamp and visual counting mechanisms, and Figs. 131 to 139, inclusive, details of the slides and slide control mechanisms for performing paging operations with signals which are not necessarily paging signals.

*The transmitting mechanism and signals.*

The transmitting mechanism in the form shown in the accompanying drawings comprises, among other parts, a keyboard consisting of a plurality of keylevers 1, pivotally mounted upon a cross-support 2, forming a portion of the casting constituting the base 3, of the machine. (See Figs. 4 and 5).

The key tips of levers 1 bear designations of the various characters and signals to be transmitted and are preferably arranged according to standard typewriter practice. In addition to the key tips 4, the usual space bar 5 is provided.

Extending transversely across the keylevers adjacent their ends opposite the key tips, are a plurality of horizontal slide bars 6, 6$^a$, 6$^b$, 6$^c$, 6$^d$, and 6$^e$, mounted at opposite ends in individual slots in two upright supports 7. Slide bars 6$^a$—6$^e$ are adapted to be shifted longitudinally in various combinations by the engagement of the key levers with cams 8 on said bars. To shift elements in various combinations in this way is well known in the art, so need not be further described here.

The transmission here employed is based on the five unit or Baudot code, by which is meant that each signal interval is divided into five unit impulse periods which we will call the $a$, $b$, $c$, $d$ and $e$ impulse periods, the signals being formed by combining impulses corresponding respectively to these periods as indicated, for example, in Fig. 3, where two complete signals are shown, one made up of a combination of the $b$ and $c$ impulses, and another of the $c$ and $e$ impulses. These are the code impulses. For each signal there is also a start impulse indicated by $s$ in Fig. 3, and between the $e$ impulse of each signal and the start impulse of the next succeeding signal there is inserted, in continuous transmission, a period of lag indicated by L, and which will be described in greater detail later. Where two impulse periods are adjacent, the current corresponding thereto merges and forms one elongated impulse as shown.

Slide bar 6 is for the transmission of the start impulse and is therefore operated by each of the key levers. This bar therefore has a cam corresponding to cams 8 on its lower edge for each key lever.

The key levers are returned to normal under the action of individual compression springs 9, and the slide bars 6—6$^e$ are returned by the key levers engaging cam faces 10 slanting in an opposite direction from the cam faces which send the slides forward.

On the operation of any key, or the space bar, start slide 6 will be shifted to the right (Fig. 11). This imparts angular movement to a start lever 11, fulcrumed on a stationary supporting bracket 12, and engaging at its lower end a slot in the upper edge of start slide 6. The upper end of lever 11 normally lies behind a toe 13 on the lower end of a lever 14, as in Fig. 13, so as to cock the lower end of the latter lever outward, or to the right, against the tension of a spring 15. When start lever 11 is rocked by slide 6 on the depression of a key, its upper end will be thrown from behind toe 13, thus permitting spring 15 to pull the lower end of lever 14 to the left, as in Fig. 14. When this occurs, an offset or lip 16 on lever 14 will engage and carry to the left the lower end of a lever 17. This latter lever has a cam or shoulder 18 which, in the normal position of the parts, rests, as shown in Fig. 13, against the end of a cam 19, so that when the lower end of said lever is thrust to the left (Fig. 13), it will turn on said cam as a fulcrum, its upper end being thrust to the right. The upper end of lever 17 is in constant engagement with a horizontal bar 20 fast to a plunger 21 slidably mounted in a tube 22 rigidly mounted in a block 23 of insulating material rigidly secured to the selector frame (see Fig. 10). The outer end of this plunger is provided with an insulating tip 21' against which is held a contact lever 24 under constant tension of a spring 25. Fast to one face of lever 24 is a spring 24' to which is rigidly secured a contact 26 which passes through an opening in lever 24, as shown in Fig. 14, and is adapted to make and break contact with an adjustable stationary contact 27. The reason for mounting contact 26 on spring 24' is to permit the lever 24 to move toward contact 27 after contact 26 has engaged contact 27, to prevent jamming. The movement of lever 17 to the right (Fig. 14), as described, acts through bar 20 to send contact 26 into engagement with contact 27, and to thus transmit the start impulse. It will not be necessary here to describe the electric circuit of this impulse further than to say that the contacts 26 and 27 may be considered in a circuit which includes an electro-magnet 28. (See Fig. 16). Magnet 28, on being energized by the start impulse, will pull up its armature 29, against tension of spring 30, whereupon an extension 31 (Figs. 20-22) fast on said armature and normally lying beneath a downwardly extending toe 32 (see Fig. 18) of a lever 33, will cause said lever, acting against an offset 34 on a vertically movable stop slide 35, to remove the lower end of the latter from engagement with a stop member 36 fast to a balance 37, and release the latter, whereupon it will oscillate under the control of balance spring 38. The oscillation of this balance controls, through the medium of an anchor 39 and escape wheel 40, the step-by-step movement of a shaft 41. This shaft carries, fast thereon, as shown in Fig. 13, starting cam 19 and others to be presently described.

The balance and escapement timing mechanism in substantially the form herein shown and described, is described and claimed in my co-pending U. S. application Ser. No. 811,035, so need not here be gone into in greater detail.

Lever 35 is operated by armature extension 31 against the tension of a spring 42 and is held up, out of the path of stop 36, until shaft 41 has made six steps or a half revolution, by an offset or arm 43 on said lever resting upon the periphery of a cam 44, the high part of which holds said lever up as described, while two diametrically opposite drops 45 and 46 allow said drop slide to return under the action of a spring 42 to the path of stop 36 in order to stop the oscillation of the balance at the end of a signal interval which, in this machine, corresponds to the time of a half revolution of shaft 41, said shaft making six equal steps for each such period one for the start impulse and five for the code impulses. Cam 44 is mounted fast on shaft 41.

Shaft 41 is power driven in the following way: Mounted on the back of the frame of the machine is a continuously operating electric motor 47 driven from any desired local source of current. (See Figs. 5, 7 and 8.) The armature shaft 48 of the motor carries a worm 49 which meshes with a pinion 50 on a shaft 51, which in turn carries spiral gear 52 meshing with a spiral gear 53 on a shaft 54. The latter shaft imparts power to a gear 55 through a friction drive (see Fig. 8), comprising, among other parts, two non-metallic friction disks 56, and two metal friction disks 57. Disks 57 are mounted upon a square portion 58 of shaft 54 to positively rotate with said shaft. Gear 55 is mounted on a collar 59 fast on shaft 54, but this collar has a circular periphery, and gear 55 is adapted to rotate relative thereto. Disks 56 float between gear 55 and disks 57. The desired friction is created between disks 56, 57 and gear 55 by a resilient thrust member 60, held under compression by a nut 61, and collar 61', on shaft 54. Under normal conditions, gear 55 will rotate from friction with plates 56 and 57, but should an abnormal load be thrown on gear 55, it may stop and the power shaft 54 still continue its rotation. This is merely a safety arrangement to prevent overloading the motor.

Gear 55 is in constant mesh with a gear 62 (see Fig. 5) which imparts power to escapement shaft 41 through a friction drive shown most clearly in Fig. 23. Gear 62 is fast on a bushing 63 adapted to rotate on a collar 64 having a circular periphery, but a square bore, the latter adapted to fit square shaft 41 and turn therewith. Near the outer face of gear 62 is a steel disk 65 having a square central opening through which shaft 41 passes so as to form a positive driving connection. Between this disk 65 and the web of gear 62 is a floating fiber disk 66 which may rotate either with gear 62 or with disk 65. Disk 65 is slidable longitudinally of shaft 41 and is forced toward gear 62 under tension of a spring 67. The thrust of gear 62 to the left (Fig. 23) is taken up through ball thrust bearing 68 and parts to be later described. Plates 69 and 70 are for retaining in the clutch a supply of graphite grease or other lubricant. For the present we are not concerned with the other parts of this clutch, shown on the left of gear 62 in Fig. 23.

From the description which has preceded, it will be recalled that shaft 41 is normally held against rotation. Notwithstanding this, gear 62 rotates continuously. But when slide 35 is released from stop 36, shaft 41 will rotate from the friction created between gear 62, and disks 65 and 66.

The code impulses to form the signals are transmitted by closing contacts 26—27 at times corresponding to the unit impulse periods of a signal interval, and this is effected by causing a series of five transmitting levers $71^a$, $71^b$, $71^c$, $71^d$ and $71^e$, to act upon universal bar 20 in combinations corresponding to the signals to be transmitted. These transmitting levers, as well as levers 14 and 17, all swing upon a common fulcrum 72 and move in individual guide slots in two cross bars 73 and 74 rigidly secured between two side members 75 and 76 of the selector frame.

While levers $71^a$—$71^e$ may turn on fulcrum 72 as a pivot, their upper ends may, by means of a slot 77 in each, travel longitudinally on said fulcrum. Each lever, however, is at all times under tension of an individual spring 78 which normally holds it in the position shown in Fig. 10, with the fulcrum rod 72 against the closed end of slot 77. Now, if pressure be applied to any one or more of these levers at a point about on a level with and in the direction of the straight arrow, Fig. 10, such lever being restrained at its upper end by spring 78 will turn on rod 72, and its lower end will swing to the right, assuming that its lower end is not restrained from this movement. If, however, the lower end of such lever is positively locked against such movement, the upper end of the lever will swing to the right against the tension of spring 78, and, acting through bar 20, will send contact 26 into engagement with contact 27. The selective operation of levers 71ª—71ᵉ consists in restraining the lower ends of combinations of these levers against movement to the right Fig. 10, when power is applied to them as stated. The mechanism for applying said power comprises five cams 79ª, 79ᵇ, 79ᶜ, 79ᵈ and 79ᵉ mounted fast on shaft 41 and angularly displaced around the axis of said shaft one twelfth of a circumference (see Figs. 28 and 28ª), and each located in the same vertical plane with its corresponding lever of the series 71ª—71ᵉ, and in such relation thereto that as shaft 41 rotates, the ends of these cams will engage with cam projections 80 on the respective levers in such manner as to exert force on the levers in the direction of the straight arrow Fig. 10. As shaft 41 rotates step-by-step, these cams will therefore act on levers 71ª—71ᵉ successively, and these cams are of such length that any one of them will close contacts 26, 27 for an interval corresponding to a unit impulse period.

Cam 19 is identical in shape with cams 79ª—79ᵉ and is staggered one twelfth of a circumference from cam 79ᵉ on shaft 41, and occupies the angular position intermediate of cams 79ª and 79ᵉ.

The mechanism for locking the lower ends of levers 71ª—71ᵉ against movement, to cause them to kick to the right at their upper ends as described, comprises a series of five levers 81ª, 81ᵇ, 81ᶜ, 81ᵈ and 81ᵉ, similar to start lever 11, and fulcrumed individually upon bracket 12 to turn in a plane at right angles to the movement of levers 71ª—71ᵉ. The upper end of each lever of the series 81ª—81ᵉ normally lies forward of and just to one side of a corresponding lever of the series 71ª—71ᵉ, so that by shifting the upper ends of any of the levers 81ª—81ᵉ the proper distance to the left, Fig. 11, it will be brought in front of the lower end of its corresponding lever of the series 71ª—71ᵉ, thereby acting as a stop to positively lock the movement of said levers as described. Levers 81ª—81ᵉ are thus operated in the desired combinations, by their lower ends engaging with individual slots each in a corresponding slide bar of the series 6ª—6ᵉ, so that by shifting these bars in combinations, corresponding levers 81ª—81ᵉ will operate.

*The slow start or lag producing mechanism.*

The purpose of inserting the interval of lag, hereinbefore referred to, is to prevent the last impulse of a signal from blending with the start impulse of the next succeeding signal in order to allow time for the balance to be locked at the end of each signal and started again in the same phase position. When the machine is not operated at its maximum speed, a natural lag will be produced between successive signals due to the pauses of the operator. When the machine is operated at its maximum speed, a period of lag is automatically produced by causing a cam 82 to rotate a certain amount after the escapement shaft 41 has come to rest at the end of a signal interval, thereby causing the bottom of start control lever 14 to remain cocked to the right (Fig. 13) notwithstanding the upper end of lever 11 has been moved from behind it.

Cam 82 is fast upon a square hub portion 83' of a sleeve 83 (Figs. 23 and 24) rotatably mounted on sleeve 64. Also fast on sleeve 83 is a steel disk 84, the inner face of which lies against a floating fiber friction disk 85 inserted between disk 84 and a face of gear 62. This arrangement is such that unless sleeve 83 is restrained, it will rotate with gear 62 by power transmitted through friction disks 84 and 85, and may thus continue to rotate after shaft 41 is stopped. Normally, however, sleeve 83, and therefore cam 82, are prevented from rotating by a projection 86 on a holding pawl 87 (Figs. 27 and 31) engaging with either shoulder 88 or 89 of a cam 90 also fast on said sleeve. The release of this holding pawl is effected by either one of two elevated portions 91, 92 on a cam 93, fast on shaft 41 (Figs. 23 and 26) operating upon a lip 94 on the said holding pawl.

At the end of a given signal, cams 90 and 93 occupy the positions shown in Figs. 26 and 27. Then, on the first step of shaft 41 to transmit the next succeeding signal, high portion 91 of cam 93 acting on lip 94 will cause pawl 87 to release its holding projection 86 from shoulder 88 of cam 90, whereupon said cam and its sleeve 83 will be released and rotate from power derived from the friction clutch shown in Fig. 23. When the drop of portion 91 of cam 93 passes lip 94 of pawl 87, stop 86, under the action of spring 87', will be placed in position to be engaged by a shoulder 95 of cam 90, and by doing so will stop the rotation of sleeve 83. Sleeve 83, therefore, will have rotated the angular distance from shoulder 88 to shoulder 95 of cam 90 (see Fig. 27), before shaft 41 completes a half revolution. Then, by the time that the escapement shaft has completed its half rotation, elevated part 92 of cam 93 will occupy the same position relative to lip 94 of the holding pawl 87 as does the elevated portion 91 in Fig. 26, thereby releasing stop 86 from shoulder 95. This will allow sleeve 83 to again take up its rotation. Stop 86, however, is at this time shifted only far enough to clear shoulder 95, but not far enough to clear shoulder 89 of cam 90, which latter shoulder engages stop 86 and arrests the rotation of sleeve 83 and consequently the rotation of cam 82. In rotating the angular distance from shoulder 95 to 89, however, which, it will be noted, takes place after shaft 41 has stopped its rotation, one of the high parts 97 of cam 82 passes extension 96 on lever 14, whereupon, if a key is depressed at that time, lever 14 will drop from said high part under the action of spring 15, and extension 16 on said lever acting on start lever 17, will cause the latter to turn on cam 19 as a fulcrum and send the start impulse as described, but delayed for an interval equivalent to the time of rotation of slow start sleeve 83 after the escapement shaft has come to rest at the end of a signal interval.

Start cam 19 is the same in shape as the code cam $79^a$—$79^e$. The angular setting of all these cams may be readily seen from Figs. 28 and $28^a$.

When any key is operated, all of the keys become locked against operation until after the last impulse period of the signal interval, and this is effected by mechanism shown most clearly in Figs. 11 and 12. Directly after the slow start sleeve 83 commences to rotate, a cam 98 fast thereon starts into rotation from the position shown in Fig. 12, and allows a vertically movable slide 99 to drop under the pull of a spring 100. In doing so, a knife edge 101, carried by said slide and extending transversely across the upper edges of all the slide bars $6^a$—$6^e$, is sent into engagement with either of two notches 102 or 103 of said bars and locks them against operation until after the end of the last impulse period of a signal. The keys are unlocked at the end of a signal by one of the high parts of cam 98 again lifting slide 99. This slide is mounted in slots in guides 73 and 74 and is provided with an extension or arm 104 upon which cam 98 operates.

In descending, knife edge 101 engages slots 102 of the operated bars, and slots 103 of the unoperated bars, as will be readily seen. The advantage of operating cam 98 from the slow start instead of from shaft 41 is that it prevents the possibility of the operator pressing a key too soon and clipping the tail off the last or $e$ impulse of a signal. By the present arrangement, the keys are completely locked until after the $e$ impulse is completed.

*The receiving selector mechanism.*

Passing now to the receiving selector mechanism, this comprises, among other other parts, a series of cams $105^a$, $105^b$, $105^c$, $105^d$ and $105^e$ fast on timing shaft 41 and disposed thereon in the relative angular positions as indicated in Figs. 28 and $28^a$. For each of these cams there is a receiving selector lever, indicated $106^a$, $106^b$, $106^c$, $106^d$ and $106^e$, each having a lug or extension 107 adapted to be engaged by an individual cam of the series $105^a$—$105^e$ in such manner as to force the lever so acted upon to the left Fig. 16. All of the levers $106^a$—$106^e$ are identical in construction and all swing upon a fulcrum rod 108 and move in individual slots in fixed guides 109 and 110. In addition to turning on rod 108 as a pivot, levers $106^a$—$106^e$ may all move on said rod transversely thereof, for which purpose each lever is provided in its head with slot 111 open at one end. The closed end of this slot in each lever is normally held against rod 108 by one of the springs 78, one end of each of which is attached to a lever $106^a$—$106^e$, and the other end to the corresponding transmitting lever of the series $71^a$—$71^e$. The lower end of each of these levers, however, is normally free to move to the left Fig. 16. Being normally restrained from movement at their upper ends by springs 78 and normally free to move in that direction at their lower ends, the force exerted by cams $105^a$—$105^e$ upon lugs 107 of said levers as they successively engage them on the rotation of the escapement shaft, will cause levers $106^a$—$106^e$ to successively kick to the left (Fig. 16) at their lower ends, while their upper ends will be held from such movement by springs 78.

The selective operation of levers $106^a$—$106^e$ consists in resisting the movement to the left of the lower portions of said levers in combinations corresponding to the impulses for a given signal, which resistance in cooperation with cams $105^a$—$105^e$, causes the upper ends of the selected levers to be forced to the left (Fig. 16) against the tension of springs 78 and to become so set in such positions as to operate an interlocking combination device to be later described. This restraint to the movement of the lower ends of levers $106^a$—$106^e$ is effected by causing magnet 28 to send a series of fingers $113^a$, $113^b$, $113^c$, $113^d$ and $113^e$, carried by its armature, into such position relative to the path of movement of the lower ends of levers $106^a$—$106^e$ to the left (Fig. 16) as to act as stops against such movement. There is one finger $113^a$—$113^e$ for each lever $106^a$—$106^e$, and all of these fingers are fulcrumed on a common pivot 114 on magnet armature 29 and are adapted to yield downward relative to said armature each against an individual spring 115. (See Figs. 16, 20 and 22). The movement of armature 29 and consequently that of fingers 113ᵃ—113ᵉ is limited by armature extension 31 engaging stop pins 116 and 117.

For each signal impulse received by magnet 28, it will draw up its armature and in doing so place the ends of fingers 113ᵃ—113ᵉ in position to stop the movement of the lower ends of levers 106ᵃ—106ᵉ to the left (Fig. 16). Therefore, depending upon which levers 106ᵃ—106ᵉ are so restrained when they are acted upon by cams 105ᵃ—105ᵉ, these will be set as described in combinations corresponding to the impulses forming a given signal.

In Fig. 17 is shown one of these levers in the act of being set in the selected position. When these levers are so set or cocked, they are locked until the end of the signal period, or interval, by a spring-actuated plunger 118 engaging a shoulder 119 on each. Normally this plunger is depressed by a portion 120 of said lever, but when the upper end of one of the levers moves to the left, as described, this allows the plunger 118 to slip past shoulder 119 and assume the locking position shown in Fig. 17.

The mechanism for returning the selected or "set" levers 106ᵃ—106ᵉ to their normal positions will be hereinafter described.

The object in providing the armature 29 with the yieldable fingers 113ᵃ—113ᵉ instead of having a rigid extension on the armature to act as a stop for levers 106ᵃ—106ᵉ, is to allow the magnet 28 to draw up its armature notwithstanding one or more of said levers may not have returned to their normal positions after kicking out at their bottoms, as described.

Each of the fingers 113ᵃ—113ᵉ is beveled on one side to a point as at 121, and each lever 106ᵃ—106ᵉ has a double bevel point 122 facing the point 121 of its corresponding finger. The purpose of this arrangement is to keep armature 29 from dropping back prematurely in case magnet 28 receives a clipped impulse. If armature 29 is drawn up and a receiving lever of the series 106ᵃ—106ᵉ is kicked to the left at its bottom (Fig. 16), toe 122 on the lever thus operated will pass under the pointed tip 121 of its corresponding armature finger and hold the armature up until the cam (105ᵃ—105ᵉ) has had time to complete its operation on said lever. The function of levers 106ᵃ—106ᵉ is to selectively control an interlocking mechanical combination mechanism which in turn determines the stopping position of a shaft upon which latter depends the recording of the signals and various other operations of the machine to be later described.

This combination mechanism comprises, among other parts, a series of tumblers 123ᵃ, 123ᵇ, 123ᶜ, 123ᵈ and 123ᵉ (see Figs. 31 to 36) mounted side by side to slide in a frame consisting of two side members 124 and 125 connected by two rods 126 and 127, and mounted upon a square rock shaft 128 to turn therewith, said shaft being journaled at its ends in the sides 75 and 76 of the selector frame. Levers 106ᵃ—106ᵉ act upon these tumblers to set them in various combinations corresponding to the respective signals received, and this is effected by causing said levers to shift these tumblers transversely of the frame which supports them, a distance from the center of a notch 129 to that of another notch 130 in the upper edge of each tumbler near one end thereof, said tumblers being yieldably held in either of said positions by a spring 131 extending transversely across their upper edges and adapted to engage with either notch 129 or 130 according to the position of the tumblers. Spring 131 rests in notches 129 of the tumblers in their normal positions, and in notches 130 when they are set for a signal, and is fast to frame member 125.

The above described longitudinal shifting of the tumblers both to set them for a signal and to return them to normal is effected through the engagement of the wedge-shaped end of an extension 132 on the lower edge of each tumbler, with either one of two cams 133 or 134 on the top of each lever 106ᵃ—106ᵉ, when the tumbler frame is rocked downward as hereinafter described.

After the selector frame has moved downwardly and set the tumbler slides 123ᵃ to 123ᵉ in the proper combinations, corresponding to the setting of levers 106ᵃ to 106ᵉ, the said frame moves somewhat farther and the rod 126 engages the upper ends of the plungers 118 and thereby disengages the plungers 118 from the notch 119 and allows the levers 106ᵃ to 106ᵉ to return to their normal position, ready for the reception of the next signal.

Now it will be recalled that the selective setting of levers 106ᵃ—106ᵉ consists in shifting their upper ends transversely of their pivotal support in pre-arranged combinations. In their normal positions, cam 134 of each lever 106ᵃ—106ᵉ lies in the path of one of the beveled edges of an extension 132 on one of the tumblers. When any of these levers is set for a signal, however, its cam 133 will be brought into the path of the opposite beveled face of extension 132 of its corresponding tumbler, so that when the tumbler frame descends, members 132 engaging with cams 133 of the set levers will shift the tumblers corresponding to said levers to the right, Fig. 31. If, however, when the tumbler frame descends, there are any tumblers already set, as by a previous signal, members 132 will engage cams 134 of those levers 106ᵃ—106ᵉ corresponding thereto, and not entering the present combination, and thereby shift said tumblers to their normal positions.

The tumblers are prevented from rising relatively to their supporting frame by retaining caps 124' and 125' fast respectively to arms 124 and 125 of the tumbler frame.

The function of these tumblers is to control the stopping of a shaft 135 in certain angular positions corresponding respectively to the signals received, and for this purpose are adapted to selectively interlock with a series of notched combination disks 136, 136', 137 and 137' connected to said shaft as hereinafter described.

The interlocking action between the tumblers and said disks is effected by lugs 138 on the tumblers engaging with peripheral recesses or depressions in said disks. Lugs 138 of tumblers 123ᵃ, 123ᶜ and 123ᵉ are adapted to engage with disks 136 or 136' according to whether said tumblers are in the normal or set position, and lugs 138 on tumblers 123ᵇ and 123ᵈ are adapted to engage with disks 137 or 137' according to whether the latter tumblers are in the set or normal position. The exact shapes of disks 136, 136', 137 and 137' and their relatively fixed angular positions are clearly shown in Fig. 42. The projections and depressions on these disks are so arranged that for any combination of positions of the five tumblers there is one stopping position and only one, of said disks, in which all of the lugs 138 of the tumblers can enter depressions therein.

When all of the tumbler lugs 138 drop into depressions in disks 136—137', this permits a pawl tooth 139 formed on lid 124' to engage with a ratchet 140 and thus hold shaft 135 against rotation, said pawl moving under the action of a spring 141 attached at one end to an extension 141' on a collar 142 having a square bore which fits shaft 128. The other end of spring 141 is attached to the selector frame. Disks 136, 136', 137 and 137' are mounted upon a sleeve 143 and are adapted to rotate relatively thereto for a limited distance, as hereinafter described. This sleeve has a square bore which fits square shaft 135 and therefore rotates therewith. Disks 136, 136', 137 and 137' are all anchored together by tie pins 144 (Fig. 38), and are separated by suitable spacing rings 145. The driving connection between these disks and shaft 135 is a yielding one and is formed by a spring 146 fast at one end to ratchet 140, and bearing at its other end against a pin 147 fast to said disks, ratchet 140 being fast on shaft 135. For the purpose of limiting the angular motion of these disks with respect to ratchet 140, and for the purpose of holding said disks under initial tension, this ratchet is provided with two radial slots 140ᵃ and 140ᵇ (Fig. 41) into which extend two longitudinal extensions of lugs 145ᵃ and 145ᵇ, respectively, on the outer spacing ring 145, there being a limited amount of lost angular motion between these extensions and slots 140ᵃ and 140ᵇ.

The engagement of tumbler projections 138 with depressions in disks 136—136' and 137—137' is purely selective; that is to say, these lugs do not engage the faces of the teeth of said disks to stop shaft 135. This stopping of said shaft is positively effected by the engagement of pawl 139 with the teeth of ratchet 140. If ratchet 140 were rigidly attached to disks 136—136' and 137—137', this would necessitate a clearance between the teeth of these disks and tumbler projections 138. Such clearance would sometimes permit projections 138 to catch on the teeth of said disks even after pawl 139 had passed its proper tooth on ratchet 140, resulting in the jamming of the parts and the stoppage of the machine. With the yieldable connection between ratchet 140 and said disks, as shown, such clearance is not necessary, and pawl 139 will always find its proper tooth, and without any jamming of the parts.

Shaft 135 receives its power from a gear 148 which forms a part of a friction clutch shown most clearly in Fig. 38. This clutch permits shaft 135 to be held against rotation relative to gear 148, and when released to immediately rotate through power received therefrom. Gear 148 is mounted for rotation on a collar 149 mounted on and rotatable with shaft 135. This gear meshes with gear 62 and constitutes the normally rotating member of the clutch. The normally stationary member of this clutch comprises a disk 150 mounted on shaft 135, and having a square opening adapted to fit said shaft so that the disk and shaft will always rotate together. Inserted between the inner face of this disk and the adjacent face of gear 148 is a series of floating fiber friction rings 151, a series of metal friction rings 152 connected for rotation to gear 148, and a series of metal friction disks 153 fast to shaft 135. These friction disks as well as clutch member 150 are all inclosed within a chamber formed by a flange 154 on gear 148, and a cap 155 adapted to slip over said flange. Positive connection between rings 152 and gear 148 is effected by the engagement of lugs 156 (see Fig. 37) on said rings with recesses 157 on the inner face of gear flange 154. Positive connection between disks 153 and shaft 135 is effected by providing each of these disks with a square opening which fits said shaft. Clutch member 150 is forced in the direction of gear 148 under the action of coil spring 158, and the lateral movement of gear 148 to the right, Fig. 38, is limited by a flange 159 on sleeve 149.

Shaft 128 is rotated in an anti-clockwise direction (Fig. 16) so as to disengage pawl tooth 139 from ratchet 140 to permit shaft 135 to rotate and also to send the beveled extensions 132 of the tumblers down upon cams 133 and 134 of the selector levers, by a cam 160 acting upon an extension or arm 161 of the tumbler frame. This cam has an elevated portion and a drop which, in the normal position of the cam, occupy the positions relative to arm 161, shown in Fig. 16. This cam rotates from said normal position in a clockwise direction, and when it does so, its high part will at once act on arm 161 to send the tumbler carrying end of the tumbler frame downward. As the drop of cam 160 passes arm 161, however, the said frame will rotate quickly in the opposite direction under the action of spring 141, carrying lugs 138 of the tumblers into engagement with the peripheries of combination disks 136—137'. When these disks have rotated to such a position that all of the lugs 138 of the tumblers find openings therein which they may enter, the tumbler frame rotates still farther upward and brings pawl tooth 139 into engagement with ratchet 140 and stops the rotation of shaft 135 in a position corresponding to the received signal.

Cam 160 is fast on a shaft 162 which will be hereinafter referred to as the power cam shaft. This shaft is square in cross-section, extends entirely across the machine as shown.

Shaft 162 receives its power from continuously rotating gear 55 through a roller clutch shown most clearly in Figs. 55 and 56, presently to be described, which permits said shaft to be held against rotation, but when released to immediately rotate through power derived from said gear. This shaft is normally prevented from rotating by the engagement of one end of a lever 163, with a shoulder 164 on a cam 165 coupled to said clutch as hereinafter described. The opposite end of this lever is connected through a link 166 (see Fig. 19) with the lower end of a lever 167 fulcrumed on rod 108 and operated through the engagement of slow start cam 82, with a cam 168 on said lever, and in coöperation with a spring 169, in the following way:

When slow start cam 82 rotates, one or the other of the high parts, operating on lever cam 168, will withdraw the upper end of stop lever 163 from the path of cam shoulder 164, thus releasing said cam and allowing it, together with shaft 162, to rotate. This shaft and cam, however, do not make a complete continuous revolution, but are stopped after having made a partial revolution by the engagement of cam shoulder 164 with an arm 170 fast to the tumbler frame which, when the tumbler frame is rocked downward, will project into the path of said cam shoulder. As soon, however, as the drop of cam 160 passes arm 161, the tumbler frame will rotate upward, bringing tumbler lugs 138 into contact with peripheries of disks 136—137', and when the said lugs have passed into the openings in said disks and the pawl 139 has engaged ratchet 140 and stopped the shaft 135, arm 170 will be withdrawn from lug 164, whereupon cam 165 and shaft 162 will be released and permitted to complete their revolution, when they will be stopped by the shoulder of cam 165 again engaging stop lever 163 which has by this time returned to its initial position under the action of spring 169.

The roller clutch above mentioned comprises, among other parts, (see Fig. 55) a cup member 171 having a hub mounted to rotate on a collar 172 which is in turn mounted on and always rotatable with shaft 162. Cup member 171 constitutes the normally rotating driving element of the clutch and is constantly connected to power gear 55 through a pinion 173 fast to member 171. Located in the cupped portion of the member 171 and fitting shaft 162 to always rotate therewith, is a flanged member 174 having a series of flattened peripheral faces upon each of which rests a roller 175. These rollers lie respectively in recesses formed between a series of projections 176 on a disk 177 rotatable on a hub 178 of member 174, and fast as by pins 179 to cam 165. Disk 177 is connected to member 174 by a spring 180 which exerts a tension such as to cause rollers 175 to always tend to jam between the flange of cup member 171 and the flattened faces of member 174 and thereby couple shaft 162 positively to the driving member 171 of the clutch. If, however, member 177 be held against rotation, the relative movement between said member, and member 174, will cause the rollers 175 to occupy such a position on the flattened faces of member 174 as to allow member 171 to rotate freely with respect to member 174. This is a well known type of roller clutch, and is not herein claimed.

For the purpose of compelling this clutch to fully release and not chatter when stop lever 163 (Fig. 16) engages the shoulder of cam 165, means are provided to cause a slight forward shifting of the control shaft and clutch member 174, so as to thoroughly unwedge rollers 175. This is effected by the nose of a pivoted dog 181 (see Fig. 63) engaging with slanting faces 182 and 183 (Fig. 58) on a cam 184 fast to cam shaft 162, said dog acting on said cam under the pull of a spring 185 and engaging with cam surface 182 or 183 according to the stopping position of shaft 162.

Located alongside cam 165 and rigidly mounted on shaft 162 is a cam 186 (Figs. 16, 55 and 58) having a stop shoulder 187, the purpose of which is to act in conjunction with the upper end of lever 163 to prevent overthrow of shaft 162 in coming to rest at the end of a revolution.

Shaft 135, hereinafter referred to as the "type wheel shaft," is square in cross-section throughout its length and extends entirely across the machine, and is journaled to rotate in the side frames of the machine.

This shaft drives, among other parts, a type wheel 188 fast upon a sleeve 189 having a square bore adapted to fit shaft 135 so as to slide longitudinally thereof, but always turn therewith. This type wheel is provided on its periphery with two parallel rows of type, one for letters and the other for figures and punctuation marks (see Figs. 44, 66 and 67), and is adapted to be shifted longitudinally of shaft 135, by mechanism hereinafter described, so as to bring either of said rows into position to print.

The type wheel (see Figs. 4 and 7) is inked by an inking roller $188^1$, rotatably mounted in a casing $188^2$ formed on an arm $188^3$ fast to sleeve 326 so as to move laterally with the type wheel in shifting from letters to numerals or vice versa, as hereinafter described. The ink roller is held against the periphery of the type wheel under the tension of two coil springs $188^4$ on opposite sides of casing $188^2$.

The printing member coöperating with this type wheel comprises a platen 190 (Fig. 38) mounted in the head of an arm 191, having a hub 192, fast on a sleeve 193 mounted on a square shaft 194 to slide longitudinally thereof but always rotate therewith, said shaft extending across the machine and journaled in the side frames thereof. This platen and arm will hereinafter be referred to as the "print hammer."

The type wheel in this machine normally stands at rest. It is started into rotation for each signal, and is stopped in an angular position corresponding to the particular signal received, and rotates from its starting position to its stopping position for each signal by continuous motion.

Printing.

Assuming that the type wheel has been stopped in the proper position to print a given character, the operation of printing this character and the mechanism whereby this is accomplished is as follows:—

Shaft 194, which operates the print hammer, is normally under tension of a spring 195 (Figs. 54 and 65) carries an arm 196, having an adjustable screw 197 which is forced by said spring against one end of a slide 198, mounted for longitudinal movement in individual slots in two guides 199 and 200, rigidly held between frames 201 and 202. (See Fig. 64). The other end of this slide rests against a member 203 pivotally mounted in guide 199 and in turn resting against the periphery of a cam 204 fast on shaft 162. Slide 198 is also under tension in the direction of said cam, of a spring 205. This slide is flexibly connected to the lower end of a detent 206 fulcrumed in a slot in a guide 207 fast to frames 201 and 202, and having at its upper end an extension or nose 208 adapted to coöperate, as hereinafter described, with one of two toothed control disks 209 or $209^x$, depending upon whether the printing is done in the letter or figure shift positions of the type wheel. These disks 209 and $209^x$ are mounted on the type wheel shaft to rotate therewith, but are shiftable longitudinally of said shaft to bring either one or the other into the same vertical plane with detent 206, depending upon whether the printing is to be done in the letter or figure shifts. The mechanism for thus shifting these disks will be later described.

Now, for each signal received, cam shaft 162 makes one complete revolution in two steps. The first step of this shaft rotates cam 204 in the direction of the arrow Fig. 54, so that its drop will pass member 203, and if at this time the type wheel has stopped in such position that the nose 208 of detent 206 may pass into any of the spaces between the teeth of disk 209, (assuming that the printing is being done in the letter shift position) slide 198 will be pulled quickly in the direction of cam 204 under the action of springs 195 and 205, allowing shaft 194 to rotate in the direction of the arrow adjacent it in Fig. 54, which sends the platen against the paper and prints the character corresponding to the signal received. As cam 204 continues its rotation, its high part, acting through member 203, will return slide 198 to its initial position and thereby withdraw the print hammer from the paper and reset the same for the next signal. If, however, the signal received does not correspond to a character to be printed, the type wheel shaft will stop in such a position that one of the teeth of disk 209 will lie in the path of the nose of detent 206 and, when the machine is set as hereinafter described, to print only, will prevent the movement of said nose in the direction of said disk. This will cause detent 206 to hold slide 198 against movement in the direction of shaft 162 notwithstanding the rotation of cam 204, and this prevents the rocking of shaft 194 and therefore the operation of the print hammer.

The operation is the same for printing in the figure shift, except that detent 206 is controlled by disk $209^x$ instead of disk 209.

Each time that shaft 194 operates to send the printing platen toward the type wheel, it also operates to drive a pin 210 in the head of an arm 211 against a spring pressed plunger 212 (see Fig. 7). This plunger has a wedge-shaped upper edge 213 (Figs. 73 and 75), which, when the said plunger is struck as described, is adapted to be sent into engagement with one of a series of notches on the periphery of a correcting wheel 214 fast to the type wheel sleeve 189. This correcting wheel has in its periphery one such notch for each stopping position of the type wheel. Correcting hammer arm 211 is provided with a hub 215 fast to sleeve 193, and is so set angularly on said sleeve that the said hammer will drive the pin 210 into engagement with plunger 212 slightly in advance of the engagement of platen 190 with the paper, thereby taking up any lost motion there may be between sleeve 189 and the type wheel shaft 135 and insuring the correct setting of the type wheel. Inasmuch as pin 210 strikes plunger 212 before the platen strikes the paper, there must be a yielding connection between pin 210 and the head of arm 211. Pin 210 is therefore mounted in the head of said arm so as to be yieldable against a spring 216, as clearly shown in Fig. 7. Arms 191 and 211 are both the same in shape.

*Type wheel and print hammer carriages.*

The print hammer and type wheel move across the paper together in the operations of character and word spacing and returning to the commencement of a line, and this is effected by mechanism which comprises, among other parts, a bent or U-shaped tube 217 (Figs. 38, 39 and 40) having at one end a plug 218 rigidly secured thereto and provided with a screw-threaded section 219 which engages with an elongated nut 220 attached to a casting 221 which will hereinafter be referred to as the type wheel carriage. The connection between nut 220 and said carriage while positive, is flexible to a limited extent to prevent any strain on said carriage which would tend to interfere with the free movement of the type wheel laterally of shaft 135. This connection is most clearly shown in Fig. 39, and consists in providing nut 220 with an annular slot 222 into which extends a plate 223 fast to the type wheel carriage 221, said slot forming a head 224 on the end of the nut which lies in a recess 225 in casting 221. There is left sufficient play between the nut 220 and the parts 221 and 223 to form a flexible connection. The other end of tube 217 slides longitudinally in a fixed tube 226 after the fashion of a trombone. Tube 226 is rigidly supported at its ends in side frames 201 and 201', as shown most clearly in Fig. 38. This tube 226 is provided with a keyway or slot 227 extending almost its entire length, and in this slot slides a feather or key consisting of a block 228 inserted in a slot in a plug 229 rigidly secured to the end of tube 217. This key is in turn rigidly attached to a bracket 230 mounted at one end upon the cylindrical portion 193' of a collar 193 between the print hammer and correcting hammer hubs 192 and 215 (Fig. 38) so as to permit shaft 194 to turn relatively thereto, said bracket being supported at its other end to slide upon a square shaft 231 (see Fig. 7), extending across the machine. Therefore, any lateral movement imparted to bracket 230 will move the type wheel and print hammer longitudinally of their respective shafts simultaneously.

The type wheel and print hammer are thus moved across the paper through the action of a screw 232. (See Figs. 7 and 59.) The thread or helical flange 233 of this screw is operatively connected to bracket 230 through a pair of rollers 234 and 235 rotatable on an arm 236 pivotally secured to bracket 230, the lost motion between said screw flange and rollers 234 and 235 being taken up by spring 237 (Fig. 7).

Screw 232 is hollow, and extending longitudinally through it is a split shaft comprising two sections 238 and 239. Shaft section 238 extends at one end into a bushing 240 to which it is made fast by a pin 241, and this bushing is rotatable in side frame 201'. Bushing 240, however, is normally held against rotation by a holding pawl 242 (see Figs. 4 and 7) engaging the tips of pin 241. The other shaft section 239 extends into the opposite end of screw 232, is fast thereto as by a pin 243, is journaled for rotation in frames 201 and 202, and has a reduced portion 244 adapted to fit for rotation in one end of the other shaft section 238. Coiled on these shaft sections is a spring 245 fast at its opposite ends to the respective sections as clearly shown. (See Fig. 59.) Screw 232 is under tension of spring 245 tending to always rotate it in an anti-clockwise direction, as viewed from the right, Fig. 59, or in such direction as to cause the type wheel and print hammer carriages to travel in a backward direction across the paper. Screw 232 is normally held against such rotation, however, by a holding pawl 246 (Fig. 62) engaging with a ratchet 247 on shaft section 239 and normally connected to it through clutch members 248 and 249, the former of which is fast to shaft 239, and the latter loose thereon, but rigidly connected to ratchet 247 (Fig. 59). The function of this clutch will be described later. Pawl 246 is fast upon a bar 250 which is supported in slots in guides 199 and 200, and is always under tension of spring 251, tending to pull pawl 246 into engagement with ratchet 247.

The only function of this pawl is to hold the spacing screw against rotation backward except when released, as hereinafter described.

*Forward spacing.*

The type wheel and print hammer carriages are moved step-by-step in a forward direction across the paper against the tension of spring 245 by a positive mechanical action, the mechanism of which is shown most clearly in Figs. 51 and 52. This mechanism comprises, among other parts, a slide 252 having a pawl 253 rigidly secured thereto, and which is adapted to operate upon ratchet 247 as hereinafter described. This slide is mounted for longitudinal movement in slots in guides 199 and 200, and is at all times under tension of a spring 254 which forces one end of the slide against a pivoted member 255 interposed between said slide and the periphery of a cam 256 fast on cam shaft 162. This slide is flexibly connected to the lower end of a detent 257 fulcrumed in a slot in guide 207 and having at its upper end an extension or nose 258 adapted to coöperate, in the letter shift position, with a toothed disk 259 in exactly the same way as described in relation to detent 206 and disk 209, except that disk 209 has an extra tooth 209′, the purpose of which is to prevent the operation of printing detent 206 and therefore the operation of the print hammer when spacing between words. Disks 209 and 259 are otherwise identical and occupy corresponding angular positions on shaft 135.

On the first step of cam shaft 162 the drop of cam 256 passes member 255, and if shaft 135 has at this time stopped in such position that the nose of detent 258 may enter a recess in the periphery of disk 259, slide 252 will travel quickly toward shaft 162 under the pull of spring 254, retracting pawl 253 from the teeth of ratchet 247. Said ratchet, however, will at this time be held against rotation backward by holding pawl 246 (Fig. 62). As shaft 162 continues to rotate on its second step, the high portion of cam 256 will force slide 252 to the left (Fig. 51), thus causing pawl 253 to engage another tooth of the ratchet 247 and rotate the same in a forward direction, thereby rotating the spacing screw in a similar direction. As the teeth of disk 259 correspond to those of disk 209 except as to tooth 209′ and occupy similar angular positions on shaft 135, every time the machine prints, the type wheel and print hammer carriage will be spaced a step across the paper.

When a signal is received for the purpose of causing the receiver to space without printing, the type wheel shaft stops in a certain position corresponding to that signal, and the platen is prevented from advancing toward the type wheel by the engagement of the nose of detent 206 with tooth 209′ of disk 209.

In the figure shift position of the type wheel, detent 257 is controlled by a disk 259$^x$. Disks 259 and 259$^x$ are mounted on shaft 135 to rotate therewith, but both are shiftable together longitudinally thereof, as hereinafter described for bringing either into operative relation with detent 257 according to whether the operation is to be performed in the letter or figure shift position.

*Back spacing.*

Back spacing is effected by shifting clutch member 249 (see Fig. 59) out of engagement with clutch member 248 and into engagement with another clutch member 260 fast to shaft section 239, and then shifting the said clutch member 249 back into connection with clutch member 248. Clutch member 249, passing from engagement with member 248 to member 260 allows shaft section 239 to rotate backward under the action of spring 245 until one of the teeth at the right hand end of clutch member 249, engages with teeth on clutch member 260. Then when clutch member 249 is shifted to the left in passing from engagement with member 260 to member 248, shaft section 239 is allowed to make a further rotation backward until the teeth of clutch member 248 engage with teeth at the left hand end of clutch member 249, which again stops the shaft section 239. This operation permits the rotation of spacing screw 232 to send the type wheel and print hammer carriages backward, in the particular machine described, four spaces.

The shifting of clutch member 249, as described, is effected through the operation of a bell crank lever 261 fulcrumed on support 200, and having a bent arm 262 flexibly connected to clutch member 249, and another arm 263 flexibly connected to a slide 264 (see Figs. 50 and 59) mounted for longitudinal movement in guide supports 199 and 200. The forward end of this slide is held under tension of a spring 265 against a pivoted member 266, which latter is thereby forced against the periphery of a cam 267 fast on shaft 162. This slide is flexibly connected with a detent 268 pivotally mounted in a guide slot in support 207. This detent has a nose 269 adapted to coöperate with the notched control disk 270 mounted on the type wheel shaft to rotate therewith. When a back space signal is received, the type wheel shaft will stop in such a position that a notch 271 in disk 270 will lie opposite the nose of detent 268. On the second step of cam shaft 162, for this signal, the drop of cam 267 will pass member 266. As notch 271 is at this time opposite the nose of detent 268, slide 264 will be drawn in the direction of shaft 162 by spring 265. Such movement of said slide will rotate bell crank lever 261 in a direction to shift clutch member 249 out of engagement with clutch member 248 and into engagement with clutch member 260. Then, as shaft 162 continues to rotate on its second step, cam 267 acting on member 266 will force slide 264 in a direction away from shaft 162, thus rotating lever 261 so as to shift clutch member 249 from engagement with clutch member 260 and into engagement with clutch member 248.

*Carriage return.*

The print hammer and type wheel carriages are returned to the commencement of a new line by releasing holding pawl 246 and pawl 253 of the spacing slide 252 from ratchet 247, whereby the spacing screw 232 is permitted to rotate backward under the action of spring 245 a sufficient amount to carry said carriages across the paper to the commencement of a line. The mechanism whereby this is effected is most clearly shown in Figs. 60, 61 and 78, and comprises, among other parts, a slide 272 mounted for longitudinal movement in slots in guides 199 and 200, and bearing at one end under the tension of a spring 273 against a pivoted member 274, which rests under the tension of said spring against the periphery of a cam 275 fast on cam shaft 162. This slide is flexibly connected to a detent 276 having a nose 277 adapted to coöperate with the notched disk 278 fast on the type wheel shaft 135. Slide 272 is provided on its lower edge with a transverse extension or arm 279, which passes transversely across and beneath locking bar 250 and spacing slide 252. Slide 272 is provided with a beveled end 280, which is adapted to coöperate, as hereinafter described, with a plate 281 slidably supported upon shoulder screws 282 and 283 in guide support 200. (See Fig. 78). This plate is under tension of a spring 284, tending to pull it to the right (Fig. 78), but its movement in such direction is normally prevented by the engagement of an extension 285 on the upper edge of said plate with one side of the beveled end 280 of slide 272. When the carriage return signal is received, the type wheel shaft will stop in such position that the wider notch 286 (see Fig. 60) in disk 278 will register with nose 277 of detent 276, and on the second step of cam shaft 162, the drop of cam 275 will pass member 274, when slide 272 will be drawn under the action of spring 273 in the direction of shaft 162. This movement of slide 272 removes said slide from the path of lug 285 on plate 281, thus permitting said plate to be pulled by spring 284

to the right, Fig. 78. This plate is then stopped by screws 282 and 283 in such position that lug 285 will be in the same vertical plane with slide 272. As cam shaft 162 continues its second step, cam 275, acting through member 274, will force slide 272 in a direction away from shaft 162, whereupon the beveled end 280 of slide 272 will engage lug 285 and cause the said slide to be lifted to the dotted line position shown in Fig.
60. Slide 272, in thus rising, acts through its extension 279 to lift holding pawl 246 and space pawl 253 from engagement with ratchet 247, which permits the spacing screw to rotate backward as described. When the type wheel and print hammer carriages reach the end of their back travel, an arm 287 formed on bracket 230 (see Figs. 38 and 78) engages a collar 288 fast to rod 289 connected to plate 281 and thereby returning plate 281 to normal, and removes lug 285 from the path of slide 272 whereupon spacing holding pawl 246 and spacing pawl 253 are permitted to reëngage ratchet 247.
If it is attempted to space the print hammer and type wheel carriages farther forward, when they have moved to the extreme right, arm 287 will engage an arm 290 loose on rod 289, but fast to a rod 291 and forcing said rod to the right against the tension of a spring 292, which will permit spring 293 to rotate bell crank lever 294 in such direction as to force slide 252 and spacing pawl 253 upward and disengage it from the spacing ratchet 247, and thus preventing any further spacing to the right.

*Lining.*

The lining mechanism, or mechanism for feeding the paper from line to line, is most clearly shown in Figs. 4, 7, 63 and 64, and comprises, among other parts, a hollow paper feed roller 295 supported upon and fast to bushings 296 inserted in opposite ends of roller 295 and mounted fast upon a shaft 297 extending longitudinally through roller 295, and journaled in the side frames of the machine, and extending at one end through bracket 202 where it is provided with a milled knob 298 for manually operating the said roller. This paper feed roller is provided near each end on its periphery with a series of spurs 299 equally spaced therearound, which spurs engage with similarly spaced perforations 300 extending along and adjacent opposite edges of the paper 301 or other material upon which the signals are recorded. (See Figs. 4 and 7.) The paper 301 is held down upon this feed roller under pressure of a pair of parallel press rollers 302 and 303, carried by pivoted arms 304 and 305 adjacent opposite sides of the machine. The said presser rollers are held against the roller under the tension of springs 306 attached to said arms and to the side frames of the machine.

The paper is fed into the machine from the bottom (see Fig. 7) passes over a curved plate 307, thence over a flat plate 308 having an opening 309 therein to permit the passage of platen, the correcting hammer pin 210, and a perforating die plate hereinafter described, and thence over a flat plate 310 and out of the machine.

A curved shield 311 protects the paper as it passes around the curved plate 307 at the front of the machine.

The paper here shown is represented as a continuous strip or sheet upon which telegram blank forms, as shown in Fig. 1, may be printed and severed as they pass from the machine, or at will, individual sheets, however, may just as well be employed.

The mechanism for operating the paper feed roller 295 upon receipt of a signal to feed the paper up a space is shown most clearly in Fig. 63, and comprises, among other parts, a ratchet 312 fast to shaft 297 of the paper feed roller just outside of frame 201 and adapted to be operated by a ratchet tooth 313 fast to one end of a slide 314 mounted for longitudinal movement in individual slots in guides 199 and 200. The pawl end of this slide is held in engagement under the tension of a spring 315 with the periphery of a cam 316 fast on cam shaft 162 and said slide is flexibly connected to a detent 317 having a nose 318 adapted to coöperate with a notched control disk 319 fast on type wheel shaft 135, said detent being pivoted in an individual guide slot in support 207. When a lining signal is received, the type wheel shaft will stop in such position that notch 320 in control disk 319 will register with the nose of detent 317, and when shaft 162 makes its second step for this signal, its drop will pass the end of slide 314 and permit the slide to be drawn in the direction of shaft 162. This will throw the pawl 313 behind the next tooth on the right Fig. 63 of ratchet 312. Then as cam 316 continues to rotate, it will act to lift the slide 314 slightly as indicated in dotted lines Fig. 63, so as to bring its pawl into engagement with said ratchet tooth, and as cam 316 continues said rotation, slide 314 will be forced in the direction away from shaft 162, to the position shown in solid lines Fig. 63, whereupon the ratchet 312 will have been rotated a distance corresponding to a line on the paper.

For the purpose of insuring the stoppage of the feed roller always at the proper point, and for holding it there until again operated, a correcting pawl 321 held into engagement with the teeth of ratchet 312 under the tension of spring 322 is provided.

When the machine is used in page perforating, it is necessary to cause the paper to feed up a line automatically when returning to the commencement of a new line. This may be very readily effected since the carriage return and lining signals are adjacent each other; that is to say, the stopping position of the type wheel shaft for these two signals are adjacent. It is therefore merely necessary to make the notch 320 of the lining selector disk 319 wide enough for the nose of lining detent 317 to drop into it in the carriage return position, as well as in the lining position of shaft 135 to cause the lining mechanism to operate each time a carriage return signal is received.

*Letter and figure shifts.*

As hereinbefore stated, this machine prints only in single case letters, and the figures and punctuation marks are printed by shifting the type wheel from the letter position to the figure position; that is, from one row of type to the other. This shift mechanism is shown most clearly in Figs. 64 to 72, inclusive, and comprises, among other parts, (see Figs. 66-68) an arm 323 having a bifurcated end 324 which fits into an annular recess 325 on the hub of correcting wheel 214, which latter is fast to sleeve 189 on which the type wheel is also fast, and which sleeve is shiftable longitudinally of the type wheel shaft, as hereinbefore stated. Arm 323 is fast upon a sleeve 326, which is rotatable upon a sleeve 327, having a square bore through which extends a square shaft 328 passing entirely across the machine and journaled in the side frames thereof. Sleeve 327 is provided near one end with an annular groove 329 into which extends the plate 223, and by which said plate is made fast to said sleeve for movement longitudinally of shaft 328, but permits sleeve 329 to rotate relative to said plate. Plate 223 is rigidly secured to the type wheel carriage by screws 330 and 331, as shown. Sleeve 326 is provided with a cam slot 332 in which operates a screw 333 fast to sleeve 327. It will therefore be seen that when shaft 328 is rotated in one direction, screw 333 will shift sleeve 326 in one direction longitudinally of shaft 328, and as arm 323 is fast to the latter sleeve, this will act through the hub of the correcting wheel 314 to shift the type wheel longitudinally of shaft 135 in a corresponding direction. Similarly, when shaft 328 is rotated in an opposite direction, the type wheel will be shifted longitudinally of shaft 135 in an opposite direction to that above described. When the type wheel is shifted to one of these positions, letters will be printed, and when shifted to the other of said positions, figures or punctuation marks will be printed. In the following description, one of these positions will be referred to as the "letter shift" position, and the other as the "figure shift" position. Shaft 328 is rotated to shift the type wheel to either of said positions by power applied to a gear sector 334 (see Figs. 65 and 68) mounted for rotation upon a shaft 335, and meshing with a sector pinion 336 fast on shaft 328. The mechanism for operating sector 334 for the figure shift comprises, among other parts, (Figs. 68-72) a slide 337 adapted to operate as hereinafter described on a lug 334' formed on the hub of sector 334. This slide is mounted for longitudinal movement in guides 199 and 200. One end of this slide is continually pulled under tension of a spring 338 against a pivoted member 339 which is thereby forced against the periphery of a cam 340 fast on cam shaft 162. (See Fig. 69). This slide is flexibly connected to a detent 341, pivotally mounted in guide support 207 and having a nose 342 adapted to coöperate with a notched control disk 343 fast on the type wheel shaft 135. The end of slide 337 adjacent the sector lug 334' is continually under pressure upward of a spring 344, but such upward movement of the slide is prevented normally by sector lug 334' engaging the upper edge of slide 337 as in Fig. 68.

When a signal is received to shift to figures, for example, the type wheel shaft will stop in such position that the notch 345 in control disk 343 will register with the nose of detent 341, and when the control shaft 162 makes its second step for this signal, the drop of cam 340 passing member 339 will permit slide 337 to be drawn toward the cam shaft 162 by spring 338. This will bring the tip of slide 337 in such a position relative to lug 334' that slide 337 will be pushed upward by spring 344, whereupon it will be sent into a position behind lug 334' of the sector as shown in Fig. 69. At this time, shaft 162 will have completed the revolution started by the figure shift signal and have stopped. Then, when the next signal is received, shaft 162 will again rotate and in doing so, on its first step, or while the selecting operation of the tumbler slides is taking place, will act on slide 337 through member 339 to force said slide in a direction away from the cam shaft 162, whereupon sector 334 will be rotated to the right Fig. 68, which will in turn rotate shaft 328 to the left and shift the type wheel to the figure position through the operation of mechanism already described.

It will therefore be seen that the shifting of the type wheel to figures actually takes place while the selecting operation of the next subsequent signal is proceeding. The reason for this will later more fully appear.

When sector 334 is shifted to the figure shift position, it is operated against the tension of a coil spring 346 (Fig. 64) which continually tends to return it to the letter shift position, but which is prevented from doing so by the engagement of the end of slide 337 with sector lug 334', as shown in Fig. 69.

When slide 337 is shifted in a direction away from shaft 162 in operating sector 334 to shift to figures, a recess or cut away portion 347 in the upper edge of slide 337 will permit said slide to be further forced upward by spring 344 to such position that a shoulder 348 on said slide will engage a fixed lid 349 on guide support 200 and lock slide 337 in the figure shift position.

The mechanism for shifting the type wheel back to the letter position comprises means for withdrawing the end of slide 337 from the path of lug or shoulder 334', whereupon spring 346 rotates sector 334 in the opposite direction from that above described. This mechanism for releasing slide 337 from shoulder 334' comprises, among other parts, the slide 350, one end of which is held under tension of spring 351 against a pivoted member 352, which rests against the periphery of a cam 353 fast on cam shaft 162, said slide being flexibly connected to a detent 354 having a nose 355 adapted to coöperate with a notched control disk 356 mounted on the type wheel shaft to rotate therewith. When the letter shift signal is received, the type wheel shaft stops in such position that notch 357 of disk 356 will register with the nose of detent 354. Therefore, when cam shaft 162 rotates on its second step, slide 350 will be pulled by spring 351 in the direction of the said cam shaft, whereupon a transverse arm 358 on the upper edge of slide 350 will engage a bevel 359 on slide 337 and force the latter slide downward, which will remove its tip from the path of shoulder 334' and permit sector 334 to be rotated by spring 346 in such a direction as to shift the type wheel to the letter position. As cam shaft 162 rotates on the first step corresponding to the next signal, cam 353 restores slide 350 to normal.

In addition to printing different characters in the letter and figure shifts, in the case of certain signals, the particular function controlled thereby is operative in one shift and not in another. In the printing and spacing operation this is accomplished by providing two control disks 209 and 259, respectively, for the letter shift, and by providing two other disks 209$^x$ and 259$^x$, respectively for the figure shift.

The disks 209$^x$ and 259$^x$ have projections corresponding in position to the "city," "through" and "bell" signals, the functions of which will be hereinafter described, while on the disks 209 and 259 these projections are omitted. These disks are all mounted on shaft 135 to rotate therewith, but are shiftable longitudinally thereof by mechanism later described so as to shift disks 209 and 259 into operative relation with detents 206 and 257, respectively, for the letter shift, and to shift disks 209× and 259× into operative relation respectively with said detents in the figure shift. Therefore, in the letter shift, the printing and spacing operations will be performed when the "city," "through" and "bell" signals are received, while they will not be performed in the figure shift when said signals are received.

The back spacing, lining, and letter and figure shift operations take place in both shifts, and each such mechanism has a single control disk, as disks 270, 319, 356 and 343. These disks are all rotatable with shaft 135, but for mechanical reasons are shiftable longitudinally thereon with disks 209, 209×, 259 and 259×. The noses of detents 268, 317, 354 and 341, however, are broad enough to engage disks 270, 319, 356 and 343, respectively, in either of the shifts.

All of these control disks, as well as others hereinafter described, are separated from each other by suitable spacing washers and fastened together as clearly shown in Fig. 38.

The mechanism for shifting these disks longitudinally of shaft 135, for the purpose hereinafter described, comprises (see Fig. 64), among other parts, an arm 323×, one end of which extends into the space between two adjacent control disks, and the other end of which is fast to sleeve 326× mounted to rotate on a sleeve 327× located on and rotatable with shaft 328. Sleeve 326× is provided with a cam slot 332× into which extends a screw 333× fast to sleeve 327×. When shaft 328 is rotated, as previously described, to shift from letters to figures, or vice versa, screw 333× imparts lateral motion to sleeve 326×, which in turn acts through arm 323× to shift the control disks correspondingly.

*Page perforating.*

The page perforating mechanism comprises, among other parts, (see Figs. 73–77) a notched disk 360, mounted upon the type wheel sleeve 189 to rotate therewith, but in such way as to permit the said sleeve to slide longitudinally relative to said disk. This disk is attached as shown, to the type wheel carriage, so as to be rotatable with respect to said carriage but always movable longitudinally therewith. This disk controls by means of the notches and teeth on its periphery, which are arranged as hereinafter described, a series of five punches 361, which are slidably mounted in individual openings in a block 362 rigidly mounted in the type wheel carriage. Each of these punches is provided upon its head with a lug 363 adapted to coöperate, as hereinafter described, with the punch control disk 360, and each punch is provided with an offset or extension 364 across which extends a stop wire 365. (See Fig. 77.) These punches are staggered, as shown most clearly in Fig. 76, and are notched at their cutting ends after the usual practice in this class of devices. Directly below the punch block 362, and on the opposite side of the paper from the punches, is a die plate 366 carried on the end of a sliding plunger 367 which slides in an opening in the casting of the print hammer carriage 230. (See Figs. 9 and 77.)

The perforating is effected by causing die plate 366 to force the paper against the cutting ends of punches 361. When the die plate thus forces the paper against the ends of the punches, those punches, the lugs 363 of which are not backed up by high parts of disk 360, will yield to the pressure of the paper, but those which are backed up by the high parts of said cam will resist such pressure and be forced through the paper into corresponding openings in die plate 366. The selective operation of these punches therefore depends upon the stopping position of the type wheel shaft and the arrangement of the depressions and elevations on the periphery of disk 360. One form of punch selecting disk is shown in development in Fig. 2, which shows the exact arrangement of these depressions and elevations with respect to the various signals. This diagram also shown the code arrangement of the various perforations corresponding to their respective signals. The die plunger 367 is operated from a shaft 231 to which it is connected through rack 368 and sector pinion 369 rotatable with said shaft but slidable longitudinally thereon with the print hammer carriage 230. (See Figs. 9 and 77.) This shaft 231 is journaled at its opposite ends in the side frames of the machine, and is rotated from a shaft 370 through sectors 371 and 372 mounted respectively on said shafts. Shaft 370 is operated from a slide 373 (see Fig. 53) mounted for longitudinal movement in guide supports 199 and 200 and flexibly connected to said shaft through an arm 374. One end of this slide is continually held under tension of a spring 375 against a pivoted member 376 which is thereby forced against the periphery of a cam 377 fast upon cam shaft 162.

Unless the perforating mechanism is locked out as hereinafter described, each time a signal is received, shaft 162, on its second step, will send the drop of cam 377 past member 376 and allow slide 373 to be drawn in the direction of shaft 162 by spring 375. This slide in thus operating rotates shaft 370 in such direction as to force die 366 against the paper and effect the punching as described. As shaft 162 continues to rotate, cam 377 will force slide 373 in the opposite direction and withdraw the disk from the paper.

When the die engages the paper, punch block 362 is moved upward against the tension of a spring 362′, (Fig. 73) and those punches which are backed up by projections on control disk 360 protrude through the paper into openings in the die plate 366. Then when the die plate is returned to normal, or recedes from the paper, punch block 362, under the action of spring 362′, also returns to normal and at the same time strips the paper from the operated punches and also withdraws the unoperated punches from the depressions in the punch control disk 360 by the engagement of stop wire 365 with punch extensions 364.

*Blanking.*

The blanking, paper cutting, counting and time stamp mechanisms, except the mechanisms for controlling these, are carried in a detachable frame mounted on the rear of the machine and comprising two webs or plates 378 and 379 (see Figs. 89, 90 and 91) having lugs 380 and 381 by means of which they are made fast to the motor panel. Webs 378 and 379 are held together by a bar 382, and are also braced by a back cover 383.

Referring now more particularly to the blanking mechanism, this comprises, among other parts, a shaft 384, rotatable in collar bearings 385 and 386 supported in webs 379 and 378 respectively. This shaft at times receives power from power cam shaft 162 through a train of gears (see Fig. 91), comprising pinion 173 of the cam shaft clutch, gear 387 rotatable on a stud shaft 388, pinion 389 fast to gear 387, gear 390 fast to bearing sleeve 385, and a roller clutch and coupling shown most clearly in Fig. 98. This clutch is substantially the same in construction and operates the same as the roller clutch shown in Fig. 55, and comprises a cup-shaped member 391 formed on one end of sleeve 385, a flat faced member 392 extending into said cup and having a sleeve hub 393 rotatable on shaft 384 and carrying a relatively rotatable disk 394 having projections 395 between which are held rollers 396 which rest upon flattened faces of member 392. Members 394 and 392 are connected by coil spring 397 always tending to rotate member 394 so as to cause rollers 396 to bind between members 391 and 392 and thus positively couple disk 392 to the power member of the clutch, but is prevented from doing so as long as member 394 is held against rotation. Fast to disk 394 by pins extending through holes therein (see Figs. 96 and 98) is a disk 398 having a shoulder 399 which at times is adapted to engage with a pivoted stop arm 400 (see Fig. 91), whereby the clutch is uncoupled, which permits sleeve 385 to rotate freely on shaft 384. Upon the release of stop arm 400 from shoulder 399, however, clutch member 392 becomes immediately coupled to power member 385, whereupon power is then transmitted from gear 390 to shaft 384 through a coupling which comprises a disk 401 fast on a square portion of hub 393 of clutch member 392 and provided with a laterally extending pin 402 which is adapted to engage with a shoulder 403 on a disk 404 fast to a collar 405 which is in turn fast to shaft 384.

Sleeve 386 is rotatable relatively to shaft 384 and is fast to a gear 406 which is connected to the feed roller shaft 297 through a train of gears (see Fig. 90) comprising a pinion 407 rotatable on a stud shaft 408 secured to web 378, a gear 409 rotatable on stud shaft 408 and fast to pinion 407, and a pinion 410 fast on the feed roller shaft 297.

Formed on sleeve 386 is a flange 411 carrying a pin 412, the function of which is to engage with any one of a series of holes 413 arranged in a circle in a disk 414 having a sleeve hub 415 which is positively connected to shaft 384 at all times by a pin and slot connection 416, 417, which compels the hub to always rotate with shaft 384, but permits it to be shifted longitudinally thereof. Hub 415 is under tension of a spring 418 always exerting a force on it tending to couple it with sleeve 386. Also formed on hub 415 is a disk or flange 419 which carries a cam sector 420 adapted to coöperate as hereinafter described with a pin 421 on an arm 422 fast to bar 382.

The stopping position of cam 420 with relation to pin 421 after a blank has just been fed from the machine either by a blanking operation or by a series of lining operations is shown in Fig. 94. In this position of the parts, pin 412 engages a hole in disk 414 and shaft 384 is coupled to the feed roller shaft. Now as the next blank is fed through the machine, the lining mechanism of course operates to feed it from line to line, and we will assume that the message does not fill the blank. On each lining operation, the feed roller shaft rotates gear 406 a step and this rotation is communicated to shaft 384 as pin 421 is now off cam 420, with the latter rotating in the direction of the arrow (Fig. 94). Shaft 384 thus rotates step-by-step as the paper is fed from line to line. During this time clutch member 391 rotates free of shaft 384 as the blanking signal has not yet been received and stop arm 400 is therefore still in engagement with disk shoulder 399. Disk 404, however, is fast to shaft 384 and rotates therewith on its step-by-step operation in lining, and in doing so its shoulder 403 will advance with respect to pin 402 which is on disk 401 now stationary.

Assume now that the message has been recorded and a signal received to feed the blank out. The reception of each signal acts through mechanism to be presently described to withdraw stop arm 400 from the shoulder of disk 398, thereby freeing said disk and causing the roller clutch to couple pin carrying disk 401 to the power gear 390. Disk 401 then rotates, causing pin 402 to catch up with and engage shoulder 403 on disk 404, thereby imparting rotation to shaft 384 and through coupling 414, 411 to the feed roller shaft whereby the paper is fed out of the machine. When a blank has been fully fed out either by the blanking operation or by line feed or a combination of the two, pin 421 will engage cam 420 and disengage pin 412 from its hole in flange 414, whereupon shaft 384 will continue to rotate under power derived through the roller clutch without operating the paper feed roller. It is during this interval that the shaft 384 is rotating without moving the paper that the stamping and blank cutting operations are performed. When shaft 384 has made a complete rotation, shoulder 399 of cam 398 will again engage stop arm 400 and uncouple said shaft from power derived from the main cam shaft through gear 390, but at this time cam 420 will pass from engagement with pin 421 and allow pin 412 to reëngage with a hole in the flange of hub 415.

The blanking control mechanism comprises, among other parts, (see Figs. 48 and 90) a slide 423 mounted for longitudinal movement in guide supports 199 and 200 and flexibly connected to the lower end of a detent 424 having a nose 425 adapted to coöperate, as hereinafter described, with a control disk 426 on the type wheel shaft 135. Slide 423 is connected at one end by means of pin and slot connection 427 and 428 to the upper end of a pivoted arm 429, which latter engages the periphery of a cam 430 fast on cam shaft 162. Slide 423 is at all times under tension of a spring 431 tending to force it and the upper end of arm 429 in the direction of cam 430. The lower end of arm 429 is adapted to coöperate with a shoulder 432 on an arm 433 pivotally connected to an arm 434 fast to shaft 435. (See Fig. 90.) Spring 436, connected to an extension 437 of arm 433 and to arm 434 tends to rotate arm 433 on pivot 438 in a clockwise direction Fig. 90.

When a blanking signal is received in the figure shift, notch 439 in control disk 426 (see Fig. 48) will stop opposite the narrow section of the nose of detent 424, and when cam shaft 162 rotates far enough to cause the drop of cam 430 to pass the upper end of arm 429, said nose will enter notch 439 and slide 423 will be drawn quickly in the direction of shaft 162, Fig. 48. This will send the lower end of arm 429 back of shoulder 432, whereupon said shoulder will engage the front edge of arm 429, being pulled up to such position by spring 436. Then as cam 430 continues its rotation, it will force the upper end of arm 429 in a direction away from shaft 162, thereby causing said arm to rotate in an anti-clockwise direction. The lower end of arm 429 being now in engagement with shoulder 432, will act through arm 433 and arm 434 to rotate shaft 435, (Fig. 90) in a clockwise direction, thus removing stop arm 400 (Fig. 91) which is fast to shaft 435, from engagement with the stop shoulder 399 on disk 398, whereupon disk 401 will become positively connected to power gear 390, and when pin 402 engages shoulder 403 of cam 404, shaft 384 will rotate and operate the paper feed roller, as hereinafter described.

The nose 425 of detent 424 is double, that is it has a portion which can extend into the notch in disk 426 and a portion too broad to enter said notch. This double nose is provided for causing the blanking mechanism to operate in one shift and not in the other. In the particular machine here shown, it operates in the figure shift. Disk 426 is mounted on shaft 135 to be shifted into alinement with either section of nose 425 according to whether a letter or figure shift signal is received. In the figure shift, it is in alinement with the narrow section of the nose of detent 424, therefore the blanking mechanism may operate. But in the letter shift, disk 426 is in alinement with the broader section of the nose of detent 424, hence the blanking mechanism may not operate. Just after the coupling of the blanking clutch a cam 440 fast on shaft 162 engages a lip of arm extension 437 and forces arm 433 downward, whereupon the lower end of arm 429 will disengage shoulder 432 and return to its normal position as indicated in Fig. 90. This allows stop arm 400 to return, under tension of spring 441 fast to an arm 442 on shaft 435, (Fig. 93) to the path of lug 399 (Fig. 91) so as to engage said lug at the end of a revolution of shaft 384 and thereby prevent said shaft from making more than a single revolution for a single blanking signal.

For causing a blank to be automatically fed out when a message completely fills a blank, not noticed by the operator, the following mechanism is provided. (See Figs. 91, 93, 95 and 98). This consists, among other parts, of an arm 443 fast on shaft 435 and adapted to coöperate with a pin 444 on a disk 445 fast on a collar 445' which is in turn fast to shaft 384. If, when a message blank is filled, an operator presses and operates the lining key, pin 444 will engage arm 443 and rock shaft 435 so as to withdraw stop arm 400 from the shoulder 399 of stop cam 398, and thereby allow the roller clutch of shaft 384 to become coupled and impart rotation to said shaft for operating the blank cutting and stamping machines.

The same signal which operates to feed a blank out of the machine also causes the print hammer and type wheel carriage to return to the commencement of a line. This is effected by a notch 286' in the control disk 278 of the carriage return mechanism (see Fig. 60), occupying a position corresponding to the notch 439 of the blank control disk 426. Therefore whenever the type wheel shaft stops in response to a blanking signal, the carriage return detent 276 may operate. As the blanking signal operates only in the figure shift, it is necessary that the carriage return mechanism shall also only operate in the figure shift when the blanking signal is received. Therefore the nose of detent 276 has a narrow and a wide section and the notch 286' is only wide enough to admit of the entrance thereinto of the narrower section, and disk 278 is shifted by the shift mechanism, as described, so as to bring it into the same vertical plane with narrow nose section of detent 276 in the figure shift, and to bring it into the same vertical plane with the broader section of said nose in the letter shift.

The notch 286 in control disk 278 is wide enough to admit of the entrance thereinto of either section of the nose of detent 276 so that for the regular carriage return signal the carriage return mechanism will operate in either of the shifts.

Blank cut off mechanism.

The blank cut off mechanism comprises, among other parts (see Figs. 93, 100, 101, 105 and 106), a shearing blade 446 which is adapted to coöperate with a stationary plate 447 fast upon fixed bar 382, and having a transverse slot 448 therein through which the paper passes. Blade 446 is rigidly fastened to a bar 446$^x$ connecting two brackets 449 and 450 which are slidably mounted in slots in frames 379 and 378. Brackets 449 and 450 are further connected together by rod 451. Rod 451 is pivotally connected to two arms 452 and 453 by slot connections, as shown in Fig. 101, and these arms are mounted fast upon a shaft 454. Also mounted upon shaft 454 are two dogs 455 and 456, which engage respectively the periphery of two cams 457 and 458 fast upon shaft 384. Just after the paper has stopped feeding out, the highest parts 457' of cams 457 and 458 engage dogs 455 and 456, respectively, and rock shaft 454 in such direction as to cause the brackets 449 and 450 to travel upward against the tension of springs 459 and 460. Then, as said high parts of cams 457 and 458 pass dogs 455 and 456, brackets 449 and 450 will descend rapidly, under the action of springs 459 and 460, and cause blade 446 to shear the blank. As cams 457 and 458 continue their rotation, they will act upon dogs 455 and 456 to return brackets 449 and 450, and shearing blade 446, to their normal positions, ready for the reception of the next message.

Counting mechanism.

The counting mechanism comprises, among other parts, three number wheels 461, 462 and 463, each of which bears on its periphery type corresponding to digits 0 to 9, inclusive. These number wheels are all mounted for rotation upon a shaft 464 (see Fig. 99) supported at its opposite ends in brackets 449 and 450 and held against rotation as hereinafter described. Each of these number wheels has in one of its sides a chamber in which is mounted a spiral spring 465 (see Fig. 108) fast at one end to shaft 464, and at its other end to its number wheel. Each of these springs tends to rotate its number wheel in a backward direction for returning the same to zero, as hereinafter described.

The mechanism for stepping the number wheels around comprises, among other parts, (see Figs. 111, 112 and 119) a pawl arm 466 pivotally mounted in a U-shaped rocker arm 467 rotatable on shaft 464. This pawl has three teeth 468, 469 and 470, each of a different length from the other. The number wheels are stepped forward by the engagement of pawl teeth 468, 469 and 470, respectively, with ratchets 471, 472 and 473 fast to the respective number wheels, said pawls being forced toward said ratchets under the action of a spring 466$^x$.

Rocker arm 467 is positively connected to a sleeve 474 (see Fig. 99) rotatable on shaft 464, and provided with gear teeth 475 which mesh with a pinion 476 rotatable on stud 477 mounted in frame 450, and this pinion in turn meshes with rack teeth 478 cut on a bar 479 slidable longitudinally in a slot 480 in frame 450, and having its movement limited by pin 481 working in a slot 482 (see Fig. 93). This bar 479 is normally under tension of a spring 483 but is forced downward against said spring by an arm 484 engaging a pin 485 on said bar. Arm 484 is fast on a stud 486 to which is also fast a crank arm 487. To this crank arm is pivotally connected an arm 488 which is at all times under tension of a spring 489 tending to rotate it in a clockwise direction Fig. 93. This movement of said arm, however, is limited by a pivoted member 490, the upper end of which is pivoted to a control slide 491. This control slide may be either the print control slide, in which the counter would count the number of printed characters, or it may be the perforating slide, in which case the counter would count every received signal, or it may be the space slide, in which case the counter would count the number of words, provided a space signal is sent after each word. Other details of the counting mechanism will be brought out in the following description of its operation:

When a signal is received, shaft 162 rotates as usual, and when cam 492, which may be the operating cam of any one of the slides above referred to, passes the upper end of member 490, the lower end of said member will pass to the left Fig. 93, allowing shoulder 493 of arm 488 to engage the front edge of member 490, under the pull of spring 489. Then as cam 492 continues its rotation, its elevated portion will rotate member 490 in the opposite direction, causing its lower end, acting on shoulder 493, to force arm 488 in such direction as to rotate arm 484 downward. This arm, acting on bar 479, will pull the same against the tension of spring 483 in such direction as to rotate gear 476 in the direction of the arrow, Fig. 93. Rocker arm 467 is thus rocked forward, and pawl tooth 468 engaging with a tooth of ratchet 471 will step the unit number wheel one step. Just before shaft 162 reaches the end of its revolution, the high part of a cam 494 fast thereon will engage the nose 495 of an extension 496 of arm 488, thus forcing the free end of arm 488 downward and allowing pivoted member 490 to assume its normal position shown in Fig. 93. When this takes place, spring 489 will pull arm 484 upward and allow spring 483 to return slide bar 479 to its initial position, thereby acting through gears 476 and 475 to rock arm 467 back to the commencement of a stroke or to its starting position.

If the above operation is repeated nine times, corresponding respectively to nine operations to be counted, the digit "9" of the units wheel will be brought into the printing position.

On each back stroke of rocker arm 467, pawl frame 466 is lifted by an arm 497 fast thereto, engaging the high part of a cam 498 fast to shaft 464, whereby pawl teeth 468, 469 and 470 are freed from their respective ratchets. These ratchets are at such times, however, prevented from rotating backward by a holding pawl 499 individual to each ratchet. (See Figs. 112 and 116).

When the units dial has made nine steps, and on the tenth forward stroke of rocker arm 467, the tens dial will be rotated one step and on the tenth back stroke of said rocker arm the units dial will return to zero. Similarly, when the tens dial has made nine steps, on the next succeeding forward stroke of rocker arm 467 the hundreds dial will be rotated one step and the tens dial returned to zero on the next back stroke of said arm.

The carrying operation thus performed is effected by providing ratchets 471 and 472 with radial slots 500 and 501, respectively, so located that when their disks have rotated nine steps from the zero position, said slots will register respectively with pawls 468 and 469. Therefore, when the units number wheel has made nine steps from zero, slot 500 will register with pawl tooth 468, and on the next succeeding forward stroke of rocker arm 467, said pawl tooth will pass into said slot and thereby allow the next longest pawl tooth 469 to engage the teeth of the tens ratchet 472 and step the tens number wheel one step. Similarly, when the tens number wheel has stepped nine steps from zero, slot 501 in the tens ratchet 472 will register with pawl tooth 469, and if the units wheel has also made nine steps from its zero position, slot 500 in the units ratchet 471 will register with pawl tooth 468, and on the next succeeding forward stroke of rocker arm 467, pawl tooth 469 will drop into its ratchet slot 501, and pawl 468 into its ratchet slot 500, allowing pawl tooth 470 to step the hundreds wheel around one step, and then the units and tens wheels both return to zero on the back stroke of arm 467. When pawl tooth 469 drops into its radial slot 501, pawl tooth 468 sinks deeper into its slot 500 than when pawl tooth 469 is operating upon the teeth of ratchet 472.

For the purpose of returning the respective number wheels to zero, above mentioned, there is made fast to each number wheel a cam 502 which, on the next succeeding forward stroke of arm 467 following the setting of any number wheel to "9," will engage holding pawl 499 of its number wheel and force the same against the tension of a spring 503 out of engagement with its ratchet. When said holding pawl is so operated, a lug 504 on an extension or arm 505 thereof will be forced back of a shoulder 506 on a locking dog 507 mounted to rock on a shaft 508, which dog, under the action of a spring 509 will cause said dog to interlock with lug 504 and thereby hold pawl 499 out of engagement with its ratchet. Then, since on the next back stroke of arm 467, pawls 468, 469 and 470 are lifted from engagement with their respective ratchets 471, 472 and 473, such of these ratchets from which holding pawls 499 have been released and locked away from as described, return to zero under the action of their coil springs 465.

When any number wheel has returned to zero, as described, a shoulder 510 on cam 502 of that wheel will engage the tip of its locking dog 507 and thus release shoulder 506 from engagement with lug 504 and allow pawl 499 to return to engagement with its corresponding ratchet.

There is a cam 502, holding pawl 499 and locking dog 507 individual to each dial wheel, but as these are in each case the same, those operating with the units wheel only are shown.

Mechanism will later be described for returning all of the number wheels to zero directly after they print.

When the message has been completely recorded, the digits on dials 461, 462 and 463 indicating the number of operations counted, will be set in the printing position, that is, in a plane parallel to the upper face of a stationary plate 511 onto which the telegram is fed in the blanking operation.

Since the cutting blade 446 and counting number wheels 461, 462 and 463 are all carried by the same frame, when the latter descends to bring the cutting blade into operation, the digits of the number wheels in the printing position will be brought into engagement with the paper of the completed telegram, which now rests upon a fixed plate 511. The fixed relative positions of the number wheels and cutting blade from plate 511 is such that the paper is severed slightly in advance of the impression of the numbers thereon from the number wheels.

The mechanism for inking these counting number wheels will be later described.

After each recording operation, number wheels 461, 462 and 463, are all returned to zero. The mechanism for effecting this comprises, among other parts (see Figs. 100 and 114), spring pressed plunger 512 supported by and movable in a block 513 fixed to stationary web 378 and adapted to coöperate, as hereinafter described, with a dog 514 fast to a rock shaft 515 on which all of the holding pawls 499 are mounted, and which shaft is supported for rocking motion in a block 516 fast to cross-bar 446ˣ. When the blade 446 and number wheels descend, the tip of dog 514 engages the beveled end of plunger 512, forces said plunger back against spring 517, and passes to the lower side of said plunger. Dog 514 in thus passing plunger 512 does not rotate shaft 515, since said dog is at this time held against rotation in a clockwise direction by engaging bar 446ˣ through which it passes. When the blank has been severed and the number recorded by wheels 461, 462 and 463, stamped thereon, bar 446ˣ travels upward, bringing the tip of dog 514 again into engagement with spring plunger 512, whereupon dog 514 will be rocked in a counter-clockwise direction and impart similar motion to shaft 515, which acting through pins 518, will withdraw all of the holding pawls 599 from their respective ratchets and lock the same out by the engagement of lug 504 on each such pawl with shoulder 506 on its locking dog 507. The number wheels now being released, all return to zero under the action of their coil springs 465, and when they have reached the zero position, shoulder 510 on cam 502 of each number wheel will act upon its locking dog 507 to force the shoulder 506 thereof out of engagement with lug 504 of the corresponding holding pawl, and thereby permit all of said holding pawls to be returned to normal in engagement with their respective ratchets. In order that each pawl 499 may be independently disengaged from its corresponding ratchet to permit said ratchet to separately return to zero, as above described, there is a limited amount of lost motion between each such pawl and its pin 518 on the movement of the pawl in a counter-clockwise direction, and this is effected by a slot 519 in each pawl into which its pin 518 extends.

The mechanism for inking the number wheels comprises, among other parts, (see Figs. 93, 105, 106, and 111) an ink pad 520, mounted in a channel bar 521 which is in turn fast to a supporting bar 522 having at its opposite ends two arms 523 and 524 adapted to rock on shaft 525 extending across the machine. To one of these arms is pivotally connected one end of a link 526, the other end of which is pivotally connected to an arm 527, fast on shaft 464, which is held against rotation by a pin 528 (see Fig. 113) passing therethrough and screwed into block 516.

When frames 449 and 450 ascend to their uppermost position, arm 527, acting through link 526, will bring the ink pad into engagement with the type on the counting number wheels now in the printing position, as shown in Fig. 105. Then, when these number wheels descend, the same mechanism will swing the printing pad to the position shown in Fig. 106, permitting the number wheels to pass the same on their down travel without engagement therewith.

When the number wheels are being set, the inking pad is held a short distance from the peripheries thereof, so as not to interfere with their rotation. In the inking operation, however, the pad is drawn into engagement with the type of the number wheel and quickly removed therefrom. This quick action in removing the pad is effected by the peaks of cams 457 and 458.

The visual counting mechanism associated with the keyboard of a sending machine, referred to in the general introduction to this specification, and provided for the purpose of counting the number of operations performed by the operation of the keyboard, is most clearly shown in Figs. 89, 90, 92 and 130, and comprises, among other parts, three number wheels 529, 530 and 531, and actuating mechanism therefor inclosed in a casing 532 attached to the side of the machine, and provided with a window 533 through which the registered numbers are displayed. The numbers of these wheels correspond to those on the number wheels 461, 462 and 463, except that the former are arranged right side up for visual observation.

Except as to the mechanism for imparting rocking motion to the arm which steps the number wheels and corresponding to arm 467, and the mechanism for imparting rotation to a shaft corresponding to shaft 515, for returning all of the dials to zero simultaneously, and except as to the inking mechanism which, of course, is omitted in the visual counting device, the operating parts of the visual counting mechanism are identical with the operating parts of the recording counting mechanism, so need not be described further than to bring out the construction and operation of parts associated therewith which are not involved, or which are not duplicates of parts involved in the recording counting mechanism.

In this visual counting mechanism, the pawl rocker arm corresponding to arm 467 of the recording counting mechanism is rocked by an arm 534 fast to a sleeve 535, corresponding to sleeve 474 of the recording counting mechanism, and pivotally connected to a link 536 which is also pivotally connected to an arm 537 fast to shaft 486, which is the same shaft from which motion is derived to operate the rocker arm 467 of the recording counting mechanism.

Shaft 538 of the visual counting mechanism, which corresponds to shaft 515 of the recording counting mechanism, receives its motion for returning the visual number wheels to zero, through an arm 539 fast to said shaft and connected through a link 540 to an arm 541 fast to shaft 435. Therefore, each time shaft 435 rocks to couple the clutch to feed the blank out of the machine, arm 541, acting through link 540, will rock shaft 538, whereupon the same acts as does shaft 515 of the recording counting mechanism to return the visual number wheels to zero.

*Time stamp.*

The time stamp mechanism (see Figs. 89, 99, 102, 103, 109 and 120) comprises, among other parts, a minute number wheel 542 having type on its periphery corresponding to digits 0 to 9, inclusive, a tens of minutes number wheel 543 having type on its periphery corresponding respectively to digits 0 to 5, an hour number wheel 544 having type on its periphery corresponding to digits 1 to 12, and a twelve hour wheel 545 having on its periphery type indicating a. m. and p. m. respectively. These wheels are all rotatable on shaft 464 and are arranged in the relative positions shown in Fig. 99. The principle of the operation of these number wheels is the same as that of the counting number wheels, and in many respects the mechanism is a mere duplication of the counting mechanism.

The time stamp wheels are stepped forward by pawl teeth 546, 547, 548 and 549, engaging respectively with the teeth of ratchets 550, 551, 552 and 553, fast to the respective wheels. Pawl teeth 546—549 are all formed upon a pawl arm or frame 554 pivotally mounted in a U-shaped rocker arm 555, and under the tension of a spring 556 tending to force the pawl teeth into engagement with their respective ratchets. Rocker arm 555 is supported upon shaft 464 for rocking motion thereon, and is fast to a sleeve 557 rotatable on said shaft and adapted to receive power to rock the same, through gear teeth 558 on said sleeve engaging with a pinion 559 rotatable on a stud shaft 560 in frame 449, and in turn meshing with teeth 561 of a rack bar 562 (Fig. 103) slidable longitudinally in frame 449 and receiving downward motion from a magnet 563 through a connection to be later described. Magnet 563 is fast to a removable casing 563$^x$ which incloses power gears 387, 389 and 390 as shown in Fig. 89.

By means of any suitable clock operated time switch (apparatus well known in the art) energizing impulses are delivered to magnet 563 at regular intervals, say one minute apart. Each time said magnet receives an impulse it will pull bar 562 downward and rotate sleeve 557 so as to rock pawl carrying arm 555. At the end of such impulse, a spring 564 will pull bar 562 in an opposite direction and thereby rock pawl arm 555 in a corresponding direction.

The minute wheel makes one step for each impulse received by magnet 563, and when it registers "9" in the printing position, the next forward step of rocker arm 555 will step the tens of minutes wheel 543 one step, and on the return stroke of said arm, the minute wheel will return to zero. Then when the tens of minutes wheel registers "5", and the minutes wheel registers "9", the next succeeding forward motion of rocker arm 555 will step the hour wheel one step, and on the return stroke of said arm, the minute and the tens of minutes wheels will return to zero, and when the hour wheel has stepped twelve steps, the a. m., p. m. wheel will step one step on the next forward movement of rocker arm 555.

Each of the time stamp wheels is provided with a holding pawl and locking dog similar to parts 499 and 507 of the counting mechanism, and with four cams 565, 566, 567 and 568 fast respectively to the four time stamp wheels and corresponding in function to cams 502 of the number wheels, but differing slightly in shape, as indicated in Fig. 109.

The holding pawls of the time stamp mechanism, not shown, but corresponding to pawls 499 of the counting mechanism, are mounted to rock on a separate shaft 569 (Fig. 115) in block 516, but are not connected to said shaft by pins as in the case of the holding pawls of the counting wheels, for the reason that the time stamp wheels are not returned to zero after a stamping operation.

It should also be stated that the pawl frame 554 of the time stamp mechanism is operated to lift the pawls carried thereby from their respective ratchets on the back stroke of rocker arm 555 by a stationary cam 570 identical with cam 498 and acting upon an arm 571 (Fig. 99) identical with arm 497.

The time stamp wheels are inked from the same pad 520 which inks the counting wheels, and being mounted on the same shaft 464 with the said counting wheels, will stamp the time that the message is completed simultaneously with the stamping action of the counting wheels.

The device which prevents the time stamp wheels from moving while performing the printing or stamping operation, and at the same time prevents either a failure or double operation of the time stamp, is most clearly shown in Figs. 102, 103 and 104, and comprises the following mechanism:

The armature 572 of magnet 563 engages an arm 573 fast to a rock shaft 574, which also carries fast thereto an arm 575. Arm 575 carries a pawl 576 having a hooked end 577 adapted to engage a shoulder 578 on a small block 579 fast to an arm 580 rotatable on shaft 574. Arm 580 is under tension of spring 564, which acts through a pin 581 to normally hold said arm against a stop 582. When magnet 563 operates, motion is communicated from plunger 572 to arm 573, shaft 574, arm 575, lever 576, lever 580 to pin 581, whereupon rack bar 562 is pulled downward and operates the time stamp number wheels as described. Just before arm 575 reaches the end of its downward motion, an extension 583 on lever 576 engages a lip 584 on an arm 585 fast to sliding bracket 449, and disengages hook 577 from shoulder 578, against the tension of a flat spring 586 thus allowing arm 580 and slide bar 562 to return to their normal positions even though magnet 563 remains energized. Arm 580 is provided with a spring 587 which holds arm 580 against stop 582 in case the stamping operation takes place while magnet 563 is energized. If magnet 563 should operate just before slide bracket 449 goes down, and it should remain energized until said bracket again returns slide 562 will not again operate, since hook 577 has been disengaged from shoulder 578. On the other hand, if magnet 563 is energized while bracket 449 is down, the time stamp wheels will be stepped along when bracket 449 returns.

*The office and circuit designated and operator's identifying stamp.*

In telegraph practice, it is customary to employ certain designations for telegraph offices or stations, and also designations for the circuits operated to or from such stations, and each operator or machine attendant has an identifying sign, usually consisting of two letters, which, together with the station and circuit designations, are typewritten, stamped or inscribed on the telegram form when the message is received.

The present invention provides mechanism for stamping these designations on the telegram blank after the message has been recorded thereon, and consists (see Figs. 99, 113 and 121) in providing two plugs 588 and 589 removably supported upon shaft 464 between the counting and time stamp mechanisms, as shown most clearly in Fig. 99. Each of these plugs is provided with a slot 590 through which passes shaft 464, and with a spring-pressed plunger 591 engaging an indentation in said shaft, whereby the plugs are retained in a set position. Plug 588 has on its lower end type corresponding to the station and line signs or designations, which may be "BA" and "A," respectively. The other plug 589, which is the operator's plug, is provided on its lower end with type representing the letters "CL," for example, which is the identifying sign of the attendant of this particular machine. When the shaft 464 descends to record the counted operations and the time on the blank, the above mentioned identifying marks will at the same time be impressed on the blank, as indicated in Fig. 1. Each operator or attendant is provided with a plug such as 589, and when she takes charge of a certain machine, she inserts this plug in the machine, and when she leaves the machine, she takes it with her.

*Lockout mechanism.*

The lockout mechanism in the usually operated form comprises, among other parts, (see Figs. 64, 80 and 81) a rotatable cam rod 592 manipulated by hand through an arm 593 at its outer end, which arm serves also a pointer. Rod 592 has four operating position 90° apart indicated respectively by the four radial lines opposite which appear the words "Signal," "Print," "Perforate-print" and "Perforate," on a dial 594 beneath arm 593 and fast on the outside of a removable casing 595 which incloses all of the mechanism at the right hand end of the machine outside of frame 201. When arm 593 occupies the position shown in Fig. 81, the machine will both print and perforate; when said arm is turned to the "printing" position, the machine will print alone; when said arm is turned to the "perforate" position, the machine will perforate alone, and when turned to the "signal" position, the print hammer, perforating, spacing, backspacing, lining, carriage return, and blanking mechanisms will all be locked out, but the machine may receive a signal which, in the case shown, operates a call bell. This call signal mechanism will be hereinafter described in detail.

The locking out operations, above referred to, are performed by cams 596, 597, 598, 599, 600, 601, 602 and 603, on rod 592, which operate according to the angular position of said rod to lock the detent of the lining, blanking, bell signal, back space, perforating, spacing, carriage return, and printing mechanisms respectively, thereby preventing the operation of such mechanisms. This locking is effected by said cams acting respectively on arms or extensions 604, 605, 606, 607, 609, 610 and 611 of the slide controlling detents of the several mechanisms involved, except as to the perforating mechanism, in which case cam 600 operates upon an extension 608 of a pivoted arm 608ˣ to lockout or render the perforating mechanism operative as the case may be. These cams act through said arms according to the positions of the cams to prevent the movement of said detents and arm 608ˣ. The positions in which the lockout cams are shown in Figs. 48 to 54, inclusive, and 60 and 63, are the positions which these cams occupy when the machine is set to both print and perforate, from which it will be seen that the only mechanism locked out is the bell signal mechanism, as will be seen from Fig. 49.

It will be observed from Fig. 51 that the detent 257 of the spacing slide is mounted differently from the detents of the other slides in that its fulcrum is movable, while the fulcrums of the other slides are stationary. This construction is provided for the purpose of allowing the space mechanism to operate for every received signal when the machine is set to perforate or print and perforate, and to be locked against operation by certain signals, the letter and figure shift signals, for example, when the machine is set to print alone. When arm 593 is turned to the "print" position, lockout cam 601 will back up or engage the rear edge of spacing detent 257, which will prevent any movement of detent 257 on its pivot, except a rotary movement. Therefore, when the lugs on selector disk 259, corresponding to the figure and letter shift signals, stop in front of the nose of detent 257, said detent cannot rock on its pivot 257ˣ, and the spacing mechanism is therefore prevented from operating. If, however, arm 593 is turned to the "print-perforate" or "perforate" positions on dial 594, lockout cam 601 will be removed from engagement with either the rear edge of detent 257, or from arm 609 thereon, notwithstanding the fact that any of the lugs on control disk 259 may at that time be opposite the nose of detent 257. The spacing mechanism may nevertheless operate, since detent 257 may now turn on a projection of disk 259 as a fulcrum, the detent being provided with an arc-shaped slot 612, which permits this movement. The reason for permittitng the spacing mechanism to operate on the reception of the letter and figure shift signal whenever the machine perforates, is that these signals are at such time actually recorded in perforations, and necessarily the machine has to space.

*Bell signal.*

The call signal mechanism comprises in the present machine, among other parts, a bell 613 (Fig. 65) fast to the machine frame and provided with a clapper 614 carried on an arm 615 pivoted as at 616, and flexibly connected at one end to a control slide 617 (see Fig. 49) mounted for longitudinal movement in guide supports 199 and 200. One end of this slide is constantly held under tension of a spring 618 against a pivoted member 619 which is thereby forced against the periphery of a cam 620 fast on power cam shaft 162. Slide 617 is flexibly connected to the lower end of a detent 621 adapted to coöperate, as hereinafter described, with a notched control disk 622 on type wheel shaft 135. In case the manual lockout mechanism is used in connection with this bell signal, the latter is operable only when manual lockout cam rod 592 is rotated so as to remove cam 598 from engagement with arm 606 of detent 621, or 180° from the position shown in Fig. 49, in which position the other cams on lockout rod 592 lock all of their respective control slides against operation. In this position of cam rod 592, arm 593 (see Fig. 81) will point to the "signal" position.

When a signal is received, the type wheel shaft will stop control disk 622 (Fig. 49) in such position that notch 623 thereof will lie opposite the nose of detent 621. Then as the drop of cam 620 passes member 619, slide 617 will pass quickly to the right under the action of spring 618, thereby operating clapper arm 615 to send the clapper against the bell 613, which sounds the call signal. The continued rotation of cam 620 resets slide 617 and the bell clapper. In any other positions of control disk 622, slide 617 cannot operate, as will be readily understood from similar mechanisms hereinbefore described.

To describe a use of this call signal and its operation, reference will be had to Fig. 30, which shows diagrammatically a way wire having four stations indicated A, B, C and D, at each of which is a machine such as herein described. The transmitting contact and receiving magnet of each machine are connected in series on the line 624 connected to ground at station D directly, and at station A through a battery 625.

Connected in parallel with the transmitting contacts 26, 27 of the several machines, are operators' line switches 626, 627, 628 and 629, which are normally closed so that any station may use the line.

The bell signal control disks in these machines are so set that the notches in each will stop opposite the nose of its detent, when a call signal intended for a given station is received. These notches, for individual selective signaling, are indicated $623^a$, $623^b$, $623^c$ and $623^d$, in Fig. 30, and occupy relatively different angular positions. Assume that these stations have for their calling signals certain letters of the alphabet say, $a$, $b$, $c$ and $d$, respectively, and assume that station A desires to call station C, it being understood that the lockout control handle 593 at each machine stands at the "signal" position, which is its normal position on a way wire when the line is not in use. The operator at station A opens his line switch 626 and operates the "C" key on his keyboard. The call bell at station C will then give a tap for each such signal received, since notch $623^c$ of the control disk at that station will stop opposite the nose of its detent $621^a$. The bells at the other stations will not be operated by this signal for the reason that the notches $623^b$ and $623^d$ in their control disks do not, upon the reception of this signal, stop opposite the noses of their detents $621^b$ and $621^d$.

The attendant at station C, on hearing this signal, opens his line switch 628. This stops the operation of the machine at station A and thereby notifies him that station C has answered, an operation analogous to that performed in present day Morse way wire practice. The operator at station C, after a short interval, will then close his line switch 628, and if his bell continues to ring, he again opens his line switch and closes it after a short interval, and repeats this operation until his bell no longer rings.

As soon as the operator at station C finds that his bell no longer rings, when he closes his line switch, he sets the arm 593 of his lockout to the "print" or "print-perforate" or "perforate" position, according to the telegraphic practice at that station. The machine at station C then records the message transmitted from station A. Since all of the other machines are at this time locked out so far as their recording mechanism is concerned, they of course will not record the message sent from station A, but their selecting mechanisms will operate and thus indicate to their respective attendants that the line is in use.

In addition to the individual station call above described, any machine may call two or more stations simultaneously, and this is effected by providing the bell control disks 622 of all the machines on the line also with notches $623^x$, all of which occupy corresponding positions and stop opposite the noses of their respective detents when such a call signal is received. For example, if the control disks on all the machines on the line are provided with notches which stop opposite the noses of their detents when the signal corresponding to the letter "X" is received, the sending of such signal from one station will call the others.

The call bell may also be employed when the machine is used on a trunk circuit in connection with the distant control mechanism hereinafter described, particularly in duplex operation for sending "service" signals, for example, a call for the repetition of a message. In this case the bell operates only in the figure shift, hence the nose of detent 621 would have broad and narrow sections, as fully shown and described in connection with the blanking detent.

Motor cut off.

The automatic cut off, for use on way wires whereby when the line is not in use all the motors 47 are automatically stopped and automatically started when the line is opened at any point, is shown most clearly in Figs. 8, 10, 11, 15, 16, $16^a$ and 18, and comprises, among other parts, a worm 630 near one end of shaft 54, which is constantly driven by the motor of the machine. This worm is adapted to at times engage with a tip 631 formed on an arm 632 fast to a shaft 633 adapted to rotate and slide longitudinally in the contact block 23. Fast to the other end of this shaft is an arm 634, one end of which extends into a slot 635 of lever 33, which is pivotally connected to a swinging arm 636 having an extension 637 which is held, under tension of spring 638, against the periphery of cam 639 fast on the escapement shaft 41. (See Fig. 18). Shaft 633 carries a metal contact sleeve 640 insulated therefrom by bushing 641 which extends at one end beyond said sleeve to form a circuit breaker. The circuit which supplies power to the motor, includes, in series therewith, a pair of spring contacts or brushes 642 and 643, which close the circuit to the motor by engaging contact sleeve 640. (See Fig. 11).

When escapement shaft 41 rotates on the transmission or reception of a signal, the high part of cam 639 will operate upon extension 637 to shift arm 33 to the right (Fig. 16). This permits shaft 633 to rotate under the action of torsional spring 644 in such direction as to bring tip 631 of arm 632 into engagement with worm 630, whereupon shaft 633 will be shifted to the right as worm 630 continues its rotation. When the end of a signal is reached, extension 637 on arm 33 will drop into one of the depressions of cam 639, thus acting through arm 33, and arm 634 to remove tip 631 from engagement with worm 630, thus stopping the movement of shaft 633 to the right. This shifting of shaft 633 is not sufficient, however, to remove contact sleeve 640 from engagement with brushes 642 and 643. When the tip 631 has been withdrawn from worm 630 as described, shaft 633 is pushed to the left (Fig. 11) under the extensional tension of spring 644 to its starting point. However, if the circuit of magnet 28 is continuously closed, as for example, by the closing of one of the line switches 627—629 (Fig. 30), the armature arm 31 of said magnet (see Fig. 18), will continuously back up extension 32 on arm 33, thereby preventing the movement of said arm to the left when a depression of cam 639 reaches extension 637. This shifts shoulder 645 of arm 33 in such direction as to permit spring 644 to continuously hold the tip of arm 632 in engagement with worm 630. Shaft 633 will thereby be shifted so far to the right (Fig. 11) that the brushes 642 and 643 will be brought into engagement with insulating bushing 641 and thereby break the motor circuit. If then the circuit, including magnet 28 is opened, as, for example, by opening any one of the line switches 627-629 (Fig. 30), arm 31 will drop, thus permitting lever 33 to be drawn to the left and thereby, acting through shoulder 645 and arm 634 to rotate shaft 633 in such direction as to remove tip 631 of arm 632 from worm 630, whereupon shaft 633 will be shifted to the left (Fig. 11) by spring 644 and contact sleeve 640 again brought into engagement with brushes 642 and 643, thus again completing the motor circuit.

*The tape perforating mechanism.*

The tape perforating mechanism in the present machine comprises, among other parts, (see Figs. 122 to 130, inclusive), a frame having two side plates 646 and 647 connected by cross-members 648 and 649, and rigidly attached to the outside of the casing which incloses the selecting mechanism of the machine. The selective operation of this punching mechanism is effected by six notched disks 650, mounted fast on a shaft 651, journaled in side frame members 646, 647 and coupled by a sleeve 652 to the type wheel shaft 135. The punching is effected by a series of six punches 653, one for each of the controlling disks 650. These punches are slidably mounted in a punch block 654 which is in turn slidably mounted upon two rods 655 and 656, slidably mounted in stationary guide bars 657 and 658, and rigidly connected together by cross-members or yokes 659 and 660. Also fast to these rods is a die 661 having openings therein adapted to register with punches 653. Fast to cross-yoke 660 is an arm 662 adapted to coöperate as hereinafter described, with a cam 663, fast on a shaft 664, positively coupled through a sleeve 665 to the cam shaft 162. Rods 655 and 656 are under tension of two springs 666 and 667 between stationary guide 658 and yoke 659, acting to force die 661 in the direction of the punch block 654. The tape 668 passes upward through a guide 669, thence between the punch block 654 and die 661, and over a feed roll 670 consisting of a toothed wheel fast on the shaft 671 rotatable in a groove 672 in the top of the punch block. Also fast on shaft 671 are a feed ratchet 673 and a correcting wheel 674, hereinafter more fully described. Shaft 671 is held down by a lid plate 675 slotted transversely to permit the feed roll 670, ratchet 673 and correcting wheel 674 to pass through it.

The teeth of the feed roll engage with perforations 676 in the tape, extending in a row longitudinally of the center thereof, after the well known practice in this class of devices.

The control of the punches by the disks 650, is substantially the same as that herein described in connection with the punch mechanism for page perforating, except that in the tape punching mechanism, there are six disks 650, instead of five as in the former case. The reason for showing six disks instead of five in the case of the tape punching mechanism, is to illustrate the fact that the code which controls the selecting mechanism (in this case a five unit code) may be different from that in which the signals are actually perforated (a six unit code). In the normal position of the parts, as shown in Fig. 123, arm 662 rests upon the high part of cam 43 which draws the die 661 to the right in said figure, against the compression of springs 666 and 667.

When a given signal is received, the type wheel shaft 135 will stop in a position corresponding to this signal, as hereinbefore fully described. This in turn stops the shaft 651 of the perforating disks in a corresponding position. While the selecting operation is going on to set the type wheel shaft in the selected position, cam shaft 162 makes its first step, as hereinbefore fully described. At the end of this step of the cam shaft, cam 663 will have rotated to that point where arm 662 is near the drop of the cam. Then, when the cam shaft rotates on its second step, the drop of cam 663 will pass arm 662, allowing rods 655 and 656 to force the die 661 in the direction of the punch block. When the die moves in this direction, it first forces the tape against the punch block and then pushes the punch block in the direction of the disks 650. When this takes place, those punches which are backed up by elevations of disks 650, will be forced through the tape, while those which are not so backed up, or which register with depressions in the punch disks, will yield in the direction of said disks and therefore not perforate the tape. Simultaneously with this perforating operation, which forms the code perforations in the tape, the feed perforations 676 are also formed therein by a punching pin 677 rigidly secured to cross-member 648 of the frame and passing through an opening in the punch block 654, and adapted to register with an opening 678 in the die.

The feed roller 670 is operated step-by-step by pawl 679 (Fig. 126) pivotally mounted on the die 661, and adapted to operate upon ratchet 673 of the feed roll shaft 671, and held thereagainst under the tension of the spring 680. When die 661 travels forward as described, pawl 679 is stepped up a tooth on ratchet 673 and when the die travels in the opposite direction, said pawl operating upon said ratchet, will rotate feed roll 670 one step and thus feed the tape up correspondingly.

In addition to stepping the feed roll shaft around one step on each backward movement of the die, pawl 679 acting on ratchet 673, pulls the punch block back to its normal position, thus stripping the tape from the punches. When the punch block is thus moved, a cross-bar 683 fast to the side frame members 646 and 647, engages a shoulder 686 (Fig. 125) on each of the punches and holds said punches against movement with the punch block, thereby permitting said stripping action to take place. At the same time a cross-bar 687 fast to the punch block will engage a shoulder 688 on each of the punches extending into the depressions of the disks 650 and restores these punches to their normal position. Shoulders 686 and 688 are formed on the punches by a slot formed in one side of each, as shown most clearly in Fig. 125, and the cross-bars 683 and 687 extend transversely across all of the punches and lie within these slots.

Also fast on the feed roll shaft 671 is a correcting wheel 674 having a series of equally spaced peripheral notches adapted to coöperate with a spring-pressed plunger 690. (See Fig. 127.) The purpose of this mechanism is to insure the stopping of the feed roll shaft always in the proper position.

*Distant control lockout mechanism.*

The distant control lockout mechanism comprises, among other parts, two slides 691 and 692 (see Figs. 86 and 87) mounted for longitudinal movement in guides 199 and 200 and flexibly connected respectively to detents 693 and 694 which are controlled respectively by notched control disks 695 and 696 in the type wheel shaft, operating in coöperation with detents 693 and 694 respectively flexibly connected to said slides. These distant control operations are performed only in the figure shift, hence the noses of detents 693 and 694 have broad and narrow sections and the disks 695 and 696 are shifted laterally of the type wheel shaft, as fully described in connection with the blanking mechanism. Slides 691 and 692 are operated by cams 697 and 698 respectively, fast on the main cam shaft 162, and acting on said slides through pivoted members 699 and 700. Slide 692, which will be called the "through" slide, acts upon a pawl or toothed sector 701 fast upon a rock shaft 335 to operate the cam rod 702 to lockout or render operative at will the page perforating mechanism, and through a pawl 703 to lockout or render operative at will, the tape perforating mechanism. Further details of this distant control lockout mechanism will be brought out in the description of the operation thereof to follow.

Normally with this mechanism, the machine prints on a page alone, that is, the page and tape perforating mechanisms are locked out. The page perforating mechanism is at this time locked out by cams 704 and 705 (Figs. 82 and 83) acting respectively on an arm 608 (Fig. 53) of the perforating lockout lever 608ˣ, and on a detent 706 of the spacing mechanism. This detent is substituted for detent 257 (Fig. 51) and is identically the same as detent 257 except that it (706) is not provided with an arm such as 609, since the purpose of said arm is for operation in conjunction with the signal bell, which is not used with the distant control mechanism. Cams 704 and 705 are formed on a rotatable rod 702 which is substituted for the manual rod 592.

The tape perforating mechanism is, at this time, locked out by the pawl 703 engaging die 661, as shown in Fig. 123, and thus holding the die against operation.

It will now be assumed that the parts are in the normal positions above described, and that an operator at a distant station desires that the receiving machine shall print and perforate on the page, but not perforate on the tape. Such being the case, the transmitting operator sends a single "through" signal. The reception of this signal causes the type wheel shaft to stop in such position that a notch 707 on control disk 696 (Fig. 87) will register with the nose of detent 694 of the "through" slide. Cam shaft 162 rotates for this signal just as for all others, and when the drop of cam 698 passes member 700, slide 692 will be drawn to the right by spring 708. Normally, a tooth 709 on the forward end of slide 692 engages a shoulder 710 on sector 701 fast to rock shaft 335, and normally prevents the rotation of said shaft in a clockwise direction, the said shaft being constantly under tension of a spring 711, tending to rotate it in said direction. While slide 692 is moved to the right, as above described, rock shaft 335 is held against rotation by a locking pawl 712 movably mounted in guide supports 199 and 200 and under tension upward of the spring 713. As cam 698 continues its rotation, it will force slide 692 to the left (Fig. 87), and in doing so will send the tooth 709 of said slide into engagement with a tooth 714 on sector 701, the toothed end of said slide having been pushed upward into alinement with said sector tooth under the action of the spring 715. Slide 692 having engaged tooth 714 will continue to move to the left, and in doing so, will rock shaft 335 in a clockwise direction. Mounted fast on shaft 335 is a sector gear 716 which meshes with a rack 717, which in turn meshes with a pinion 718 fast on cam rod 702. Therefore, when the shaft 335 is rocked as described, this transmits motion to shaft 702 in such direction as to remove cams 704 and 705 from locking engagement with the perforating lever 608ˣ and spacing detent 706, thereby permitting the machine to perforate on the page.

Shaft 335 is also connected through an arm 719, link 720 (Fig. 123) and an arm 721, to a rock shaft 722 on which the tape perforating locking pawl 703 is mounted. When shaft 335 rocks to unlock the page perforating mechanism, as above described, the tape perforating mechanism will remain locked, for the reason that the shaft 722 does not at such time, rock far enough to release pawl 703 from die 661.

If the operator at the distant station desires to return the parts to normal; that is, operate the lockout mechanism so that the machine will print only on a page, and not perforate either on the page or on the tape, he sends a "city" signal. The reception of this signal causes the type wheel shaft to stop in such position that a notch 723 in control disk 695 (Fig. 86), will register with the nose of detent 693. Cam shaft 162 will rotate for this signal, as for the others, and when the drop of said cam passes pivoted member 699, spring 724 will draw slide 691 to the right (Fig. 86). When this takes place, a bevel arm 725 fast to slide 691, and extending across the top of slide 692 and locking pawl 712, will engage between portions 726 and 727 on slide 692 and pawl 712 respectively, and force these downward, thus releasing the toothed sector 701 and allowing shaft 335 to rotate in a counter-clockwise direction (Fig. 87), whereupon it will operate through sector 716, rack 717 and pinion 718, to rotate cam rod 702 and return cams 704 and 705 to locking relation with the page perforating locking lever 608ˣ and the spacing detent 706. At the same time shoulder 710 of sector 701 will return to its normal engagement with the toothed end of slide 692.

If it is desired that the machine shall print only on the page and perforate on the tape, the transmitting operator sends two "through" signals in succession. The reception of the first of these signals will cause slide 692 to operate as above described, and the second of these signals will cause a repetition of this operation, except that, in the latter case, the slide will operate on the tooth 728 of sector 701, instead of on tooth 714, thus rotating shaft 335 far enough to release locking pawl 703 from die 661, (Fig. 123), thereby unlocking the tape perforating mechanism. This rotation of shaft 335 will also act through the sector 716, rack 717, and pinion 718, to rotate cam rod 702 through 180°, which will bring the opposite sides of cams 704 and 705 into locking engagement with the page perforating locking lever 608ˣ and with the spacing detent 706, thereby locking the latter mechanism against operation.

The parts are returned to the operating condition hereinbefore referred to as normal, by the transmission of the "city" signal as described.

If it is desired that the machine shall print and perforate on the page and perforate on the tape, the transmitting operator sends three "through" signals in succession. The reception of these signals causes the "through" slide 692 to operate three times in succession, each time the same, as above described, except on the third operation its tooth 709 engages a tooth 729 of sector 701, and acting therethrough rotates shaft 335 in a clockwise direction, (Fig. 87) as above described, but this time one step farther than on either of the before described operations. Shaft 722 is thereby caused to release locking pawl 703 from die 661, and release the tape perforating mechanism, and to rotate cam rod 702, 270°, which latter releases cams 704 and 705 from lever 608ˣ and space detent 706 respectively, and unlocks the page perforating mechanism.

The parts are returned to the operating condition hereinbefore referred to as normal, by the transmission of the "city" signal as described.

*Paging without page signals.*

The mechanism causing the machine to perform paging operations by the reception of signals which are not necessarily paging signals, such for example as by a word spacing signal, is shown most clearly in Figs. 131 to 139 inclusive. This mechanism, as herein shown, comprising means to cause the machine to feed the paper up from line to line and to return to the commencement of a new line, under the control of a space signal, and mechanism for causing the blank to be fed out of the machine under the control of two consecutive space signals. The former mechanism comprises, among other parts, (see Fig. 132), a locking bar 730 supported upon two shoulder screws 731 and 732 passed respectively through cam slots 733 and 734 therein. Plate 730 is provided on its upper edge with a series of extensions 735 and 736, which normally engage with slots 737 and 738 in the lower edges of lining and carriage return slides 739 and 740 respectively. These slides are identically the same as the line and carriage return slides hereinbefore described, except that in the present case they are provided with the slots above mentioned. Locking bar 730 is provided with an extension 741 having a cam 742 adapted to coöperate as later described, with a bevel or cam face 743 on the print hammer carriage 730. This locking plate is under tension to the left, in Fig. 132, of a coil spring 744. When this mechanism is used, no lining nor carriage return signals are employed, the said mechanism being operated only by spacing signals, as above stated. For this reason, control disks 745 and 746 are provided with notches 747 and 748 respectively, (Figs. 131 and 133) corresponding to the lining and carriage return signals. These disks replace the lining and carriage return control disks 319 and 278 previously described. The operation is as follows:

Whenever a spaced signal is received, notches 747 and 748 of control disks 745 and 746 will stop opposite the noses of detents 317 and 276 (Figs. 131 and 133) respectively, but unless the print hammer carriage has reached the end of a line, the detents cannot operate, for the reason that their slides 739 and 740 are locked by bar 730 against movement. When, however, the print hammer carriage has reached a predetermined point in its travel, near the end of the line, cam 743 thereon will engage cam 742 of locking bar 730, forcing said bar to the right (Fig. 132) against the tension of spring 744, and also downward, releasing extensions 735 and 736 from the line and carriage return slides 739 and 740. The lining and carriage return slides now being unlocked, upon the reception of the next space signal the lining and carriage return detents 317 and 276 may pass into the notches 747 and 748 of their control disks and permit said slides to operate the lining and carriage return mechanism, as hereinbefore fully described.

The purpose of allowing the locking plate 730 to be forced downward, as well as to the right (Fig. 132) is to permit the print hammer carriage to continue its travel upward to the end of a line, after engaging with the extension 741 of said plate.

After the slides 739 and 740 have operated and been returned to normal, locking plate 730 is returned to locking engagement with these slides under the action of spring 744.

The mechanism for feeding a blank out of the machine, or performing the blanking operation under the control of two consecutive word spacing signals, comprises among other parts, two slides 749 and 750 identically the same as the shift slides, but so far as location in the machine is concerned, they replace the "through" and "city" slides 692 and 691. These slides are controlled respectively by disks 751 and 752 (Figs. 135, 136 and 139) mounted on the type wheel shaft and adapted to coöperate as herein described, with detent 753 and 754, respectively, flexibly connected thereto in a similar manner to the other slide controlling detents. These slides are operated respectively by cams 755 and 756 fast on cam shaft 162 and operating upon said slides through pivoted members 757 and 758 inserted between the ends of the slides and cams.

Slides 749 and 750 control the blanking slide 759 (Fig. 138), which is identically the same as blanking slide 423, except that it is provided with a hooked extension 760 adapted to coöperate, as hereinafter described, with a locking arm 761 formed on the collar 762 fast to shaft 335. Also fast to collar 762 is an arm 763 which engages continually with a slot 764 in a slide 765 (Fig. 137) mounted for longitudinal movement in guides 199 and 200, and replacing the bell slide 617. Also fast on shaft 335 is a collar 766 which is rotated to release arm 761 from hooked extension 760, as hereinafter described, through the operation of slide 749 on shoulder 767 of collar 766 fast to shaft 335.

The operation is as follows:

Whenever a word spacing signal is received, control cam 751 will stop in such position that its notch 768 will register with the nose of detent 753, then upon the first step of the cam shaft 162 for the next succeeding signal, cam 755 causes slide 749 to travel to the left (Fig. 136), which, acting upon shoulder 767, will rotate shaft 335 to the right and thus remove locking arm 761 from locking engagement with the hooked extension 760 of the blanking slide. The slide 750, however, does not at this time operate, and this is due to the fact that a tooth 769 on disk 752 occupying an angular position thereon corresponding to slot 768, stops opposite the nose of detent 754 and therefore prevents the operation of said slide.

Now, if the signal following the spacing signal, which we assumed above was received, is some signal other than a space signal, notch 770 of the blanking control disk 771 will not register with the nose of detent 772, hence the blanking slide cannot operate. Also the tooth 769 on control disk 752 will not register with the nose of the detent 754, whereupon slide 750 will travel to the right, bringing extension 773 thereon into engagement with the slanting upper edge 774 of said slide 749, forcing the latter downward against tension of spring 775, and permitting it to assume its normal position, whereupon it will be disengaged from shoulder 767, which will permit shaft 335 to rotate in an anti-clockwise direction and thereby bring arm 761 into locking engagement with the hooked extension 760 of the blanking slide.

If, however, this next succeeding signal is a space signal, the notch 770 of control disk 771 will register with the nose of blanking detent 772, thus permitting the blanking slide and the mechanism controlled thereby, to operate as hereinbefore fully described. Then if the third succeeding signal is not a space signal, the parts will return to normal as described.

Each time shaft 335 rotates in a clockwise direction to release locking arm 761 from hook 760, it also, acting through arm 764, shifts slide 765 to the left (Fig. 137), whereupon a cam 776 on said slide, acting upon a projection 777 on the upper edge of locking bar 730, will force the said bar downward and thus automatically release the lining and carriage return slides so that the carriage return mechanism may operate at the same time with the blanking mechanism.

Without limiting my invention to the specific constructions herein shown and described, what I claim is:

1. A machine telegraph comprising a transmission line including a source of electrical energy, means to transmit over said line for each signal a starting electrical impulse and one or more code impulses, code perforating mechanism, and means to selectively control said perforating mechanism, said selective mechanism being started into operation for each signal by said start impulse, and operating thereafter under the control of said code impulses.

2. A machine telegraph comprising a transmission line including a source of electrical energy, means to transmit over said line for each signal a starting electrical impulse and one or more code impulses, code perforating mechanism, and means to selectively control said perforating mechanism, said selective mechanism being started into operation for each signal by said start impulse, and operating thereafter under the control of said code impulses to record the same in code perforations, but inoperative to record said start impulses.

3. A machine telegraph comprising a transmission line including a source of electrical energy, punching mechanism for preparing code perforated controlling blanks for automatic transmission, direct line transmitting apparatus adapted to transmit over said line from said source for each signal a start impulse and one or more code impulses, and direct line receiving apparatus started into operation for each signal by said start impulse, and operative thereafter under the control of said code impulses to selectively control said punching mechanism.

4. A machine telegraph comprising a group of punches, means to operate said punches in varying combinations according to the signals transmitted, a single magnet common to all of said punches, and means controlled thereby for selecting a different combination of punches for each signal.

5. A machine telegraph comprising punching mechanism, selecting mechanism to determine the punches to be operated, a single magnet, operative connection between said magnet and said selecting mechanism, means to operate said magnet invariably at the beginning of each signal to start said selecting mechanism into operation, and means to operate said magnet variably thereafter according to the signal transmitted.

6. A machine telegraph comprising a group of punches, a series of selectors determining the punches to be operated, a rotatable shaft to operate said selectors, means to start said shaft into operation at the beginning of each signal, and means automatically acting at the end of each signal to stop the rotation of said shaft.

7. A machine telegraph comprising a group of punches, a series of selectors determining the punches to be operated, mechanism to time the operation of said selectors, means to start said timing mechanism into action at the beginning of each signal, and means to automatically stop the same at the end of each signal.

8. A machine telegraph comprising punching mechanism comprising a series of punches, a series of selectors determining the punches to be operated, a rotatable shaft to operate said selectors, means to start said shaft into motion at the beginning of each signal, means to automatically stop the same at the end of each signal, and means to control the operation of the punches, and means controlled by the last mentioned means to start into action said punching mechanism.

9. A machine telegraph comprising a series of punches, a series of selectors determining the punches to be operated, means to operate said selectors, means controlled by the first impulse of a series of electrical impulses to start into operation said selector operating means, automatically acting means to stop said selector operating means at the end of each signal, and means started into action by the selection of the punches to operate the same.

10. A machine telegraph comprising a group of punches, a rotatable shaft, means to stop said shaft in varying positions according to the signals received, and means controlled by the stopping of said shaft in such positions to determine combinations of punches to be operated.

11. A machine telegraph comprising printing mechanism, punching mechanism, a shaft, means to rotate said shaft for each signal received, means controlled by the stopping position of said shaft to operate said printing and punching mechanisms, and means to stop the rotation of said shaft in predetermined angular positions corresponding to the respective signals.

12. A machine telegraph comprising punching mechanism, a rotatable shaft, means to stop the rotation of said shaft in predetermined angular positions corresponding to the respective signals, means controlled by the stopping positions of said shaft to determine the punches to be operated, power mechanism to operate said punching mechanism, and means controlled by the stopping position of said shaft to connect said power mechanism to said punch operating mechanism.

13. A machine telegraph comprising perforating mechanism including a plurality of punches, and means to force said punches through the material to be perforated, a type wheel and a printing platen therefor, a rotatable shaft driving said type wheel, selectively operated means to stop the rotation of said shaft in predetermined angular positions corresponding to the respective signals to be recorded, means driven by said shaft and determining by the stopping position of said shaft the punches to be selected for a given signal, means to operate said printing platen, and independent means to operate the mechanism which forces the punches through the material to be perforated.

14. A machine telegraph comprising a series of punches, a rotatable shaft, means to stop said shaft in predetermined angular positions corresponding respectively to the signals received, mechanism controlled by the stopping positions of said shaft to select said punches in combinations corresponding to said signals, a movable die adapted to engage said punches, a shaft to control the movement of said die into engagement with said punches, and means controlled by the stopping position of the first mentioned shaft to start the second mentioned shaft into rotation.

15. A machine telegraph comprising electrical signal receiving means, a group of movable punches, a die acting to force the material to be punched against the cutting ends of said punches, a disk having a notched periphery adapted to prevent the yielding of said punches under the action of said material forced against them in combinations corresponding respectively to the angular positions of said disk, and allowing others to yield in combinations corresponding thereto, means to rotate said disk on the reception of each signal, and means to stop the same in angular positions corresponding respectively to the signals received.

16. A machine telegraph comprising electrical signal receiving means, punching mechanism, printing mechanism, and paging mechanism, a rotatable shaft, means to stop the rotation of said shaft in predetermined angular positions corresponding respectively to the signals received, and means controlled by the stopping positions of said shaft to operate each of said mechanisms.

17. A machine telegraph comprising electrical signal receiving means, a series of punches, and means to select combinations of said punches for operation according to the signals received, a spring adapted to bring said die into engagement with said punches, means to normally hold said die out of engagement with said punches, means to release said holding means to allow said spring to actuate said die plate and operate selected punches, and means to select the punches to be operated.

18. A machine telegraph comprising electrical signal receiving means, mechanism adapted to form groups of perforations, mechanism controlled by received signals to determine the perforations to be formed, means to move said perforating mechanism with respect to the material to be perforated to form spaces between succeeding groups of perforations.

19. A machine telegraph comprising electrical signal receiving means, perforating mechanism selectively controlled thereby, and means to cause the perforating mechanism to travel step-by-step across the material to be perforated.

20. A machine telegraph comprising electrical signal receiving means, perforating mechanism selectively controlled thereby and signal controlled means to cause the perforating mechanism to travel step-by-step across the material to be perforated.

21. A machine telegraph comprising electrical signal receiving means, perforating mechanism selectively controlled thereby, means to cause said mechanism to travel step-by-step across the material to be perforated, and means to return the said mechanism to the commencement of its travel.

22. A machine telegraph comprising electrical signal receiving means, perforating mechanism selectively controlled thereby, means to cause said mechanism to travel step-by-step across the material to be perforated, and signal controlled means to return the said mechanism to the commencement of its travel.

23. A machine telegraph comprising electrical signal receiving means, a series of punches selectively controlled thereby, a die adapted to engage said punches, and means to simultaneously move said punches and die with respect to the material to be punched to form spaces between succeeding perforations.

24. A machine telegraph comprising electrical signal receiving means, punching mechanism adapted to produce groups of perforations corresponding to respective signals, means to move said perforating mechanism with respect to the material to be perforated to form spaces between succeeding groups of perforations, and means to operate said perforating mechanism to cause the same to impress upon said material one or more code perforations corresponding to a word space.

25. A machine telegraph comprising electrical signal receiving means, page perforating mechanism selectively controlled thereby, means to space said perforating mechanism transversely of a page, means to return said perforating mechnism to the beginning of a line, and means to cause said mechanism to impress on said page code perforations corresponding to the said returning operation.

26. A machine telegraph comprising electrical signal receiving means, a traveling punch carriage, a continuously rotating power shaft, spacing mechanism to cause said carriage to travel step-by-step, means to mechanically connect said spacing mechanism to said power shaft, a combination device selectively controlled from said signal receiving means and acting to control the connection between said spacing mechanism and said power shaft, selective means adapted to actuate said combination device, and punching mechanism operated by said power mechanism.

27. A machine telegraph comprising electrical signal receiving means, a rotatable shaft normally at rest, selecting mechanism operated by said shaft and controlled by said signal receiving means, a constantly rotating shaft, means to couple said normally stationary shaft to said constantly rotating shaft and comprising a metal disk adapted to rotate with said normally stationary shaft, a metal disk adapted to rotate with said constantly rotating shaft, a non-metallic disk free to rotate with either of said shafts and held between the two said metal disks by pressure longitudinally of the axis of said shaft.

28. A machine telegraph comprising electrical signal receiving means, a rotatable shaft normally at rest, a constantly rotating shaft, means to couple said normally stationary shaft to said constantly rotating shaft and comprising a metal disk adapted to rotate with said normally stationary shaft, a metal disk adapted to rotate with said constantly rotating shaft, a non-metallic disk free to rotate with either of said shafts, and held between the two said metal disks by pressure longitudinally of the axis of said shafts, and means controlled by said signal receiving means to selectively control the uncoupling of said shafts in varying angular positions according to the signals received.

29. A machine telegraph comprising electrical signal receiving means, mechanism to time said signals and having a rotatable shaft normally at rest, a constantly rotating shaft, means to couple said normally stationary shaft to said constantly rotating shaft and comprising a metal disk adapted to rotate with said normally stationary shaft, a metal disk adapted to rotate with said constantly rotating shaft, a non-metallic disk free to rotate with either of said shafts, and held between the two said metal disks by pressure longitudinally of the axis of said shafts.

30. A machine telegraph comprising timing mechanism having means to start and stop the same, character selecting mechanism having means to start and stop the same, and means to insert a lag between the stopping of said timing mechanism and the starting of said character selecting mechanism.

31. A machine telegraph comprising a page recording machine having electrical signal receiving means, mechanism to feed the record receiving material a plurality of line spaces in one operation, a rotatable type wheel shaft, means to stop the same in predetermined angular positions corresponding to the signals received, and means controlled by the stopping position of said shaft to start said multiple line feed mechanism into operation.

32. A machine telegraph comprising a page recording machine having electrical signal receiving means, power mechanism, mechanism to feed the message receiving material a plurality of lines in one operation, and means comprising a clutch to connect said power mechanism to said multiple line feed mechanism, said clutch making a single revolution for each such feeding operation.

33. A machine telegraph comprising a page recording machine having electrical signal receiving means, power mechanism, mechanism to feed the impression receiving material a number of lines in one operation, mechanism comprising a clutch to connect said power mechanism to said lining mechanism, mechanism to feed said material single lines, and means to cause said multiple line feed to feed the material a number of lines corresponding to a revolution of said clutch less the number of lines already fed singly by the single line feed mechanism.

34. A machine telegraph comprising electrical signal receiving means, a type wheel controlled thereby and having two rows of characters, means to space said type wheel longitudinally of its axis to form spaces between succeeding characters when recorded, a print hammer, means to shift said type wheel with respect to said print hammer so that one line of characters is brought into alinement with said print hammer, and the other out of alinement therewith, said means including a shaft and a cam rotatable therewith to shift said type wheel when said shaft is rotated.

35. A machine telegraph comprising electrical signal receiving means, a type wheel controlled thereby, punching mechanism, and a member rotatable with said type wheel to selectively control said punching mechanism.

36. A machine telegraph comprising electrical signal receiving means, a type wheel controlled thereby and having two sets of characters, punching mechanism, a member rotatable with said type wheel to control said punching mechanism, and means to shift said type wheel without shifting said punch controlling member.

37. A machine telegraph comprising electrical signal receiving means, printing mechanism controlled thereby and having two series of recordable characters, mechanism to shift the printing operation from one of said series to the other, and mechanism also under the control of said signal receiving means to record signals in code perforations on the same material with said printed characters, said perforating mechanism operating the same for both of said shifts.

38. A machine telegraph comprising a receiver having printing mechanism, perforating mechanism, and call signal mechanism, and means to render operative at will said printing mechanism, said perforating mechanism, or said signal mechanism.

39. A machine telegraph comprising an electric circuit, means to transmit code signals over said circuit, a selecting device actuated by said signals, recording mechanism, call signal mechanism, and means independent of the signals transmitted over said line to bring said recording mechanism or said call signal mechanism under the control of said selective mechanism at will.

40. A machine telegraph comprising a receiver having a rotary shaft, a type wheel mounted thereon, a platen for said type wheel, a series of punches, a controlling member mounted on said shaft to rotate therewith and determining by its stopping position the punches to be operated, individual means to operate said printing platen and said punches, and means to render the punches inoperative while the printing mechanism remains operative.

41. A machine telegraph comprising a receiver having printing mechanism, perforating mechanism, spacing mechanism, and means to render said perforating mechanism inoperative at will, including means to cause said spacing mechanism to operate for all signals when perforating, and to operate only for selected signals when printing and not perforating.

42. A machine telegraph comprising a recorder having a series of selectors to determine the signal to be recorded, a series of fingers one individual to each of said selectors for controlling said selectors, a support on which all of said fingers are mounted to yield in one direction, but not to yield in the opposite direction and means to move said support variably according to the signals to be recorded and thereby set said selectors in combinations according to the signal to be recorded.

43. A machine telegraph comprising a recording machine having a series of selectors, a magnet to control said selectors according to the signals received, an armature for said magnet, and a series of fingers, one for each of said selectors, pivotally mounted on said armature and adapted to control said selectors individually.

44. A machine telegraph comprising a series of selectors to be operated in combinations and each having a beveled projection, a beveled member adapted to engage the beveled projections on said selectors and selectively control the operation thereof according to which sides of the bevels of said projections are engaged.

45. A machine telegraph comprising a receiver having a combination device provided with a plurality of permutation locking members having a fixed relation to one another, a movable frame, a flexible key mechanism comprising a series of members slidably mounted in said movable frame and adapted to interlock with said locking members, and electrically controlled receiving means to set said movable members in combinations.

46. A machine telegraph comprising a combination device including a plurality of movable tumblers, a plurality of members having a fixed relation to one another and adapted to interlock with said tumblers, each of said members being common to two or more of said tumblers, and electrically controlled means to set said tumblers in combinations.

47. A machine telegraph comprising a recording machine having a type wheel, a print hammer, a carriage to carry said type wheel on one side of the message receiving material, a carriage to carry said print hammer on the other side of said material, both of said carriages being adapted to move parallel with the axis of rotation of said type wheel, and means to rigidly connect said type wheel and print hammer carriages in a direction parallel with said axis of rotation.

48. A machine telegraph comprising a recording machine having a type wheel, a print hammer, a carriage to carry said type wheel on one side of the message receiving material, a carriage to carry said print hammer on the other side of said material, both of said carriages being adapted to move parallel with the axis of rotation of said type wheel, and means to rigidly connect said type wheel and print hammer carriages in a direction parallel with said axis of rotation, but permitting the same to move relatively to each other in another direction.

49. A machine telegraph comprising a recording machine provided with an electric motor to drive the same, a switch to control said motor, a main line including a source of electrical energy, means to transmit over said line electrical impulses to control the operation of said recording machine, a switch adapted to permanently close said main line, and automatic means operating when said last mentioned switch is closed to open said first mentioned switch.

50. A machine telegraph comprising a recording machine having an electric motor to drive the same, a switch to control said motor, a main line including a source of electrical energy, means to transmit impulses over said line to control the operation of said recording machine, a switch adapted to permanently close said main line, and automatic means operating when said last mentioned switch is closed to open said first mentioned switch, but inoperative to open said first mentioned switch when signals are being transmitted.

51. A machine telegraph comprising a transmission line, means to transmit over said line code signals comprising varying combinations of electric impulses, a recording mechanism, means to feed message receiving material through said recording mechanism, and means controlled by one of said code signals to sever said material.

52. A machine telegraph comprising a transmission line, means to transmit over said line code signals comprising varying combinations of electric impulses, means to record said signals on impression receiving material, means to feed said impression receiving material a predetermined distance and means to automatically sever said material when so fed, both said means being under the control of one of said code signals.

53. A machine telegraph comprising a transmission line, means to transmit over said line varying code signals, means to record said code signals on message receiving material, counting mechanism, means to operate said counting mechanism step by step according to the signals received, and means controlled by one of said code signals to return said counting mechanism to zero.

54. A machine telegraph comprising a transmission line, means to transmit code signals over said line, means to record said signals on message receiving material, mechanism to count the number of signals recorded, and means controlled by one of said code signals to record on said material the number indicated by said counting mechanism.

55. A machine telegraph comprising means to transmit electrical code signals, a selecting device operated by said signals, means controlled by said selecting device to record said signals on message receiving material, time indicating mechanism, and means under the control of said selecting device to record on said material the time indicated by said time indicating mechanism.

56. A machine telegraph comprising an electric circuit, means to transmit over said circuit code signals composed of varying combinations of electric impulses, time indicating mechanism, and means operated by one of the variations of the said combinations of impulses and invariably inoperative by other variations of the said combinations of impulses to record on a message blank the time indicated by said time indicating mechanism.

57. A machine telegraph comprising a page recording machine having means to feed message receiving material a number of line spaces in one operation, said means including a feed roll and a shaft having means to couple the same to said feed roll and making a single revolution for each operation of the line feeding mechanism, and means to uncouple said shaft from said feed roll during a part of the revolution of said shaft.

58. A machine telegraph comprising a recording machine having electrical signal receiving means, means to record said signals on message receiving material in typewritten characters, means to record said signals on the same material also in code impressions, and signal controlled means to render said code message recording means inoperative.

59. A machine telegraph comprising a series of perforating pins, a series of disks, one individual to each of said pins, means to rotate said disks, means to stop said disks in predetermined positions, and means to control the operation of said pins according to the stopping positions of said disks.

60. A machine telegraph comprising apparatus selectively controlled by signals of one code and adapted to record the same in perforations of a different code.

61. A machine telegraph comprising apparatus selectively controlled by signals of one code and adapted to record the same in perforations in line to line page form in one code and to record the same on a tape in another code.

62. A machine telegraph comprising signal controlled means to record signals in code perforations in line-to-line page form, means to record signals on a tape, and means to render either of said recording devices inoperative at will.

63. A machine telegraph comprising signal controlled means to record signals in code perforations in line-to-line page form, signal controlled means to record signals on a tape, and signal controlled means to render either of said recording devices inoperative at will.

64. A machine telegraph comprising electrical signal receiving means, a control member, a plurality of devices normally acting to prevent the operation of said member, one of said devices acting on the reception of each signal to tend to permit the operation of said member, another of said devices operative by a selected signal corresponding to the function to be performed by said member to tend to permit its operation, and another of said devices operative by previous signals to permit or prevent the operation of said member according to the nature of said previous signal.

65. A machine telegraph comprising electrical signal receiving means, a control member, a power cam adapted to operate said member, means to rotate said cam on the reception of each signal, a detent operatively connected to said control member, a rotary control member, and means to stop the same in preselected positions according to each signal received and acting through said detent to prevent or tend to permit the operation of said first mentioned member according to the stopping position of said rotary control member, and lockout means operative by selected signals only and coöperating with said rotary control member to permit or prevent the operation of said first mentioned control member.

66. A machine telegraph including receiving mechanism having means operable by one signal to perform a given function, and operable by a signal differing from the first signal to perform another function, and operable by a repetition of the second signal independent of the lapse of time between the first and second sending of the second signal to perform still another function.

67. A machine telegraph including receiving mechanism having means operable by one signal to perform a given function, and operable by a signal differing from the first signal to perform another function, and operable by a repetition of the second signal to perform still another function, and operable by another signal differing from any of those mentioned, to return said means to its initial condition.

68. A machine telegraph comprising receiving mechanism including a recorder controlled by the conjoint action of two devices, one of said devices being operated by each received signal, and the other of said devices being operated step by step by selected signals only.

69. A machine telegraph comprising receiving mechanism including two control devices, one of which is operated by each received signal, and the other of which is operated step-by-step by selected signals only, and means operated by another selected signal to return said step-by-step mechanism to normal.

70. A machine telegraph comprising in combination a series of selecting devices, a recording device individual to each selecting device, a calling device individual to each selecting device, means controlled by said selecting devices to select a particular calling device to be operated, and means to cause one or more of said selecting devices to control its corresponding recording device.

71. A machine telegraph comprising in combination a series of selecting devices, a recording device individual to each selecting device, a calling device individual to each selecting device, means controlled by said selecting device to select a particular calling device to be operated, and locally controlled means to cause one or more of said selecting devices to control its corresponding recording device.

72. A machine telegraph comprising a series of recording devices, a calling device individual to each recording device, signal controlled means to operate any one or more of said calling devices at will, and means controlled by the same signals to operate any one or more of said recording devices.

73. A machine telegraph comprising a recording machine having mechanism for performing various paging operations, all of said mechanisms being operable by the same signal.

74. A machine telegraph having receiving mechanism variably controlled according to the number of times a given signal is repeated in succession and independent of the lapse of time between the repetitions of said signal.

75. A machine telegraph having page recording mechanism, means to variably control said recording mechanism by a selected signal according to the position in a line in which the recording is taking place and means to invariably control said recording mechanism by all other signals in the same manner independent of the position in the line in which the recording is taking place.

76. A machine telegraph comprising a page recording machine, having mechanism for performing essentially paging operations and mechanism for performing operations which are not essentially paging operations, and means operative by signals which are not essentially paging signals and adapted to operate said mechanism for performing essentially paging operations and means to cause certain signals to invariably control functions which are not essentially paging operations.

77. A machine telegraph comprising mechanism operable by a paging signal for performing one paging operation and operative by a repetition of said signal to perform a different paging operation.

78. A machine telegraph comprising mechanism operable by a paging signal for performing one paging operation and operative by two or more of said signals in succession to perform a different paging operation.

79. A machine telegraph comprising a page recorder including spacing mechanism, carriage return mechanism, means to operate said spacing mechanism or said carriage return mechanism by the same signal, means to prevent the operation of said carriage return mechanism by said signal unless said spacing mechanism has operated a pre-determined number of times since the immediately preceding operation of said carriage return mechanism, and means to prevent the operation of said carriage return mechanism by any other than said signal.

80. A machine telegraph comprising a page recorder comprising spacing mechanism, multiple line feed mechanism, signal controlled means to operate said spacing mechanism, and means controlled by the same signal to operate the multiple line feed, the latter means being operative only for a repeated signal, but inoperative if the space signal is immediately preceded by any other signal.

81. A machine telegraph having means to record signals in either of two different codes, and means operative by a given signal to cause said machine to record in one code and operative by two such signals in succession to cause said machine to record in another code.

82. A machine telegraph comprising signal controlled recording mechanism having means to record messages in printed characters and code perforations in page form, means to record the messages on a tape in perforated form, and distant control mechanism operable by a given signal to cause said machine to record in printed characters alone in page form, operable by a different signal to cause said machine to record in both printed characters and code perforations in page form, and operable by two such signals in succession to cause said machine to record the messages in printed form on said page, and in perforated form on said tape.

83. A machine telegraph comprising signal controlled recording mechanism having means to record messages in printed characters and code perforations in page form, means to record the messages on a tape in perforated form, and distant control mechanism operable by a given signal to cause said machine to record in printed characters alone in page form, operable by a different signal to cause said machine to record in both printed characters and code perforations in page form, and operable by two such signals in succession to cause said machine to record the messages in printed form on said page, and in perforated form on said tape, and operable by three such signals in succession to cause said machine to print and perforate on said page and perforate on said tape.

84. In a machine telegraph, a main line, means to transmit over said line electrical code signals, a page feed mechanism, comprising means to feed the record receiving material a predetermined number of single line feed spaces, means to record on said material the signals transmitted over said line, means to automatically record on each such length of record material the number of signals so recorded, and means to initiate the operation of said number recording mechanism controlled by a signal over said line.

85. In a machine telegraph, a page feed mechanism, comprising means to feed the record receiving material a predetermined number of single line feed spaces, means to automatically record on each such length of record material the time, and means controlled by a predetermined code signal and independent of the time interval between signals to initiate the operation of said mechanism.

86. In a machine telegraph, a page feed mechanism, comprising record receiving material, means to feed said material a predetermined number of single line feed spaces, means to automatically record on each such length of record material the number of signals recorded thereon, means to automatically record on each such length of record receiving material the time, means to automatically sever said material upon the completion of said page feeding operation and signal controlled means to initiate the operation of said mechanism.

87. A machine telegraph, comprising means to transmit electrical signals of varying combinations of impulses, record receiving material, a time stamp, means to record said signals on said record receiving material, and means operated by one of said signals having invariably the same combination of impulses and inoperative by all signals composed of other combinations of impulses to record on said material the time indicated by said stamp.

88. The method of checking telegraphic messages which consists in transmitting and recording on the message blank the number of signals transmitted, automatically counting the number of signals received and automatically recording the number received on the same blank, and indicating the addition or omission of signals on the received record by a comparison of the two numbers recorded on the blank.

89. A machine telegraph, comprising an electric circuit, means to transmit varying code signals over said circuit, recording mechanism, call signal mechanism, means to render said call signal mechanism operative by one of the variations of said signals and inoperative by other variations of said signals and said recording mechanism inoperative by any of the variations of said signals or to render said call signal mechanism inoperative by any of said signals and said recording mechanism operative by a plurality of the variations of said signals.

In testimony whereof I affix my signature in presence of two witnesses.

LOUIS M. POTTS.

Witnesses:
    FRANCIS S. MAGUIRE.
    E. G. MARSHALL.